US012488650B1

(12) United States Patent
Ye

(10) Patent No.: US 12,488,650 B1
(45) Date of Patent: Dec. 2, 2025

(54) SELF-STIRRING FRUIT CUP SMOOTHIE VENDING MACHINE

(71) Applicant: Huaqin Ye, Guangdong (CN)

(72) Inventor: Huaqin Ye, Guangdong (CN)

( * ) Notice: Subject to any disclaimer, the term of this patent is extended or adjusted under 35 U.S.C. 154(b) by 0 days.

(21) Appl. No.: 19/271,824

(22) Filed: Jul. 17, 2025

(51) Int. Cl.
*G07F 13/06* (2006.01)
*A23G 9/04* (2006.01)
*A23G 9/22* (2006.01)
*A23G 9/30* (2006.01)

(52) U.S. Cl.
CPC .......... *G07F 13/065* (2013.01); *A23G 9/045* (2013.01); *A23G 9/224* (2013.01); *A23G 9/30* (2013.01)

(58) Field of Classification Search
CPC ....... G07F 13/065; A23G 9/045; A23G 9/224; A23G 9/30
USPC ...................................................... 222/129.1
See application file for complete search history.

(56) References Cited

U.S. PATENT DOCUMENTS

| | | | | | |
|---|---|---|---|---|---|
| 2,654,505 | A | * | 10/1953 | Fuhrman | A47J 31/402 222/2 |
| 2,765,005 | A | * | 10/1956 | Wellekens | G07F 13/065 221/124 |
| 2,838,077 | A | * | 6/1958 | Cooper | G07F 13/065 141/93 |
| 4,294,061 | A | * | 10/1981 | Lekas | B65B 35/50 53/540 |
| 4,637,221 | A | * | 1/1987 | Levine | A23G 9/283 62/342 |
| 6,273,292 | B1 | * | 8/2001 | Milan | G07F 9/105 221/150 R |
| 6,761,036 | B2 | * | 7/2004 | Teague | A23G 9/28 62/70 |
| 7,648,049 | B1 | * | 1/2010 | Lassota | B01F 27/90 222/145.6 |
| 10,492,513 | B1 | * | 12/2019 | Sullivan | A47J 31/44 |
| 10,542,765 | B2 | * | 1/2020 | Sosa | A23G 9/106 |
| 2008/0164284 | A1 | * | 7/2008 | Stettes | A47J 31/401 99/287 |
| 2009/0179042 | A1 | * | 7/2009 | Milan | G07F 9/105 62/235.1 |
| 2010/0276451 | A1 | * | 11/2010 | Tachibana | B67D 1/04 222/190 |
| 2011/0042414 | A1 | * | 2/2011 | Tachibana | B67D 1/0864 222/129.1 |

(Continued)

FOREIGN PATENT DOCUMENTS

| | | | | |
|---|---|---|---|---|
| WO | WO-2023027635 A1 | * | 3/2023 | G05D 1/221 |
| WO | WO-2024057062 A1 | * | 3/2024 | G06Q 10/063 |

*Primary Examiner* — Paul R Durand
*Assistant Examiner* — Michael J. Melaragno

(57) ABSTRACT

The present invention discloses a self-stirring fruit cup smoothie vending machine, comprising: a storage cabinet body, a control cabinet body, a spring-loaded shelving system, a lifting mechanism, a refrigeration system, a control system, a mixing system, and a self-service payment terminal. The control cabinet body is disposed adjacent to one side of the storage cabinet body. A refrigerated compartment is provided in the lower portion of the storage cabinet body, housing the refrigeration system. An inner cabinet body is arranged within the storage cabinet body, wherein an air outlet of the refrigeration system communicates with the inner cabinet body. The inner cabinet body incorporates a tiered spring-loaded shelving system configured to store product containers in a tilted orientation.

15 Claims, 42 Drawing Sheets

(56) References Cited

U.S. PATENT DOCUMENTS

| | | | |
|---|---|---|---|
| 2013/0279288 A1* | 10/2013 | Dong | B01F 27/805 |
| | | | 366/192 |
| 2014/0290181 A1* | 10/2014 | Edwards | B65B 7/2835 |
| | | | 53/111 R |
| 2017/0039797 A1* | 2/2017 | Elmery | G07F 17/0071 |
| 2017/0243431 A1* | 8/2017 | Milan | G07F 9/105 |
| 2018/0029859 A1* | 2/2018 | Hevia | B67D 1/1234 |
| 2018/0310589 A1* | 11/2018 | Sosa | F25D 31/007 |
| 2019/0163876 A1* | 5/2019 | Remme | G16H 40/20 |
| 2021/0225117 A1* | 7/2021 | Levine | G07F 17/0064 |
| 2022/0030906 A1* | 2/2022 | Springer | B01F 27/1141 |
| 2022/0101680 A1* | 3/2022 | Gutierrez Sanchez | A47J 31/40 |
| 2022/0289547 A1* | 9/2022 | Richardson | B67D 1/0888 |

\* cited by examiner

SELF-STIRRING FRUIT CUP SMOOTHIE VENDING MACHINE

FIELD OF THE APPLICATION

The present invention pertains to the field of automated retail machines, and specifically relates to a self-stirring fruit cup smoothie vending machine with autonomous blending capability.

BACKGROUND

Smoothie machines (also known as blended ice beverage makers) are utilized to prepare chilled beverages containing ice-based smoothies. Existing automated smoothie machines can perform programmed functions including: automatic cleaning and fruit conveyance, automated peeling, de-pitting, and juicing; automatic ice dispensing and fragmentation for smoothie preparation; customizable smoothie salad assembly; automated cup filling and transfer to designated pickup locations; and automated order data storage.

Existing smoothie machines produce smoothies by fragmenting large ice blocks using stirring devices. However, the stirring devices in current smoothie machines exhibit the following technical limitation: during rotation and ice fragmentation, these devices inevitably cause splattering of container contents, contaminating the machine interior.

Current automated smoothie preparation equipment commonly suffers from these technical deficiencies:

Inefficient Mixing: Traditional stirring devices typically employ single-axis rotation without vertical blade reciprocation, resulting in poor frozen fruit pulp agitation. This leads to inadequate mixing uniformity and texture refinement.

Liquid Splatter Contamination: During rotational mixing, conventional stirring devices inevitably cause splattering of container contents, contaminating the machine interior and creating unhygienic conditions;

Imprecise Ingredient Control: Absence of precision weighing systems prevents quantitative control when adding water or beverage materials. This hinders accurate flavor ratio customization and exacerbates pipeline residue accumulation.

Cleaning Difficulties and Hygiene Risks: Non-compartmentalized designs allow user contact with blending blades, causing contamination. Cleaning procedures remain cumbersome with no capability for automated deep sanitation.

Thus, to resolve these technical issues, the present invention provides a self-stirring fruit cup smoothie vending machine.

SUMMARY

The technical problem addressed by the present invention is to overcome the aforementioned technical deficiencies, providing a self-stirring fruit cup smoothie vending machine.

To resolve said technical problems, the technical solution of the present invention is a self-stirring fruit cup smoothie vending machine, comprising a storage cabinet body, a control cabinet body, a spring-loaded shelving system, a lifting mechanism, a refrigeration system, a control system, a mixing system, and a self-service payment terminal.

The control cabinet body is disposed adjacent to a side of the storage cabinet body.

A refrigerated compartment is provided in a lower portion of the storage cabinet body.

The refrigeration system is housed within the refrigerated compartment.

An inner cabinet body is disposed within the storage cabinet body.

An air outlet of the refrigeration system communicates with the inner cabinet body.

The inner cabinet body incorporates a tiered spring-loaded shelving system configured for product storage and dispensing.

A front periphery of the inner cabinet body is sealingly engaged with a front periphery of the storage cabinet body.

A storage cabinet door is mounted at a front portion of the storage cabinet body.

The lifting mechanism is positioned laterally adjacent to the spring-loaded shelving system within the inner cabinet body.

The lifting mechanism comprises a product transfer assembly.

A product retrieval chamber is disposed in a mid-lower portion of the control cabinet body.

A passageway is formed in a sidewall of the product retrieval chamber, the passageway providing fluid communication between the storage cabinet body, the inner cabinet body, and the product retrieval chamber for transporting products into the product retrieval chamber.

The control system is mounted in an upper portion of the control cabinet body.

The mixing system is housed within the control cabinet body.

A control cabinet door is mounted at a front portion of the control cabinet body, the self-service payment terminal being disposed on an interior surface of the control cabinet door.

A touchscreen is disposed at a front section of the control cabinet body, the touchscreen being electrically connected to the control system.

As an improvement, the lifting mechanism comprising a first servomotor, transverse brackets, side brackets, slide rails, rotating shafts, a toothed belt, and sliding blocks. Wherein Transverse brackets are disposed at upper and lower ends of the inner cabinet body. Side brackets are symmetrically disposed at opposite lateral ends of the inner cabinet body.

Upper and lower ends of each side bracket are connected to the transverse brackets at corresponding upper and lower ends of the inner cabinet body.

Mounting bases are provided at upper and lower ends of each side bracket.

Rotating shafts are disposed internally at upper and lower ends of the inner cabinet body.

Ends of the upper rotating shaft are rotatably coupled to the mounting bases at upper ends of the side brackets.

Ends of the lower rotating shaft are rotatably coupled to the mounting bases at lower ends of the side brackets.

End portions of the rotating shafts extend into the mounting bases.

A first gear is fixedly mounted on each shaft end extending into the mounting bases.

The first gears within each side bracket are operatively connected by the toothed belt.

A slide rail is vertically disposed on an inner wall of each side bracket within an area bounded by the toothed belt, extending from a lower end to an upper end thereof.

A sliding block is slidably engaged with each slide rail.

A clamping plate is detachably secured to one side of each sliding block via bolts.

The toothed belt passes between the clamping plate and the sliding block and is fixedly clamped therebetween, whereby rotation of the toothed belt drives vertical displacement of the sliding block along the slide rail.

A motor mount is disposed on one side of the lower transverse bracket of the inner cabinet body.

The first servomotor is mounted on the motor mount.

A second gear is fixedly mounted on an output shaft of the first servomotor and a corresponding second gear is fixedly mounted on the lower rotating shaft.

The second gears are operatively connected by the toothed belt.

As an improvement, the product transfer assembly comprises a conveyor belt assembly.

A support bracket is mounted on each sliding block at a side laterally facing toward the storage cabinet door.

Opposite ends of the conveyor belt assembly are detachably secured to the support brackets via bolts.

As an improvement, the spring-loaded shelving system comprising a carrier bracket, a shelf assembly, a spring, a second servomotor, a first gearbox, and a rail frame. Wherein Uniformly spaced slots are formed at a rear end of the carrier bracket.

The first gearbox is mounted at each slot of the carrier bracket.

The second servomotor is operatively coupled to each first gearbox.

An output shaft of the first gearbox extends through the slot into the carrier bracket.

A disk is fixedly mounted on the output shaft within the carrier bracket.

A first end of the spring is coiled around the disk.

The shelf assembly is suspended within the spring and spaced apart from interior surfaces thereof.

An insertion slot is provided at a front portion of the carrier bracket adjacent to each spring.

A front end of the shelf assembly is insertably received within the insertion slot.

A circular aperture is formed at a rear end of the shelf assembly.

The shelf assembly is rotatably connected to the output shaft via the circular aperture.

Guard rails are disposed along opposite sides of each spring.

The guard rails are detachably secured to the carrier bracket via bolts.

Rail frames are symmetrically disposed along opposite sides of the carrier bracket.

First rollers are rotatably mounted at rear lateral portions of the carrier bracket.

The first rollers are rollingly engaged with corresponding rail frames.

Second rollers are rotatably mounted at front lateral portions of each rail frame.

The carrier bracket is rollingly supported on the second rollers.

A trapezoidal support frame is mounted below a front end of the carrier bracket.

Wherein rear brackets are symmetrically mounted at rear portions of opposite side walls of the inner cabinet body.

Protective housings are mounted externally to the side brackets.

The protective housings are detachably secured to the inner cabinet body via bolts.

Front and rear ends of each rail frame are detachably secured to a corresponding rear bracket and protective housing via bolts.

As an improvement, the mixing system comprising a mixing mechanism and an automatic door mechanism.

An access opening is formed in the control cabinet door.

The automatic door mechanism is mounted on an interior surface of the control cabinet door at the access opening.

The mixing mechanism is disposed within the control cabinet body rearward of the automatic door mechanism.

The automatic door mechanism comprising a door frame mounted at the access opening, an access door, a fourth servomotor, a second drive gear, and a second driven gear.

Wherein second rotating shafts are rotatably mounted at upper and lower ends of the door frame.

Opposite ends of each second rotating shaft extend outwardly beyond lateral sides of the door frame.

A second driven gear is fixedly mounted on each extending end of the second rotating shafts.

Vertically aligned pairs of the second driven gears on each lateral side are operatively connected by a toothed belt.

The fourth servomotor is mounted at a lower corner of the door frame.

The second drive gear is fixedly mounted on an output shaft of the fourth servomotor.

A fourth driven gear is fixedly mounted on one end of the lower second rotating shaft.

The second drive gear meshes with the fourth driven gear.

Third rails are vertically disposed on opposite inner sidewalls of the door frame.

The access door is slidably engaged with the third rails, lateral edges of the access door extending into the third rails.

Clamping plates fixedly connect opposite lateral ends of the access door to the toothed belts on both sides.

Wherein a barcode scanner is disposed at a front section of the control cabinet door.

As an improvement, the mixing mechanism comprising a lower housing, an upper housing, a cup holder frame, a cleaning rack, a load cell, and a mixing device.

Wherein the lower housing is disposed within the control cabinet body and detachably secured via bolts.

The upper housing is mounted on an upper rear portion of the lower housing.

A mixing controller is mounted on the upper housing.

The mixing device is mounted on the upper housing, its lower end extending through a through-hole into the lower housing.

Sliding slots are formed on opposite sidewalls of the lower housing.

Two shaft rods are rotatably mounted on one sidewall adjacent to sliding slot ends.

A first transmission gear is rotatably mounted on each shaft rod.

The first transmission gears are operatively connected by a toothed belt.

A fifth servomotor is mounted at one end of the lower housing.

A second transmission gear is fixedly mounted on the fifth servomotor's output shaft.

A third transmission gear is rotatably mounted on the shaft rod proximate to the second transmission gear.

The third transmission gear meshes with the second transmission gear.

Wherein the cup holder frame is slidably engaged within the sliding slots, lateral extensions received therein.

A retention clip is mounted on each lateral extension.

The retention clips are fixedly secured to the toothed belt.

A cup holder is disposed at a front end of the cup holder frame.

A drainage aperture extends vertically through the cup holder and cup holder frame.

An internal bracket is disposed below the cup holder frame within the lower housing.

Sliding track channels are formed on opposite sides of the internal bracket.

Support rods extend from opposite sidewalls of the lower housing into the sliding track channels.

Tension springs are symmetrically connected between a front end of the internal bracket and a front wall of the lower housing.

A third gearbox is mounted at a lower portion of the internal bracket.

A sixth servomotor is operatively coupled to an input shaft of the third gearbox.

A first leadscrew is operatively connected to an output shaft of the third gearbox.

A nut is threadedly engaged with the first leadscrew.

A sleeve is fixedly mounted on the nut, extending upwardly through the internal bracket.

A support plate is mounted atop the sleeve.

A load cell is disposed on the support plate.

Sliding tubes are mounted on opposite sides of the support plate.

Guide rods are slidably received within the sliding tubes, upper ends connected to the support plate.

Limit pull brackets are symmetrically disposed at front and rear ends of the cup holder frame, cooperatively engaged with the internal bracket.

The cleaning rack is slidably engaged within the sliding slots rearward of the cup holder frame.

A drain tray is mounted on the cleaning rack in vertical alignment with the mixing device.

A drain pipe extends downwardly from the drain tray.

Limit features are disposed at central and rear portions of inner sidewalls of the lower housing, cooperatively engaged with the cleaning rack.

Magnetically coupled pairs are disposed on a rear inner wall of the cleaning rack and a rear end of the cup holder frame.

Mounting holes are formed in the lower housing forward of the through-hole.

As an improvement, the mixing device comprising an installation plate, a mixing motor, an upper mixing drum, a lower mixing drum, a seventh servomotor, and a silicone protective cover.

Wherein the installation plate is disposed in a mid-upper portion of the upper housing.

The upper mixing drum is suspended below the installation plate.

The lower mixing drum is coaxially coupled to a lower end of the upper mixing drum in fluid communication therewith.

A lower end of the lower mixing drum extends through the through-hole into the lower housing.

The silicone protective cover is mounted on a bottom wall of the lower housing, having a mixing aperture vertically aligned with the lower mixing drum.

A spring seat is disposed within the lower mixing drum.

A spring is coaxially mounted around the spring seat.

A disk plate is disposed within the upper mixing drum.

Guide blocks are symmetrically mounted on opposite sides of the disk plate.

Adjustment slots are vertically formed in opposite sidewalls of the upper mixing drum.

Each guide block is slidably received within a corresponding adjustment slot.

Four threaded holes are symmetrically formed in the disk plate.

Bearings are mounted on the installation plate in vertical alignment with the threaded holes.

Second leadscrews are rotatably supported within the bearings, upper ends extending above the installation plate.

Third gears are fixedly mounted on the upper ends of the second leadscrews.

The third gears are operatively connected by a toothed belt.

Lower portions of the second leadscrews are threadedly engaged with the threaded holes.

Additional bearings are mounted at a bottom end of the upper mixing drum in vertical alignment with the threaded holes.

Lower ends of the second leadscrews are rotatably received within the additional bearings.

The mixing motor is mounted on the disk plate.

A mixing shaft is fixedly coupled to an output shaft of the mixing motor.

The mixing shaft extends through the spring and spring seat, projecting through the mixing aperture into the silicone protective cover.

An upper end of the spring bears against a lower surface of the mixing motor.

The seventh servomotor is mounted on the installation plate.

A fourth gear is fixedly mounted on an output shaft of the seventh servomotor.

A fifth gear is fixedly mounted on the second leadscrew proximate to the seventh servomotor, positioned below the installation plate.

The fifth gear meshes with the fourth gear.

As an improvement,
a small electric storage water heater is mounted at a rear portion of the upper housing.

A water storage tank is disposed at the rear portion of the upper housing.

Wherein a refrigerator unit is housed within the control cabinet body.

A plurality of peristaltic pumps are disposed within the refrigerator unit.

A plurality of electronic scales are mounted on a bottom wall of the control cabinet body.

An access door is detachably secured to a lateral side of the control cabinet body via bolts.

As an improvement, the control system comprising a PC module and a control box.

The control box is disposed in an upper portion of the control cabinet body.

The PC module is housed within the control box.

A plurality of selector switches are disposed on an upper front section of the control box.

A main power switch is mounted on the front section of the control box.

A temperature controller is positioned below the main power switch.

Control buttons are mounted on the front section of the control box.

The control buttons, selector switches, main power switch, and temperature controller are electrically connected to the PC module.

As an improvement:
A product outlet is formed in the control cabinet door in communication with the product retrieval chamber.

First rails are symmetrically mounted on an interior surface of the control cabinet door between the door and the product retrieval chamber, flanking the product outlet.

A product access door panel is slidably engaged with the first rails.

A first electric linear actuator is mounted on an interior front wall of the control cabinet body directly below the product access door panel.

An upper end of the first electric linear actuator is operatively connected to the product access door panel, driving vertical displacement thereof along the first rails.

As an improvement:

First perforated support brackets are symmetrically mounted at an upper interior portion of the product access door panel.

A first push rod is slidably received within each first perforated support bracket, an upper end extending above the product access door panel.

A first pressure plate is disposed above the product access door panel, fixedly connected to the upper ends of the first push rods.

First relays are mounted on interior walls of the product access door panel below the first perforated support brackets.

The first push rods are mechanically engaged with the first relays.

As an improvement:

A cup access mechanism is mounted on the interior surface of the control cabinet door adjacent to the product retrieval chamber.

A straw access door mechanism is disposed between the cup access mechanism and a front wall of the control cabinet body.

A cup dispensing port is formed in a front portion of the control cabinet body, aligned with the straw access door mechanism.

The cup access mechanism comprising a base frame detachably secured to the control cabinet body via bolts; an outer casing mounted atop the base frame; a mounting bracket secured to the control cabinet body via bolts at a cabinet-proximal side of the outer casing; bearings symmetrically disposed at upper and lower ends of opposite sidewalls of the outer casing; first leadscrews rotatably mounted vertically between corresponding upper and lower bearings on each side of the outer casing; first lower gears fixedly mounted on lower ends of the first leadscrews extending below the outer casing; interconnecting gears fixedly mounted on lowermost ends of the first leadscrews; a toothed belt operatively connecting the interconnecting gears; a second gearbox mounted on a bottom wall of the outer casing; a third servomotor operatively coupled to an input shaft of the second gearbox; a second lower gear fixedly mounted on an output shaft of the second gearbox extending below the outer casing; wherein the second lower gear meshes with the first lower gears; first nut carriages threadedly engaged with the first leadscrews; a tray disposed within the outer casing; connecting plates extending laterally from opposite sides of the tray; slide channels vertically formed in opposite sidewalls of the outer casing; wherein the connecting plates extend outwardly through the slide channels and are detachably secured to corresponding first nut carriages via bolts; a rear door mounted on a rear side of the outer casing; wherein an arcuate top cover is mounted atop the outer casing; wherein a straw storage dispenser is mounted on the arcuate top cover, having a downwardly inclined bottom plate; wherein a straw dispensing slot is formed at a front bottom edge of the straw storage dispenser; wherein arcuate support plates are symmetrically disposed below the straw dispensing slot to receive dispensed straws; wherein a top cover is removably mounted on the straw storage dispenser.

Wherein an infrared sensor is mounted on the bottom plate of the straw storage dispenser.

As an improvement, the straw access door mechanism comprising a door frame assembly mounted at the cup dispensing port; a straw access door; an eighth servomotor; a first drive gear; and a first driven gear.

Wherein first rotating shafts are rotatably mounted at upper and lower ends of the door frame assembly.

Opposite ends of each first rotating shaft extend outwardly beyond lateral sides of the door frame assembly.

First driven gears are fixedly mounted on each extending end of the first rotating shafts.

Vertically aligned pairs of the first driven gears on each lateral side are operatively connected by toothed belts.

The eighth servomotor is mounted at a lower portion of the door frame assembly.

The first drive gear is fixedly mounted on an output shaft of the eighth servomotor.

A third driven gear is fixedly mounted on the lower first rotating shaft.

The first drive gear meshes with the third driven gear.

Second rails are vertically disposed on opposite inner sidewalls of the door frame assembly.

The straw access door is slidably engaged with the second rails, lateral edges extending into the second rails.

Second perforated support brackets are symmetrically mounted at an upper interior portion of the straw access door.

A second push rod is slidably received within each second perforated support bracket, an upper end extending above the straw access door.

A second pressure plate is disposed above the straw access door, fixedly connected to the upper ends of the second push rods.

Second relays are mounted on interior walls of the straw access door below the second perforated support brackets.

The second push rods are mechanically engaged with the second relays.

As an improvement:

Both the storage cabinet body and control cabinet body are provided with:

a plurality of locking caster wheels at lower ends thereof; and a plurality of leveling feet at the lower ends thereof.

As an improvement:

A side wall frame is disposed between the storage cabinet body and control cabinet body exterior to the passageway.

Two guide channels are formed on each inner sidewall of the side wall frame, vertically spaced.

A downwardly arcuate end slot inclined toward the storage cabinet body is formed at a lower end of each guide channel.

A passageway partition plate is disposed within the side wall frame.

Guide rollers are rotatably mounted at upper and lower ends of opposite sides of the passageway partition plate.

The guide rollers are rollingly engaged with corresponding guide channels.

A second electric linear actuator is mounted on an inner wall of the control cabinet body.

A push frame is rotatably coupled to a lower end of the second electric linear actuator.

A lower end of the push frame is detachably secured to the passageway partition plate via bolts.

Advantages of the Present Invention Compared to Prior Art:
1. Equipped with a refrigeration system capable of cooling the inner cabinet body (#6) to −18° C. Rapid freezing preserves freshness of fruit cups, ensures hygiene safety, maintains optimal taste fidelity, and minimizes product spoilage;
2. The spring-loaded shelving system features an economically efficient spiral spring design with mature technology, ensuring stable equipment operation. Each spring incorporates a shelf assembly that supports products, converting cup-to-tray contact from surface contact to line contact. This effectively prevents condensate formation caused by temperature differentials during restocking, eliminating ice adhesion that could freeze fruit cups in cryogenic environments and cause mechanical failures;
3. The lifting mechanism positions the product transfer assembly before the target spring-loaded shelf tier to catch ejected products. It then aligns with the passageway (#9). The second electric linear actuator (#156) retracts to open the passageway partition plate (#154), allowing the product transfer assembly to deliver products through the passageway to the product retrieval chamber (#8). The first electric linear actuator (#112) lowers the product access door panel (#111) to open the product outlet (#109), enabling product retrieval from the product retrieval chamber;
4. The mixing mechanism not only blends contents within fruit cups but also enables vertical reciprocation of the mixing motor. This facilitates repeated up/down motion of blades at the mixing shaft tip, enhancing fruit slurry agitation efficiency and achieving homogeneous pulverization of frozen pulp;
5. The lower mixing drum includes a silicone protective cover (#85) that seals the cup rim during descent, preventing liquid spillage during blending
6. The linkage design of the cup holder frame, cleaning rack, and load cell operates as follows:

When a fruit cup is placed in the cup holder, the fifth servomotor rotates, driving the cup holder frame toward the load cell via the toothed belt connecting two first transmission gears. Motion ceases when the aperture in the cup holder aligns vertically above the load cell.

The sixth servomotor then activates, rotating the first leadscrew through the third gearbox. This raises the nut and sleeve, elevating the fruit cup via the load cell. Weight measurement commences. Water or other ingredients are dispensed into the fruit cup. The load cell provides real-time weight feedback to the control system. Dispensing automatically terminates when preset ingredient quantities are reached, achieving precise dosing;

A reverse-pumping procedure retracts residual material from delivery tubes, eliminating pipeline residue and addressing freshness concerns in non-refrigerated sections.

Post-dispensing, the sixth servomotor lowers the load cell. The fifth servomotor drives the cup holder frame toward the cleaning rack. The cleaning rack is pushed rearward until the fruit cup centers below the mixing device. The mixing device descends, blends the beverage, and retracts. The fifth servomotor reverses, resetting the cup holder frame. Consumers retrieve the blended beverage;

Compartmentalized Design:
The cup holder frame, cup holder station, and mixing zone are physically segregated. This prevents contamination of blades and the silicone protective cover by users or environment. Users cannot contact blades. Before access door closure, the silicone cover and blades remain within the cleaning zone, ensuring their protection.

7. Magnets are cooperatively disposed on the rear inner wall of the cleaning rack and the rear end of the cup holder frame. Thus, when the cup holder frame resets, it drives the cleaning rack forward. When the drain tray aligns vertically below the mixing device, the cleaning rack contacts limit features at the central portion of the lower housing's inner sidewalls. The limit features block further movement, separating the cup holder frame and cleaning rack. The mixing device descends to its lowest position, compressing the silicone protective cover onto the drain tray. The drain pipe sprays water, cleaning the silicone cover interior and blades. Post-cleaning, wastewater discharges through the drain pipe into a waste collection tank;
8. The control cabinet body houses a refrigerator unit containing multiple peristaltic pumps. A small electric storage water heater and water storage tank enable water/juice dispensing, accommodating diverse flavor preferences. Hot water from the heater facilitates warm beverage preparation and enhances cleaning efficacy for the silicone cover and blades;
9. Electronic scales mounted on the control cabinet base support water storage tanks. Weight measurements determine water inventory levels and provide precise feedback;
10. Modular design is implemented throughout the machine, facilitating maintenance, manufacturing, and cost reduction;
11. The self-service payment terminal incorporates a multi-payment module compatible structure, adapting to various payment methods for user convenience.

BRIEF DESCRIPTION OF THE DRAWINGS

As shown in FIG. 1-42:

Figure 1:
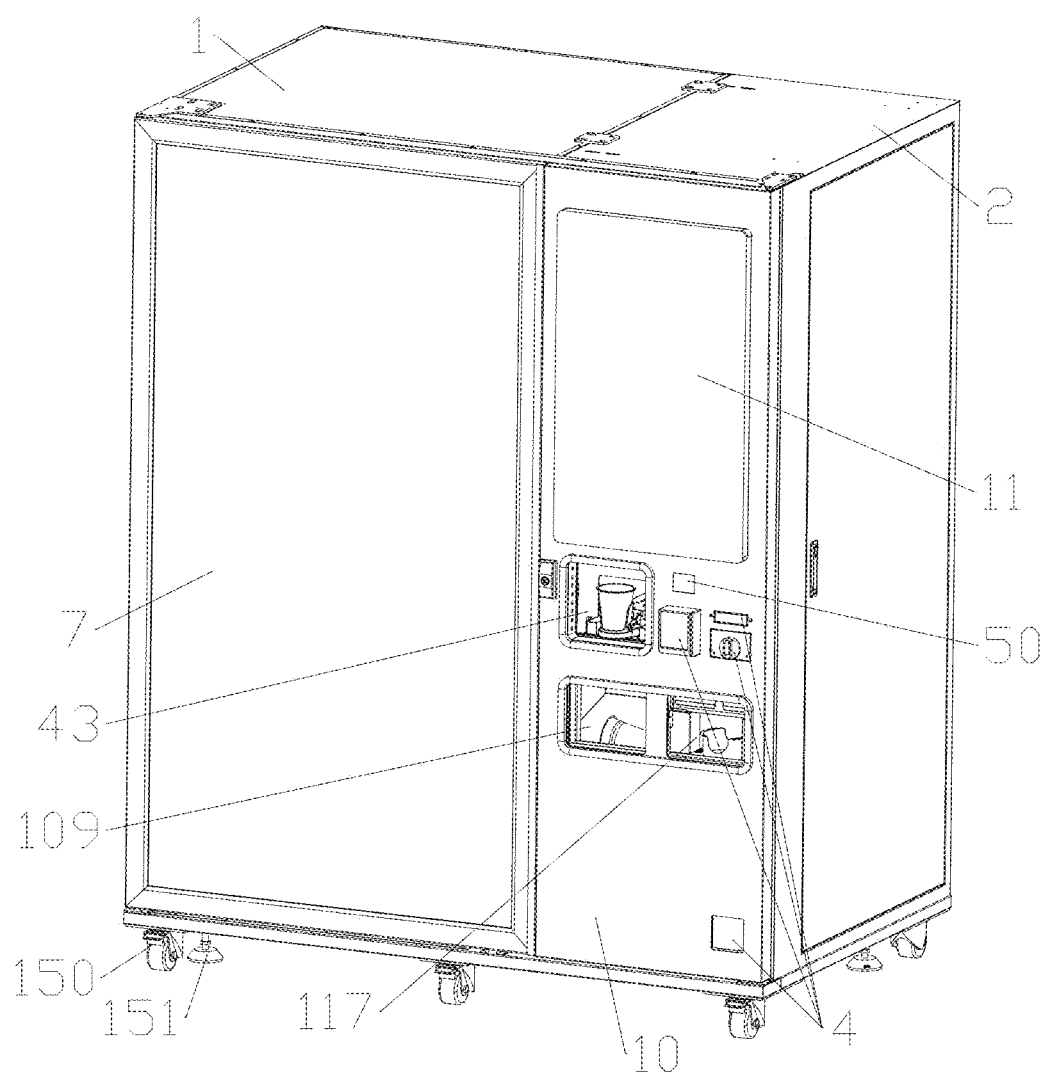
FIG. 1 Front perspective schematic diagram of the self-stirring fruit cup smoothie vending machine.

1. Storage Cabinet Body
2. Control Cabinet Body
3. Refrigeration System
4. Self-Service Payment Terminal
5. Refrigerated Compartment
6. Inner Cabinet Body
7. Storage Cabinet Door
8. Product Retrieval Chamber
9. Passageway
10. Control Cabinet Door
11. Touchscreen
12. First Servomotor
13. Transverse Bracket
14. Side Bracket
15. Slide Rail
16. Rotating Shaft
17. Toothed Belt
18. Sliding Block
19. Mounting Base
20. First Gear
21. Clamping Plate
22. Motor Mount
23. Second Gear
24. Conveyor Belt Assembly
25. Support Bracket
26. Carrier Bracket
27. Shelf Assembly
28. Spring
29. Second Servomotor
30. First Gearbox
31. Rail Frame
32. Slot
33. Disk
34. Insertion Slot
35. Guard Rail
36. First Roller
37. Second Roller
38. Trapezoidal Frame
39. Rear Bracket
40. Protective Housing
41. Access Opening
42. Door Frame
43. Access Door
44. Fourth Servomotor
45. Second Drive Gear
46. Second Driven Gear
47. Second Rotating Shaft
48. Fourth Driven Gear
49. Third Rail
50. Barcode Scanner
51. Lower Housing
52. Upper Housing
53. Cup Holder Frame
54. Cleaning Rack
55. Load Cell
56. Mixing Controller
57. Through-Hole
58. Sliding Slot
59. First Transmission Gear
60. Fifth Servomotor
61. Second Transmission Gear
62. Third Transmission Gear
63. Retention Clip
64. Cup Holder
65. Aperture
66. Internal Bracket
67. Third Gearbox
68. Sixth Servomotor
69. First Leadscrew
70. Nut
71. Sleeve
72. Support Plate
73. Sliding Tube
74. Guide Rod
75. Limit Pull Bracket
76. Drain Tray
77. Drain Pipe
78. Limiter
79. Magnet
80. Mounting Plate
81. Mixing Motor
82. Upper Mixing Drum
83. Lower Mixing Drum
84. Seventh Servomotor
85. Silicone Protective Cover
86. Mixing Hole
87. Spring Seat
88. Disk Plate
89. Guide Block
90. Adjustment Slot
91. Threaded Hole
92. Second Leadscrew
93. Third Gear
94. Mixing Shaft
95. Fourth Gear 96. Fifth Gear
97. Small Electric Storage Water Heater
98. Water Storage Tank
99. Refrigerator Unit
100. Peristaltic Pump
101. Electronic Scale
102. Access Door
103. PC Module
104. Control Box
105. Power Button
106. Main Power Switch
107. Temperature Controller
108. Control Button
109. Product Outlet
110. First Rail
111. Product Access Door Panel
112. First Electric Linear Actuator
113. First Perforated Support Bracket
114. First Push Rod
115. First Pressure Plate
116. First Relay
117. Cup Dispensing Port
118. Base Frame
119. Outer Casing
120. Third Servomotor
121. First Leadscrew
122. First Nut Carriage
123. Mounting Frame
124. Second Gearbox
125. First Lower Gear
126. Interconnecting Gear
127. Second Lower Gear
128. Tray
129. Connecting Plate
130. Slide Channel
131. Rear Door
132. Arcuate Top Cover
133. Straw Storage Dispenser
134. Straw Dispensing Slot
135. Curved Support Plate
136. Top Cover
137. Infrared Sensor
138. Door Frame Assembly
139. Straw Access Door
140. Eighth Servomotor
141. First Drive Gear
142. First Driven Gear
143. First Rotating Shaft
144. Third Driven Gear
145. Second Rail
146. Second Perforated Support Bracket
147. Second Push Rod
148. Second Pressure Plate
149. Second Relay
150. Locking Caster Wheel
151. Leveling Foot
152. Side Wall Frame
153. Guide Channel
154. Passageway Divider
155. Guide Roller
156. Second Electric Linear Actuator
157. Arcuate End Slot
158. Push Frame
159. Sliding Track Channel
160. Tension Spring
161. Ultraviolet Sanitization Lamp
162. Clamping Plate
163. Mounting Hole While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION OF EMBODIMENTS

The embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology. All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Figure 2:
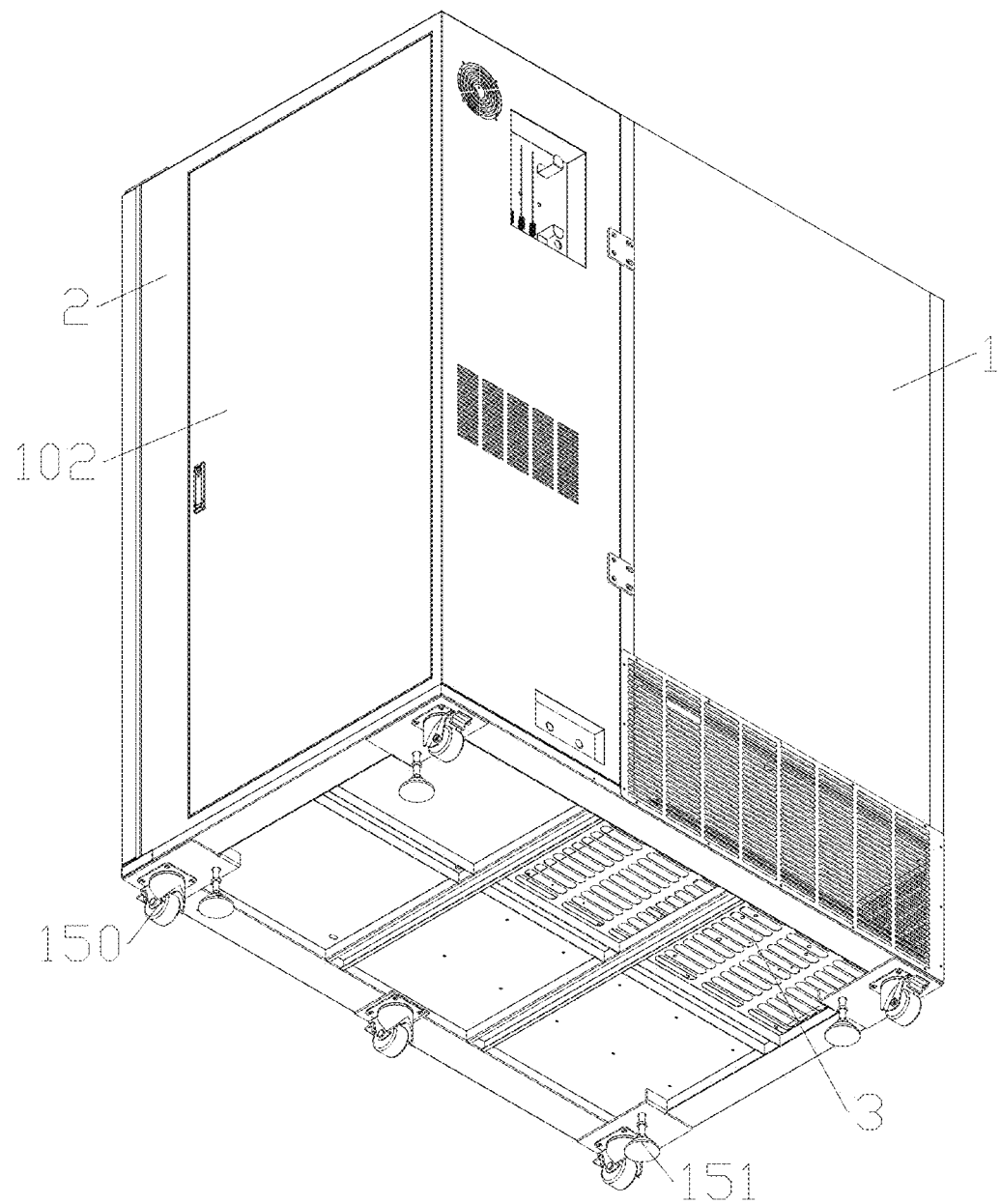
FIG. 2 Rear perspective schematic diagram of the self-stirring fruit cup smoothie vending machine.
Figure 3:
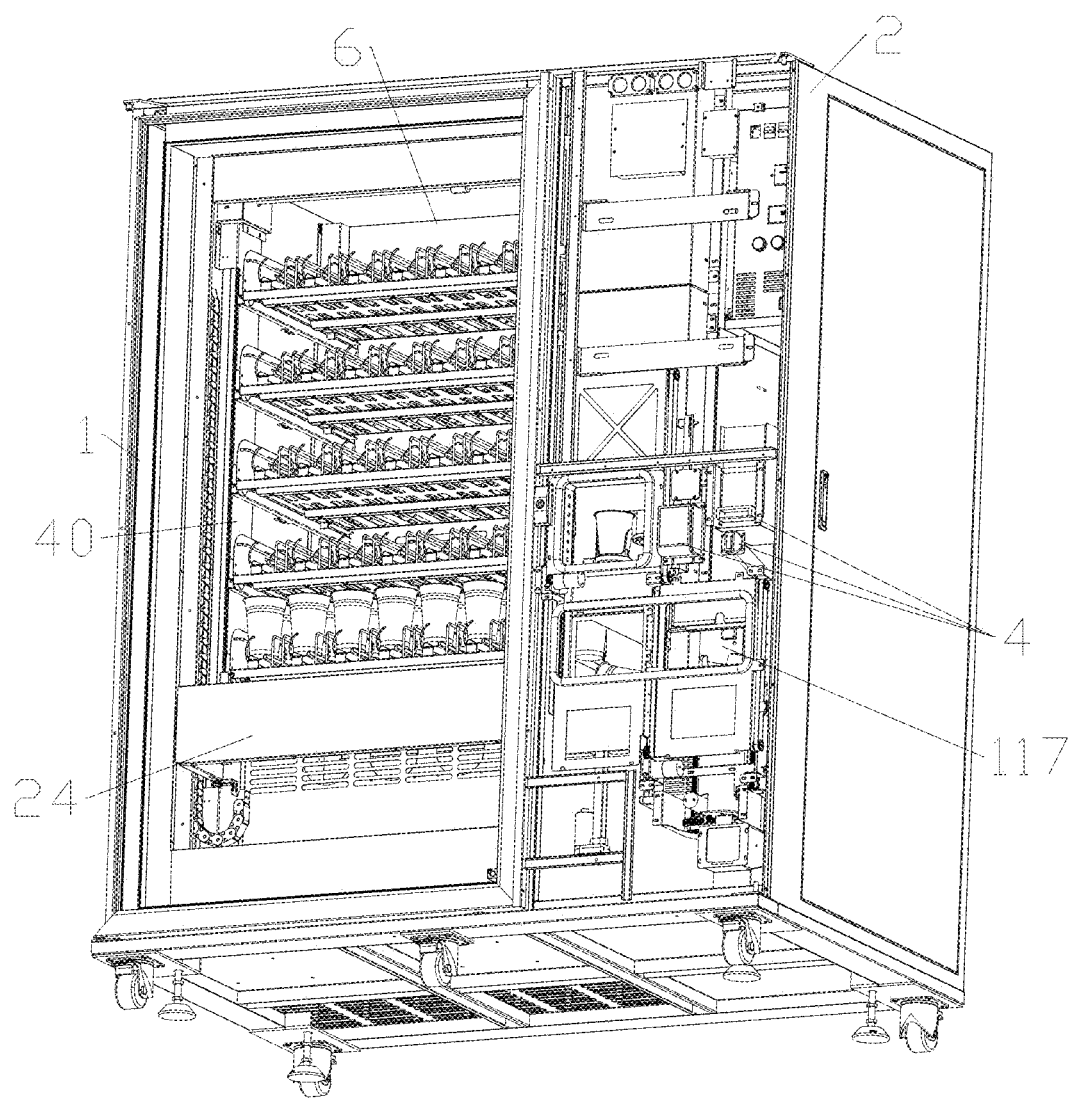
FIG. 3 Internal structure schematic diagram of the self-stirring fruit cup smoothie vending machine.
Figure 4:
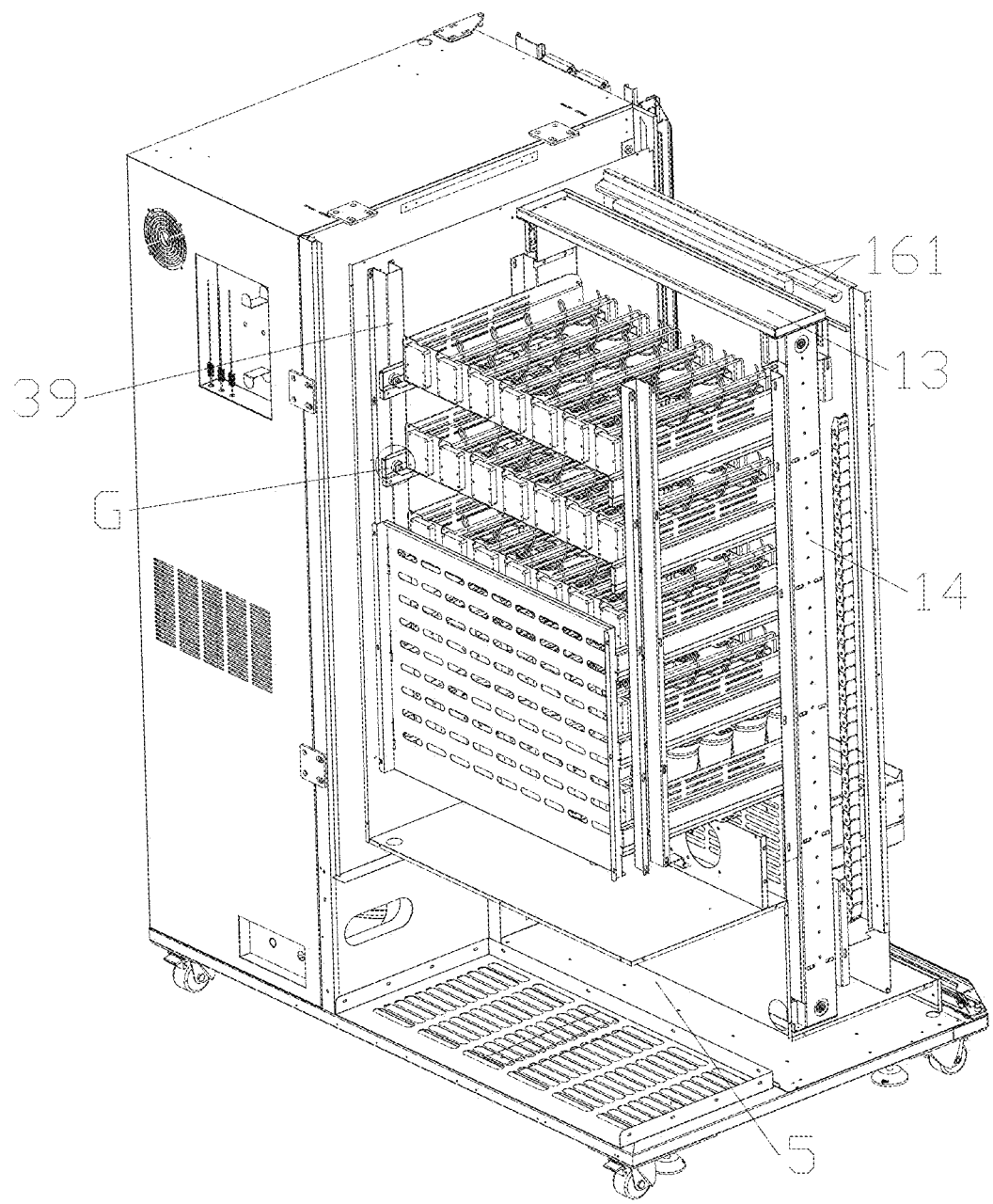
FIG. 4 Internal structure schematic diagram 1 of the inner cabinet body.
Figure 5:
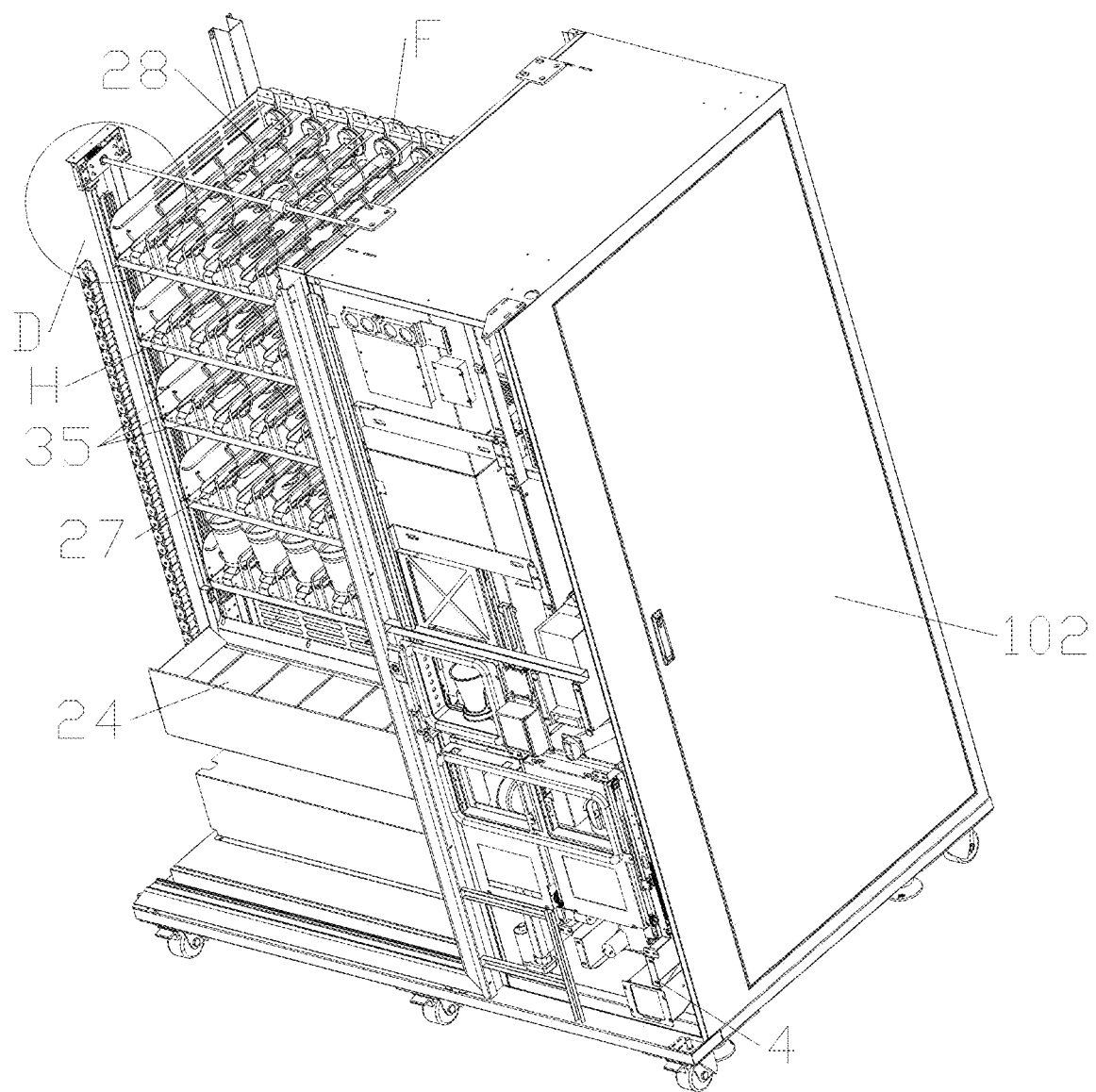
FIG. 5 Internal structure schematic diagram 2 of the inner cabinet body.
Figure 6:
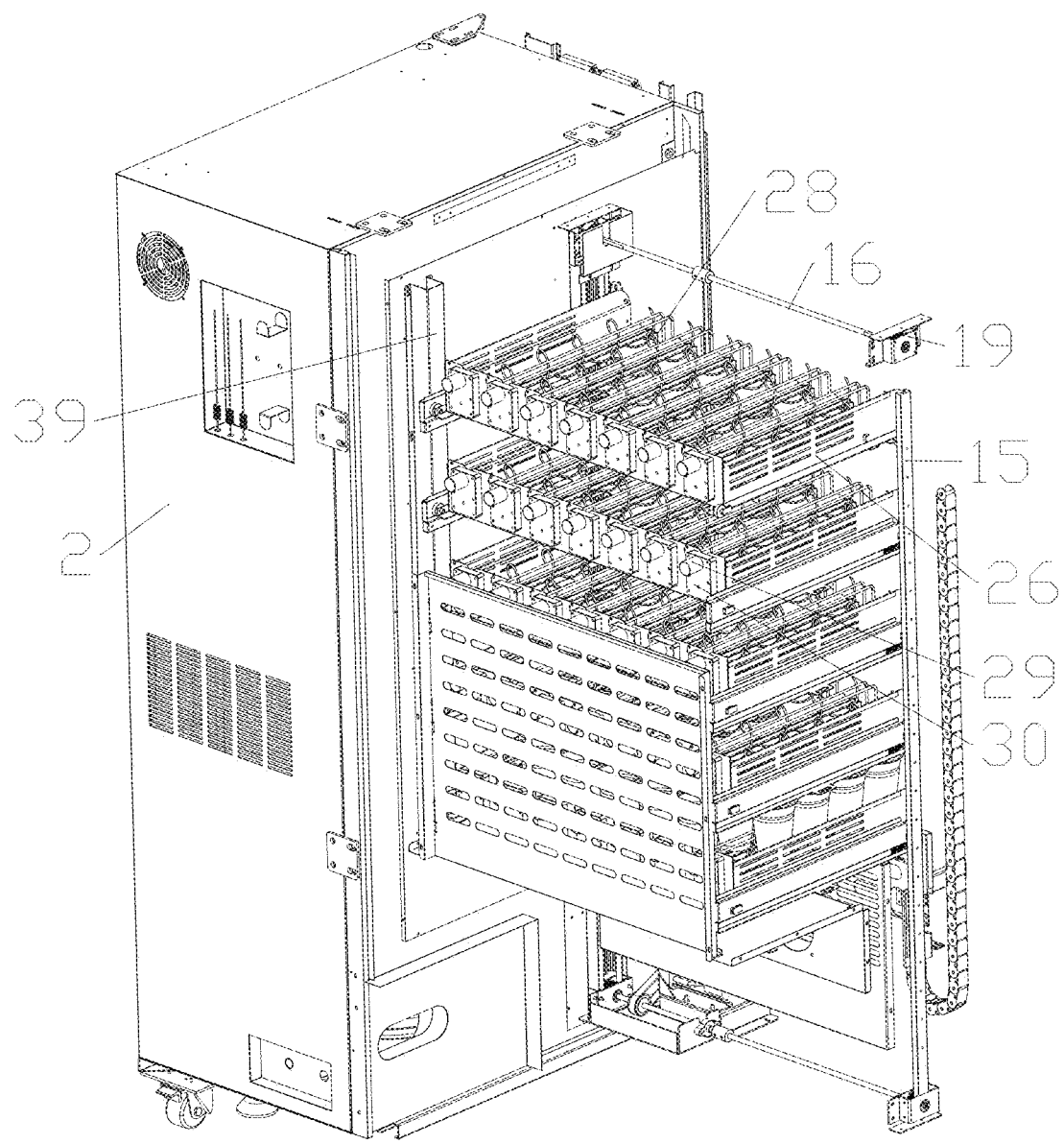
FIG. 6 Internal structure schematic diagram 3 of the inner cabinet body.
Figure 7:
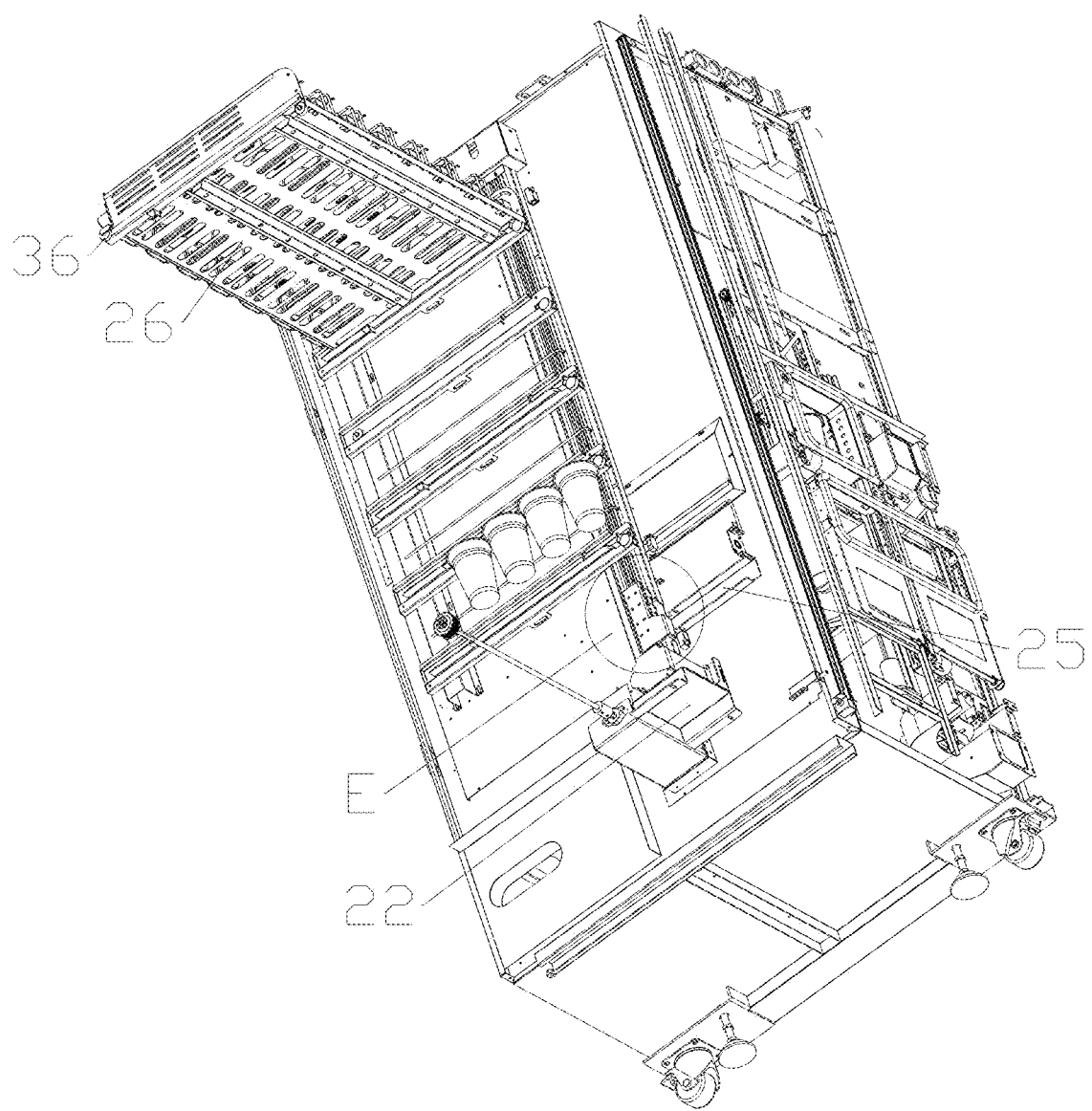
FIG. 7 Internal structure schematic diagram 4 of the inner cabinet body.
Figure 8:
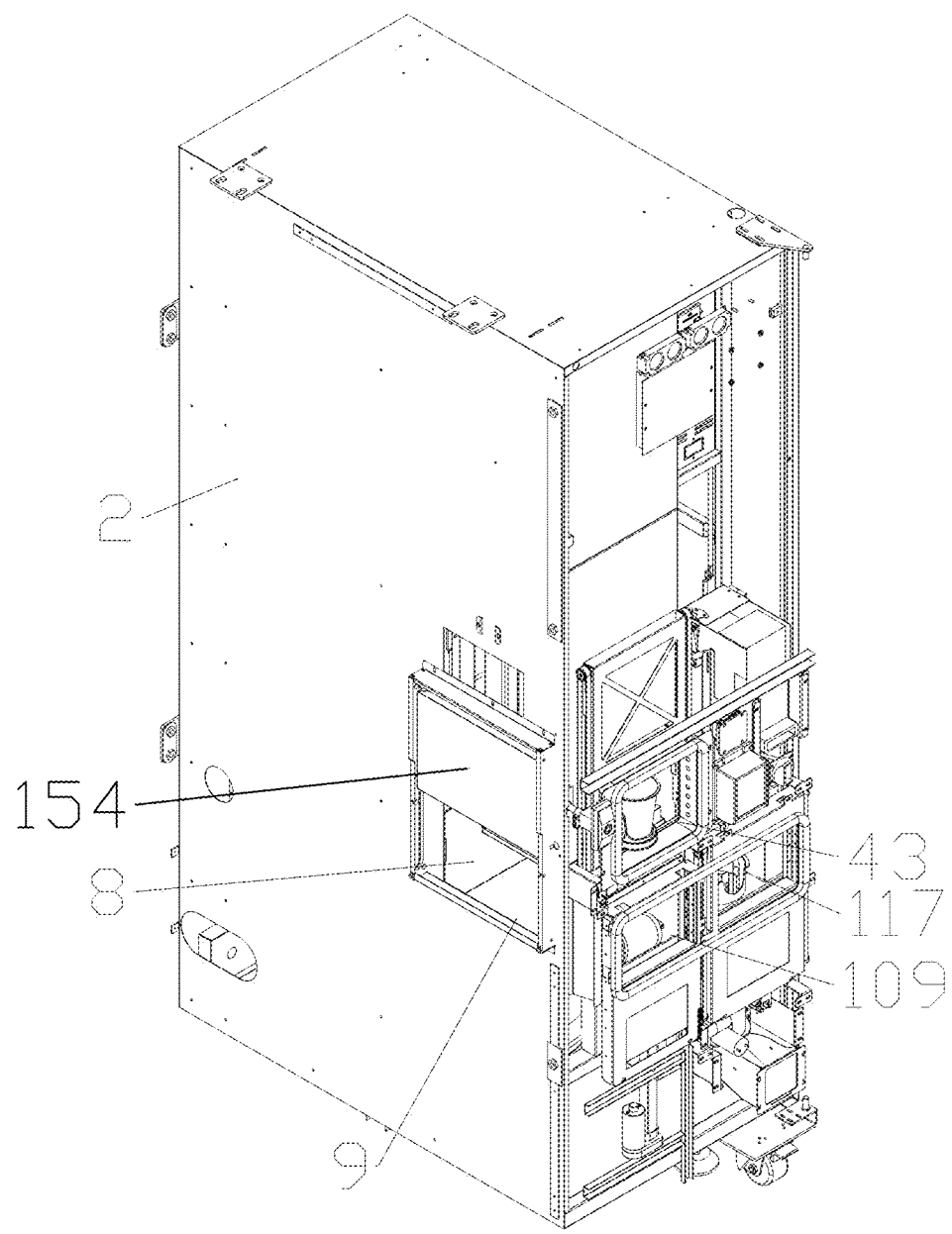
FIG. 8 Structural schematic diagram of the control cabinet body.
Figure 9:
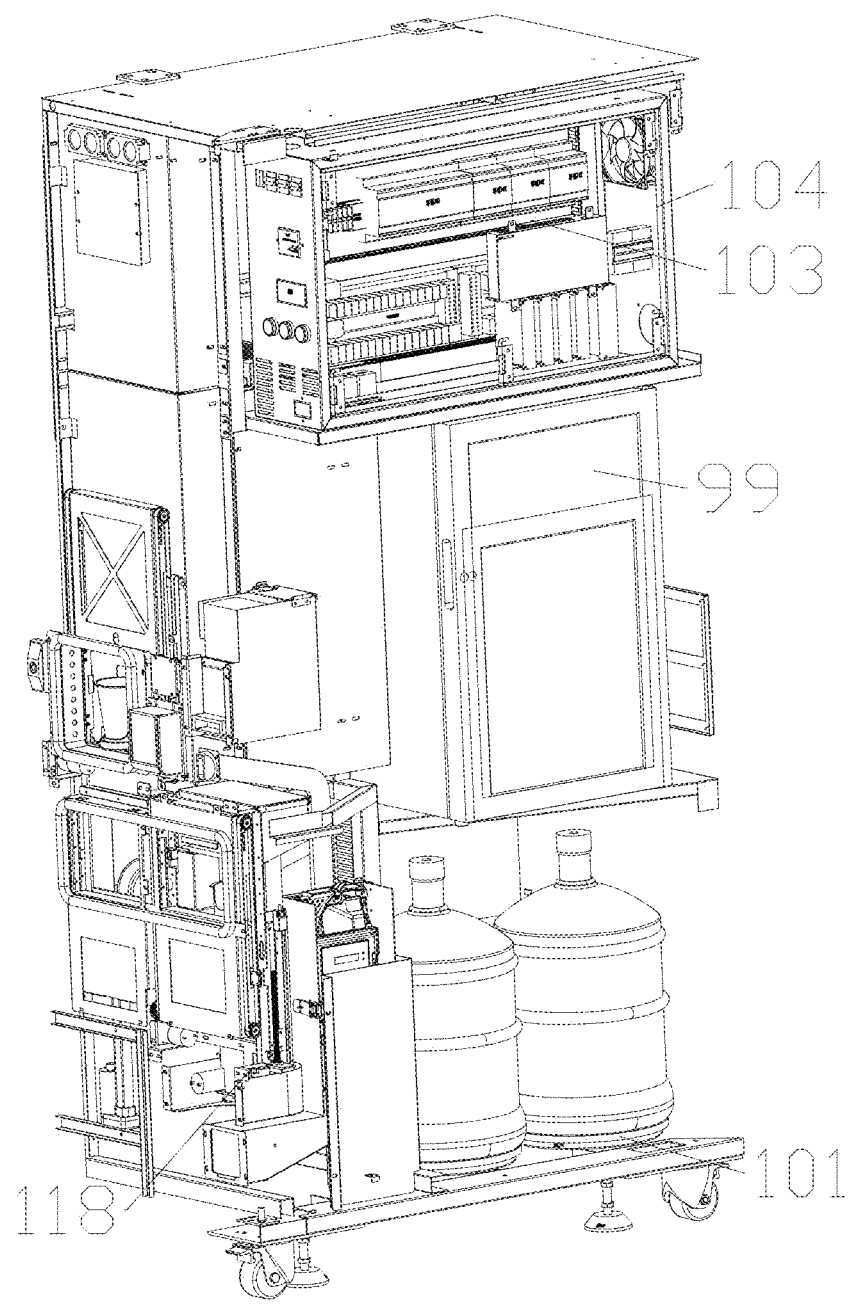
FIG. 9 Internal structure schematic diagram of the control cabinet body.
Figure 10:
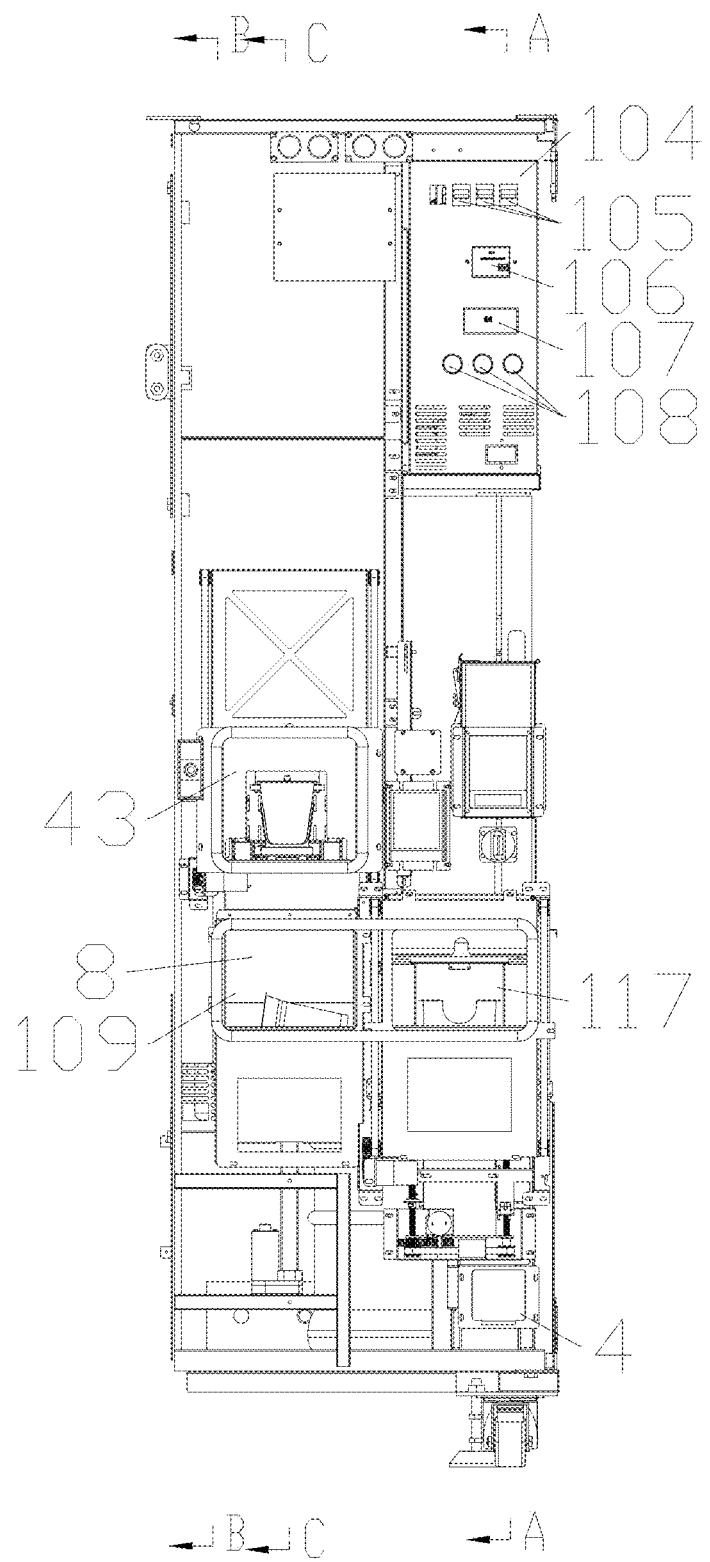
FIG. 10 Structural schematic diagram of the control cabinet body in an exploded state.
Figure 11:
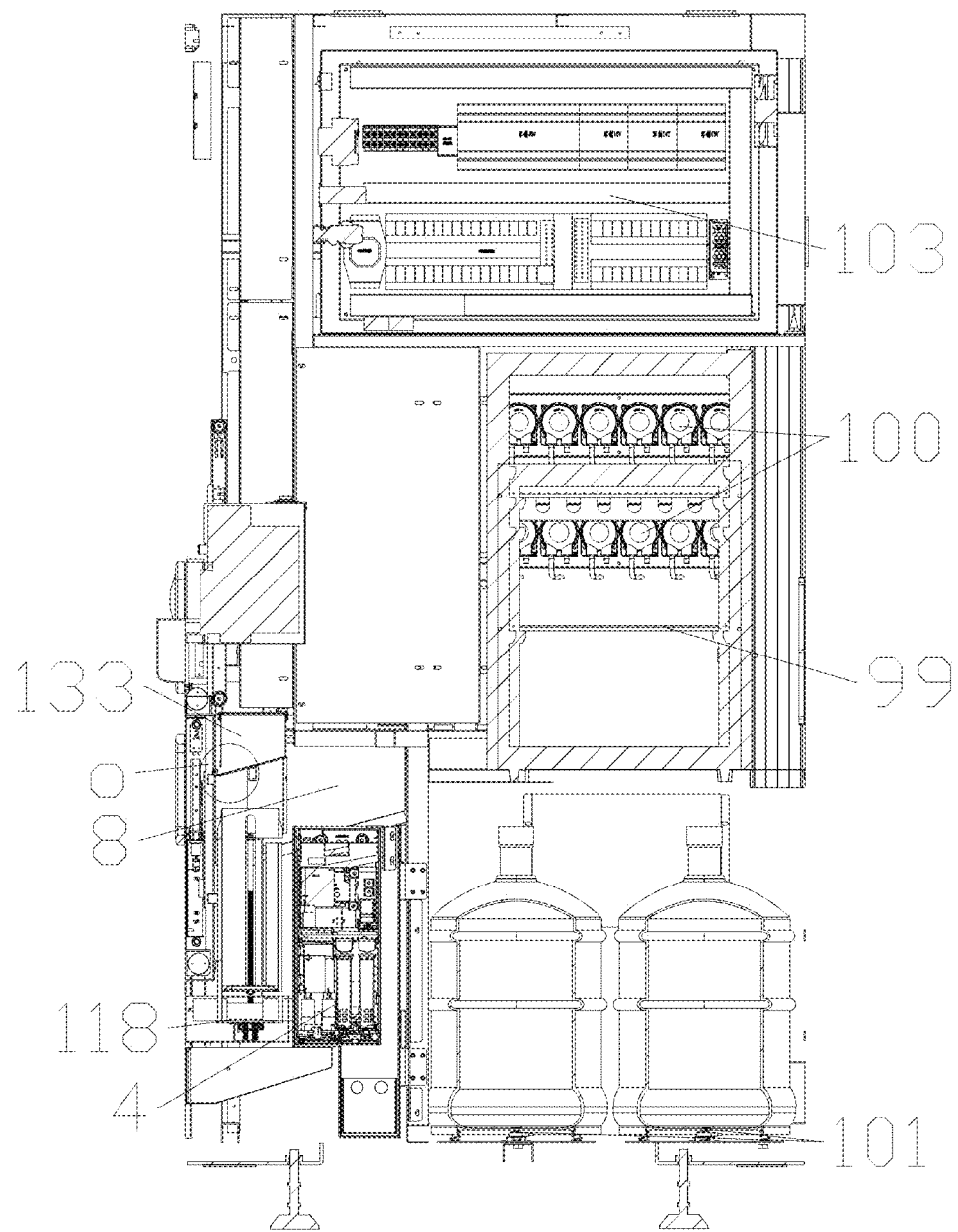
FIG. 11 Cross-sectional view taken along line A-A in FIG. 10.
Figure 12:
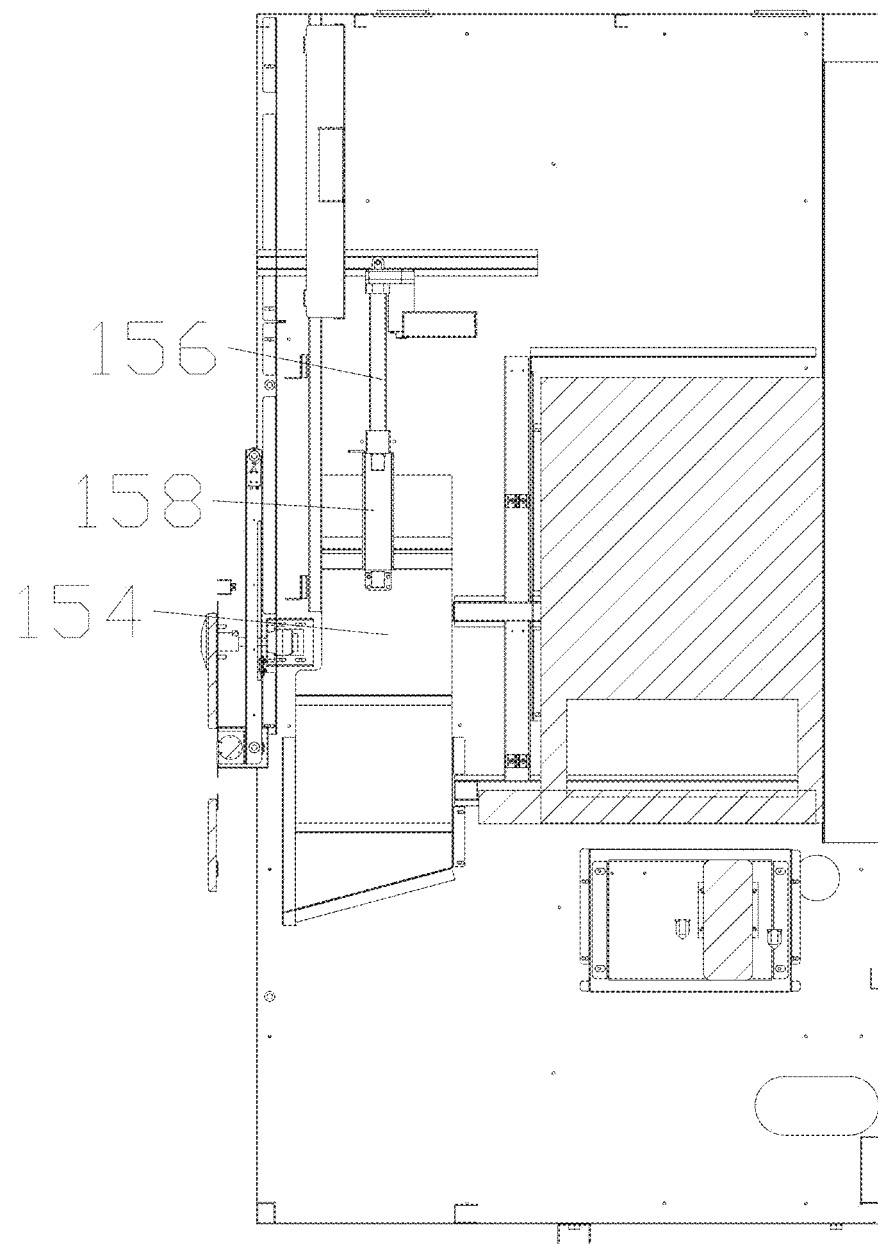
FIG. 12 Cross-sectional view taken along line B-B in FIG. 10.
Figure 13:
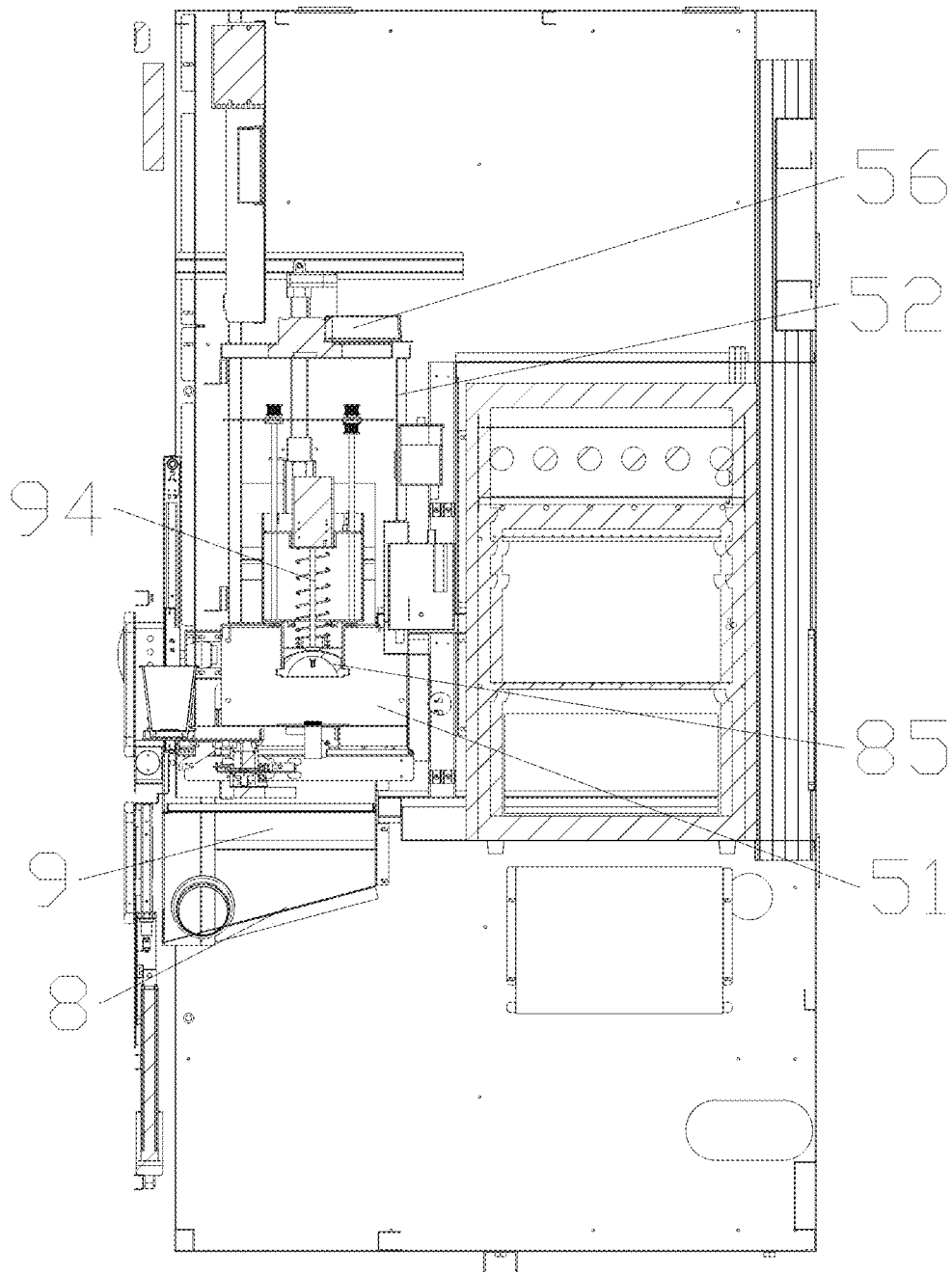
FIG. 13 Cross-sectional view taken along line C-C in FIG. 10.
Figure 14:
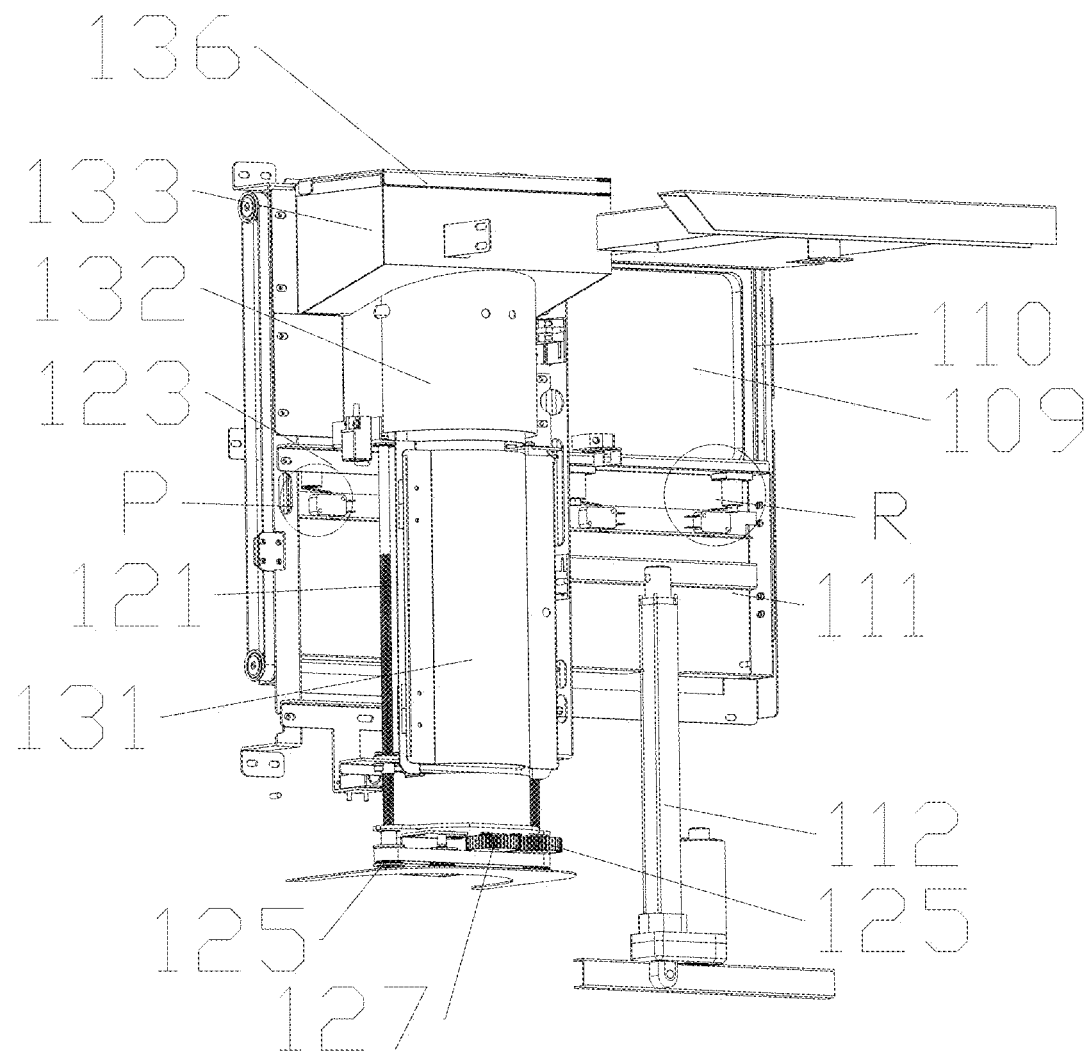
FIG. 14 Structural schematic diagram of the cup access mechanism.
Figure 15:
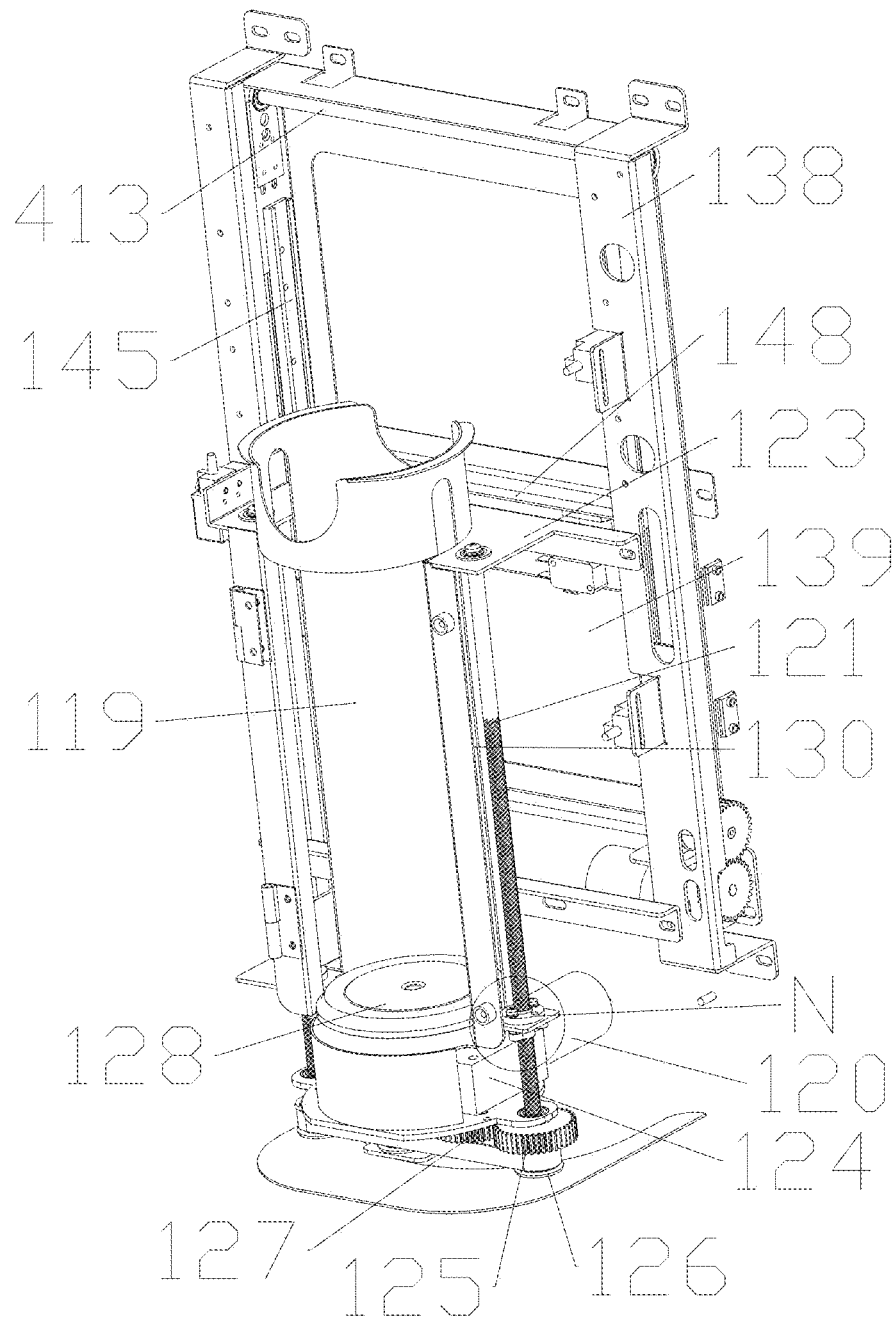
FIG. 15 Structural schematic diagram of the cup access mechanism in an exploded state.
Figure 16:
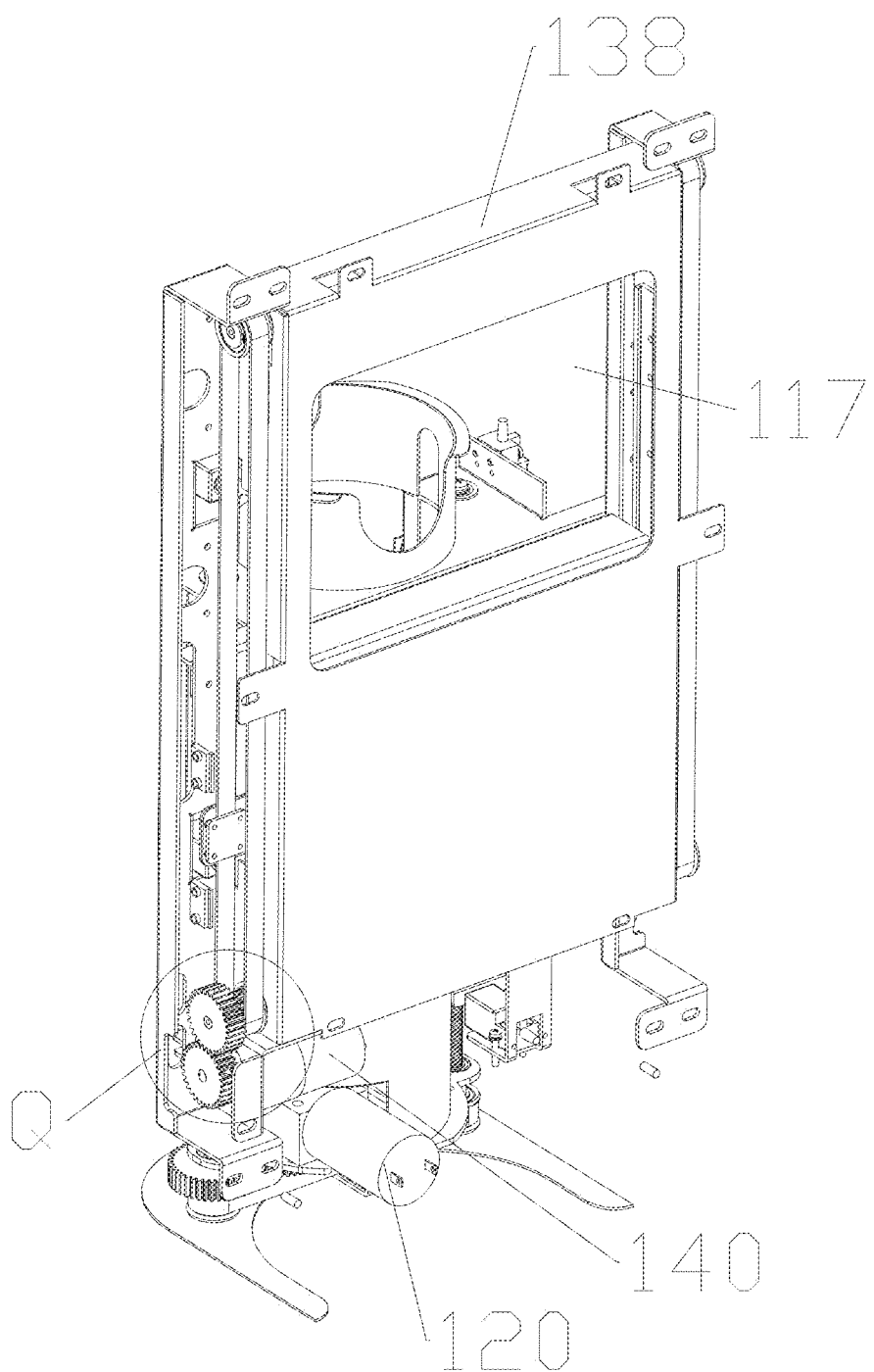
FIG. 16 Structural schematic diagram of the straw access door mechanism.
Figure 17:
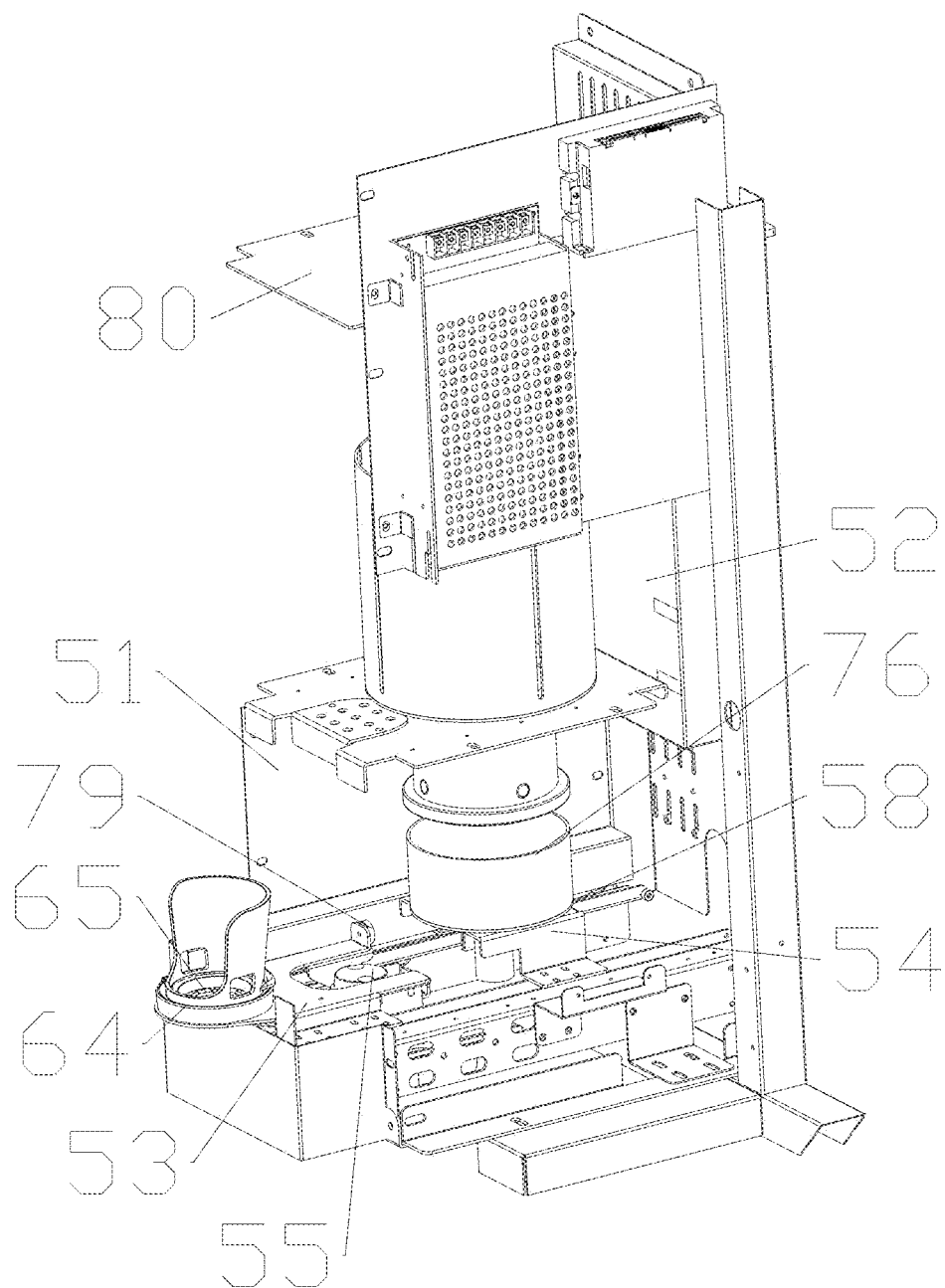
FIG. 17 Internal structure schematic diagram of the mixing mechanism.
Figure 18:
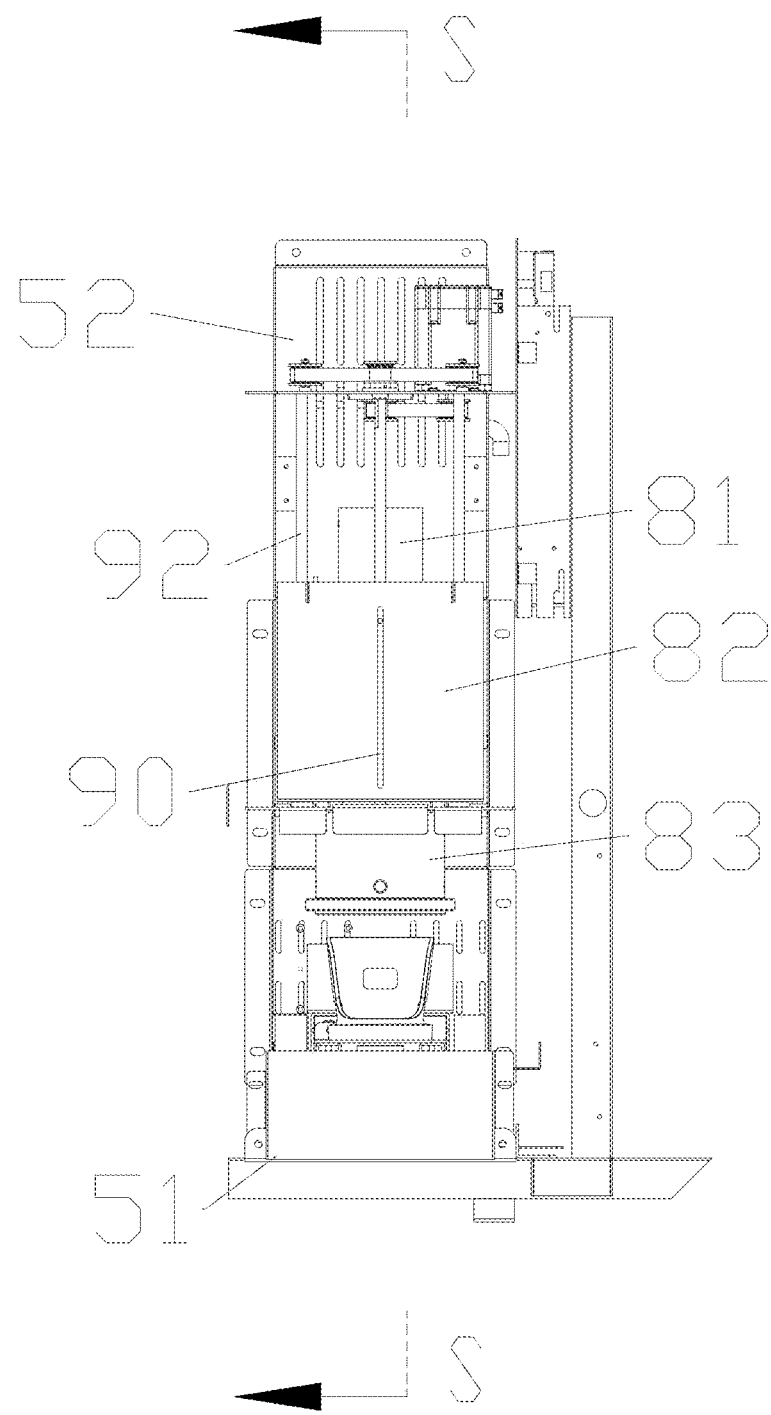
FIG. 18 Front view of the mixing mechanism.
Figure 19:
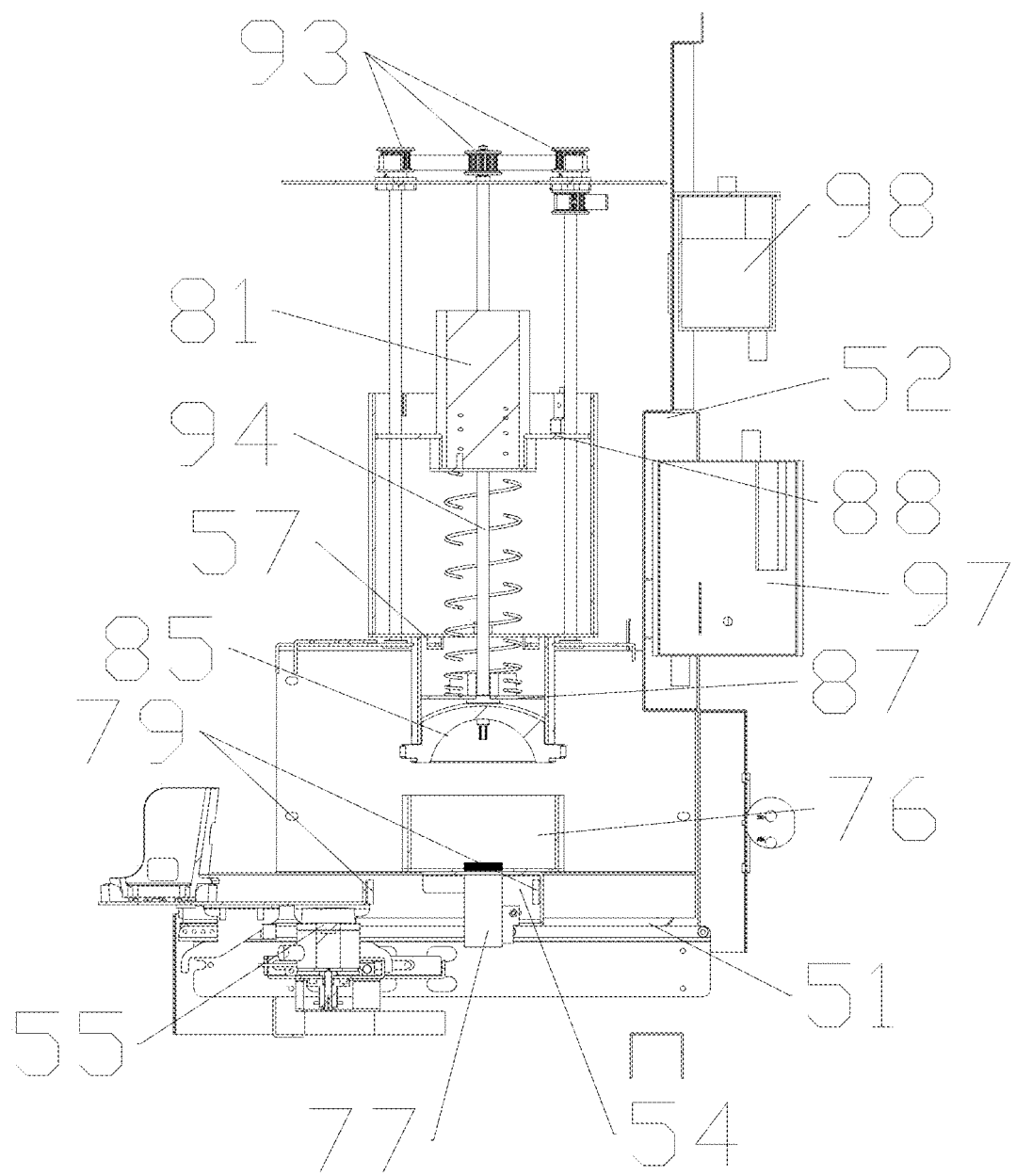
FIG. 19 Cross-sectional view taken along line S-S in FIG. 17.
Figure 20:
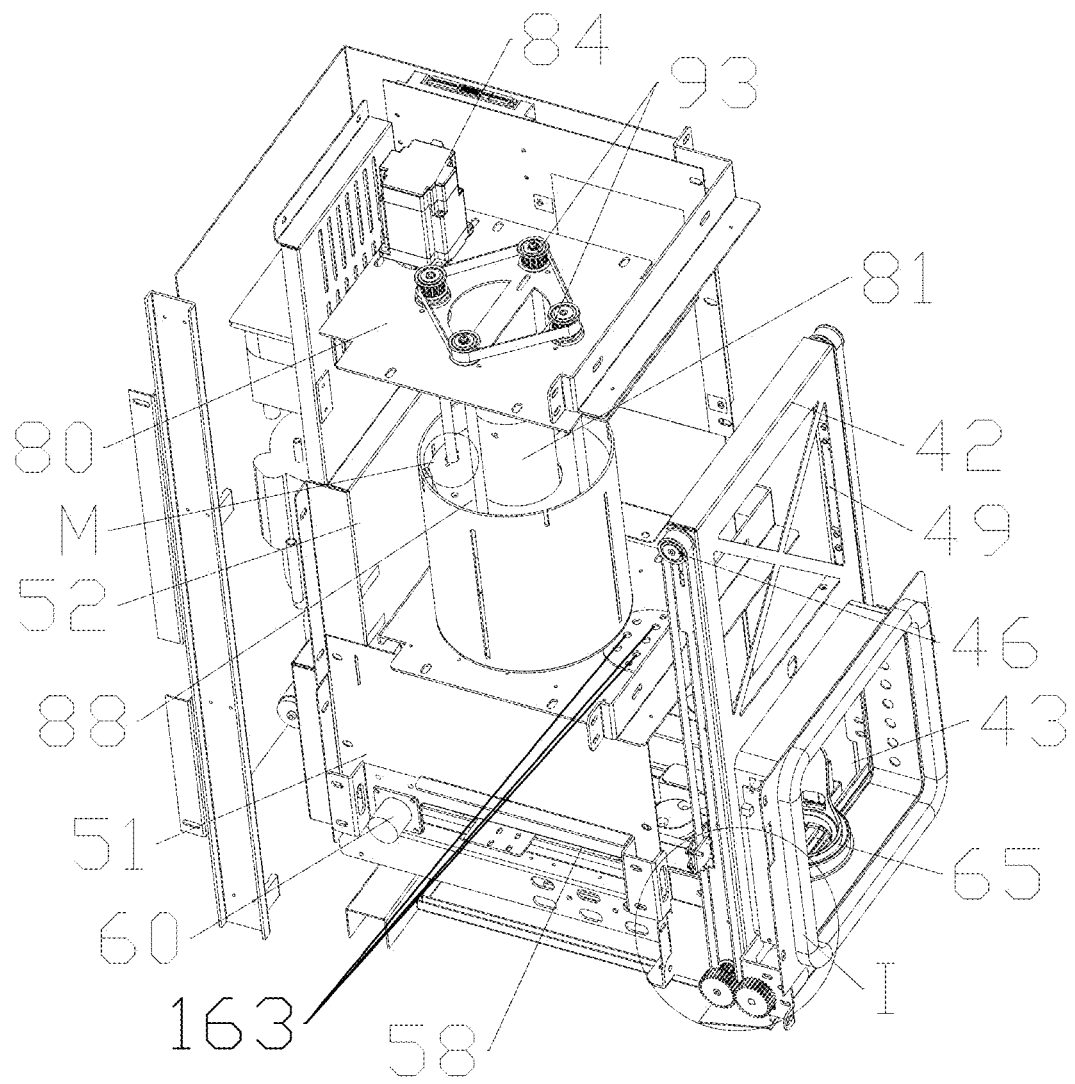
FIG. 20 Perspective structural schematic diagram of the mixing mechanism.
Figure 21:
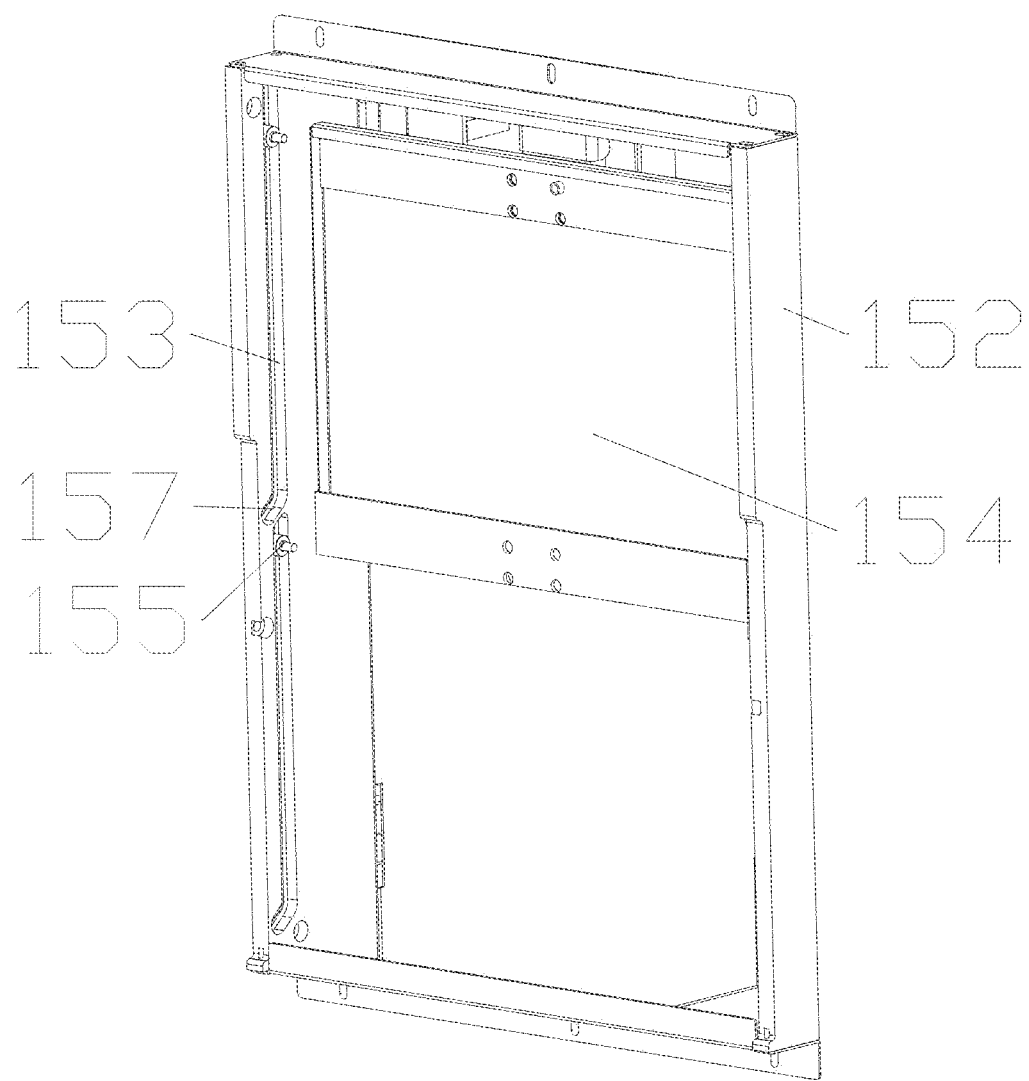
FIG. 21 Structural schematic diagram of the side wall frame and guide channels.
Figure 22:
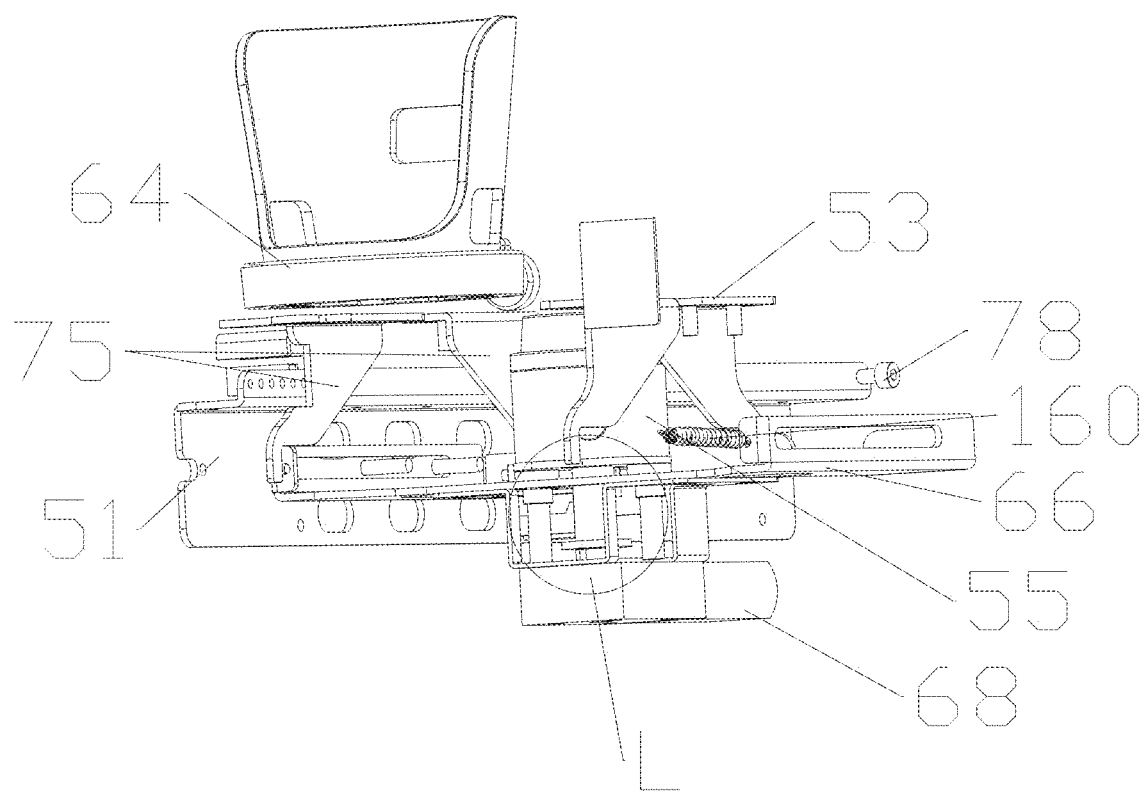
FIG. 22 Structural schematic diagram of the cup holder frame and load cell.
Figure 23:
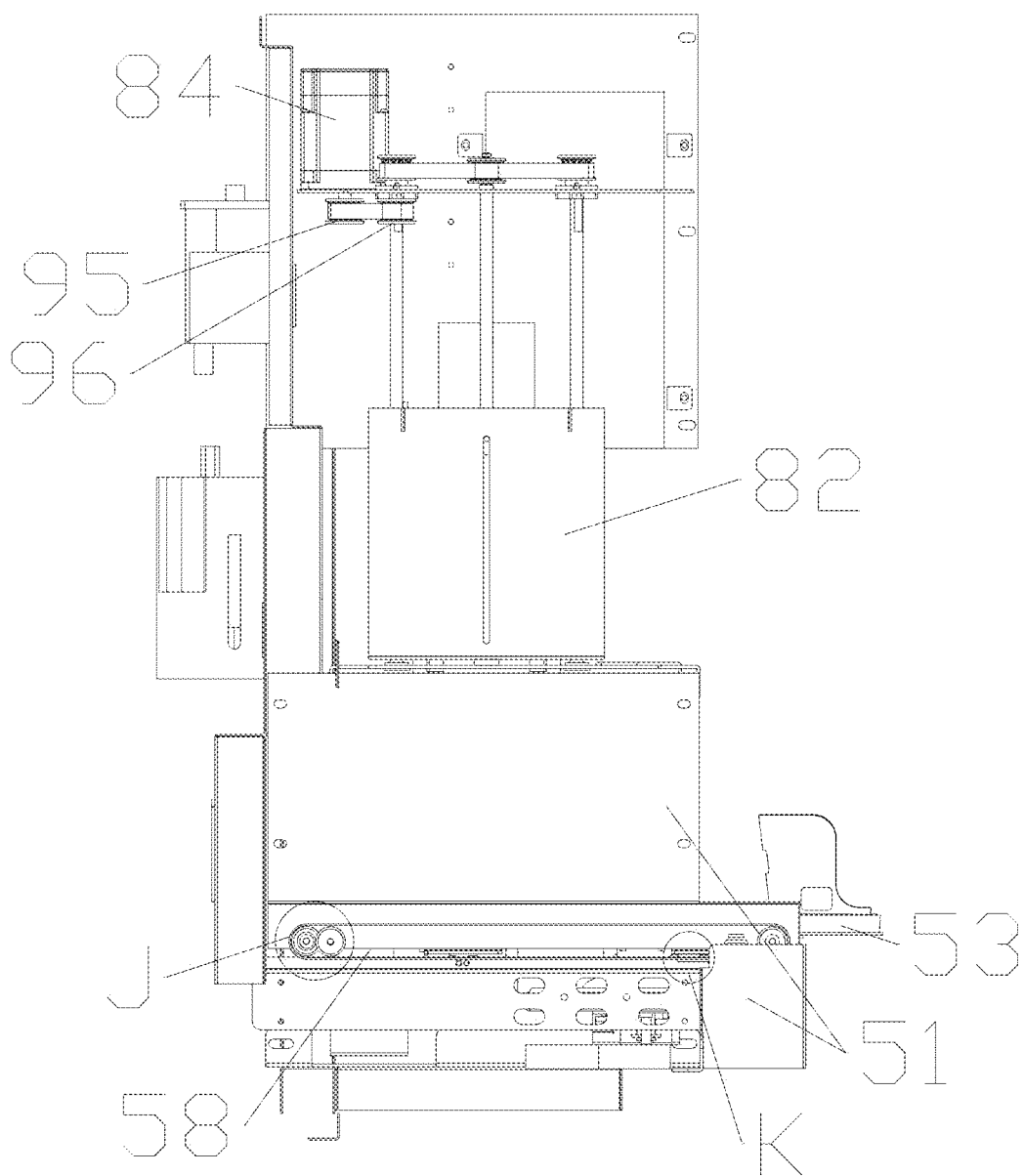
FIG. 23 Side view of the mixing mechanism.
Figure 24:
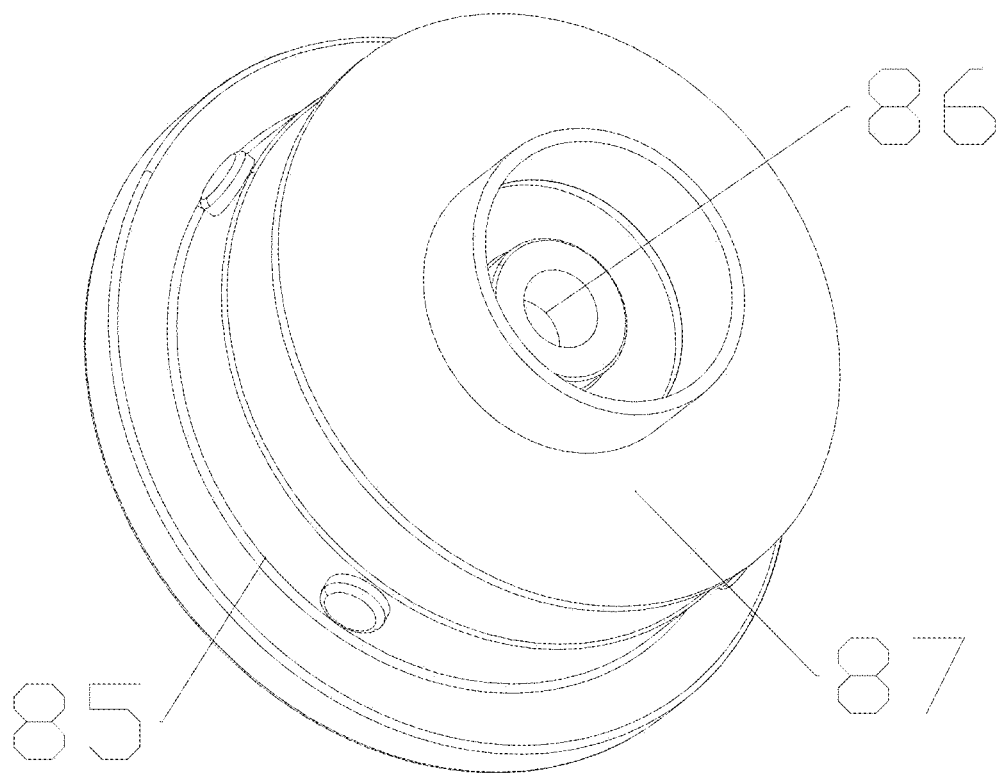
FIG. 24 Structural schematic diagram of the silicone protective cover and spring seat.
Figure 25:
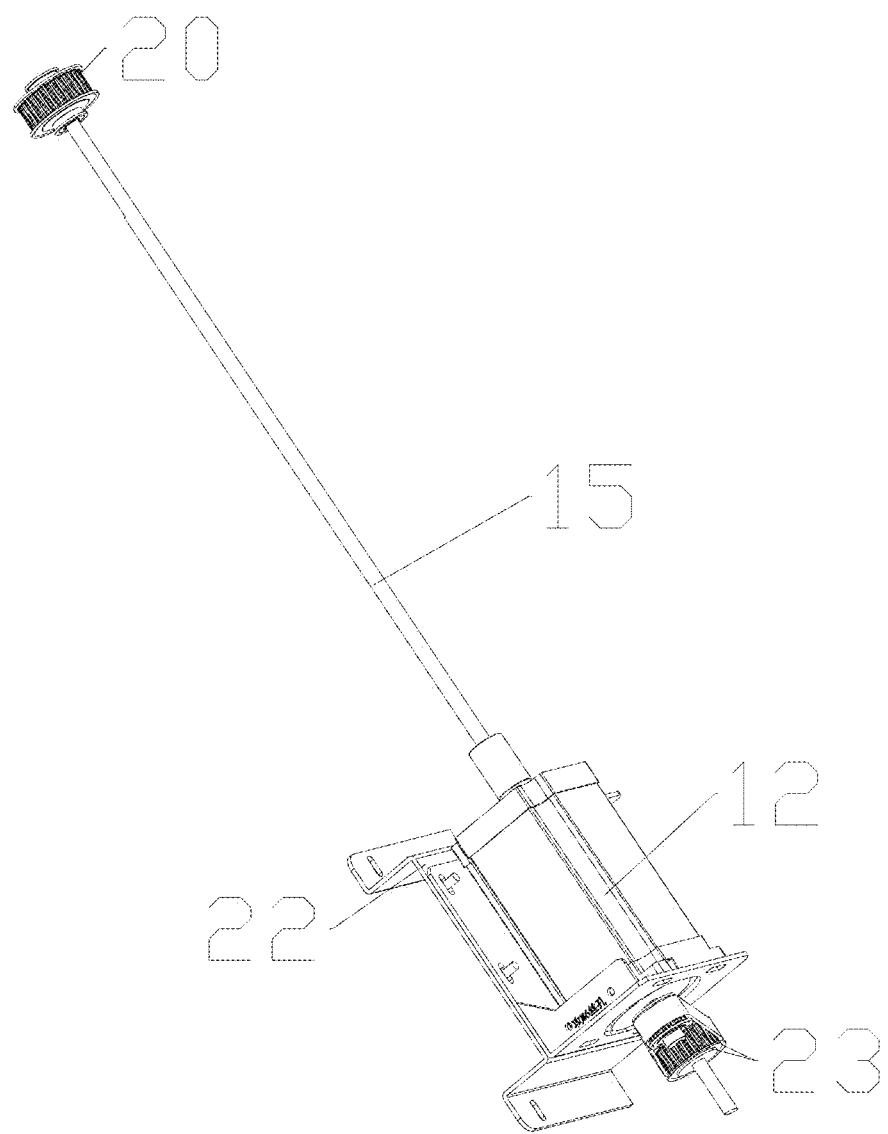
FIG. 25 Structural schematic diagram of the first servomotor and motor mount.
Figure 26:
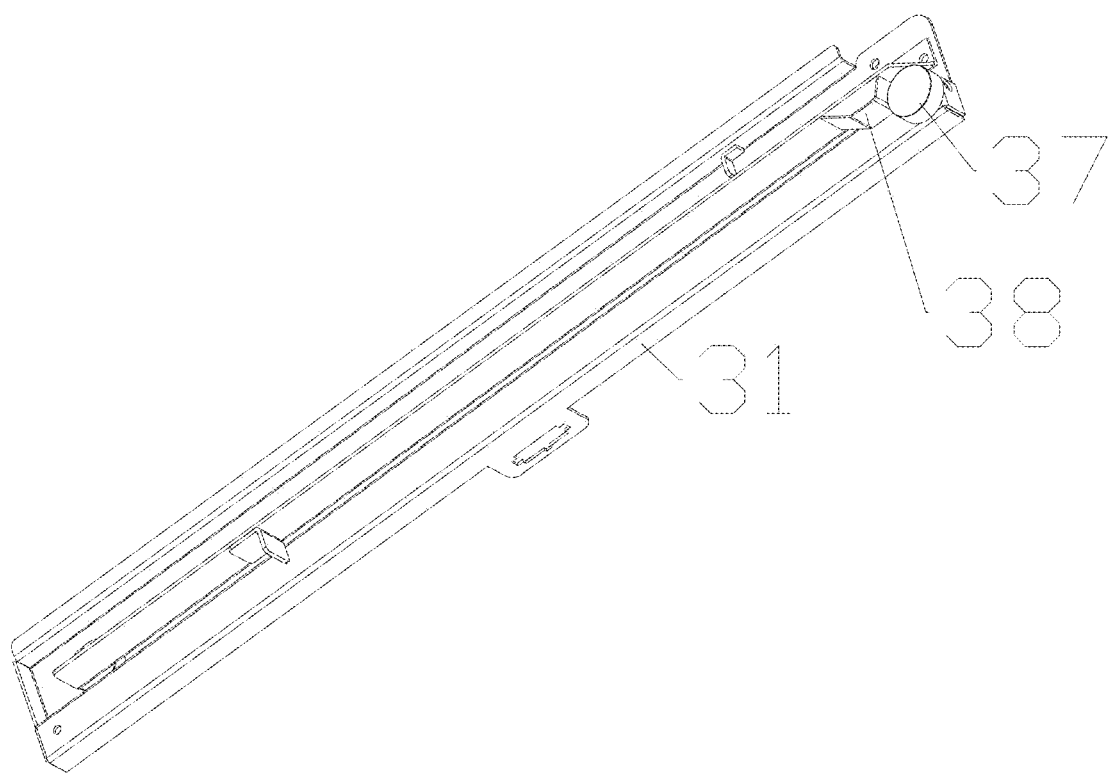
FIG. 26 Structural schematic diagram of the rail frame.
Figure 27:
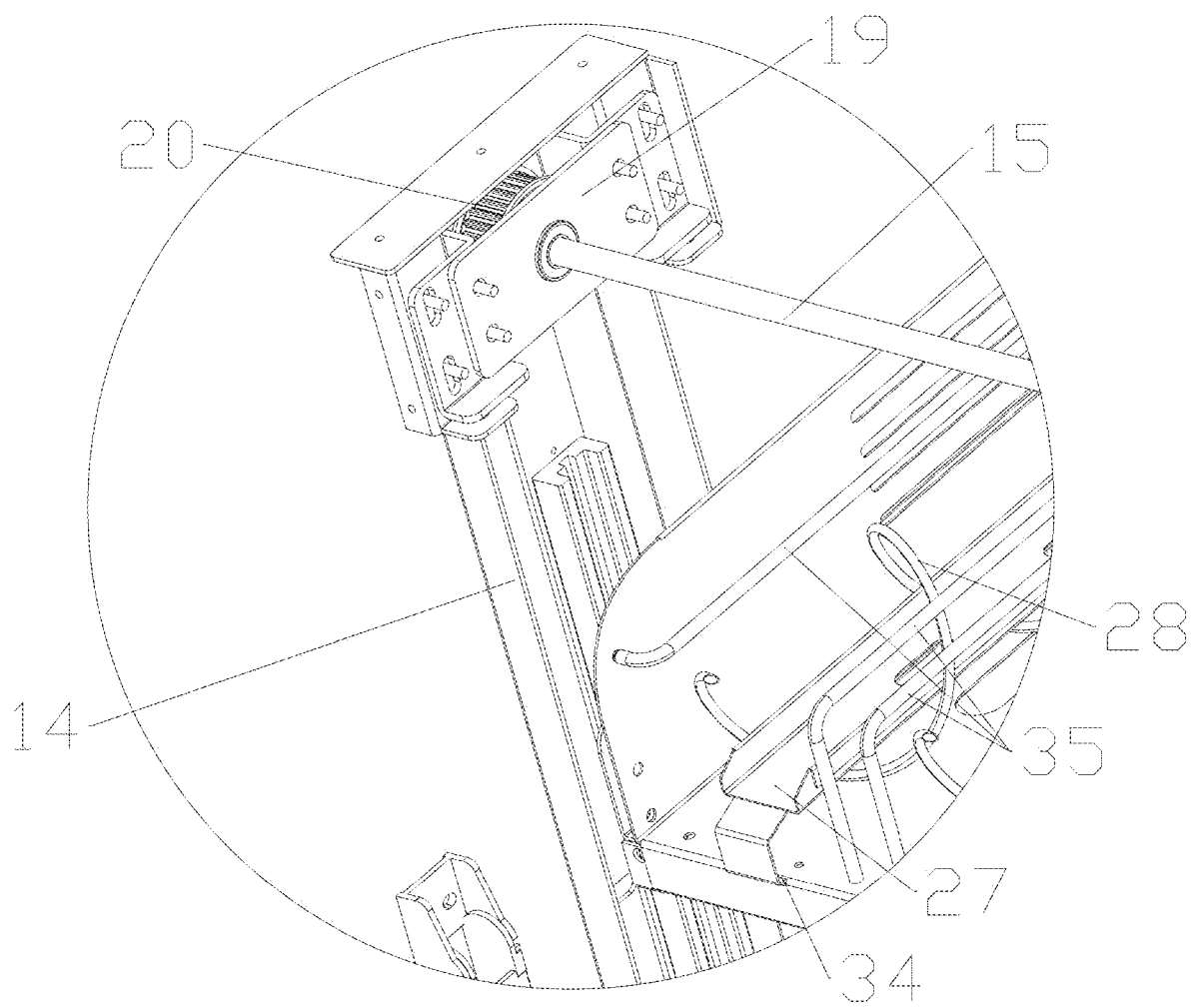
FIG. 27 Partial enlarged view of position D in FIG. 5.
Figure 28:
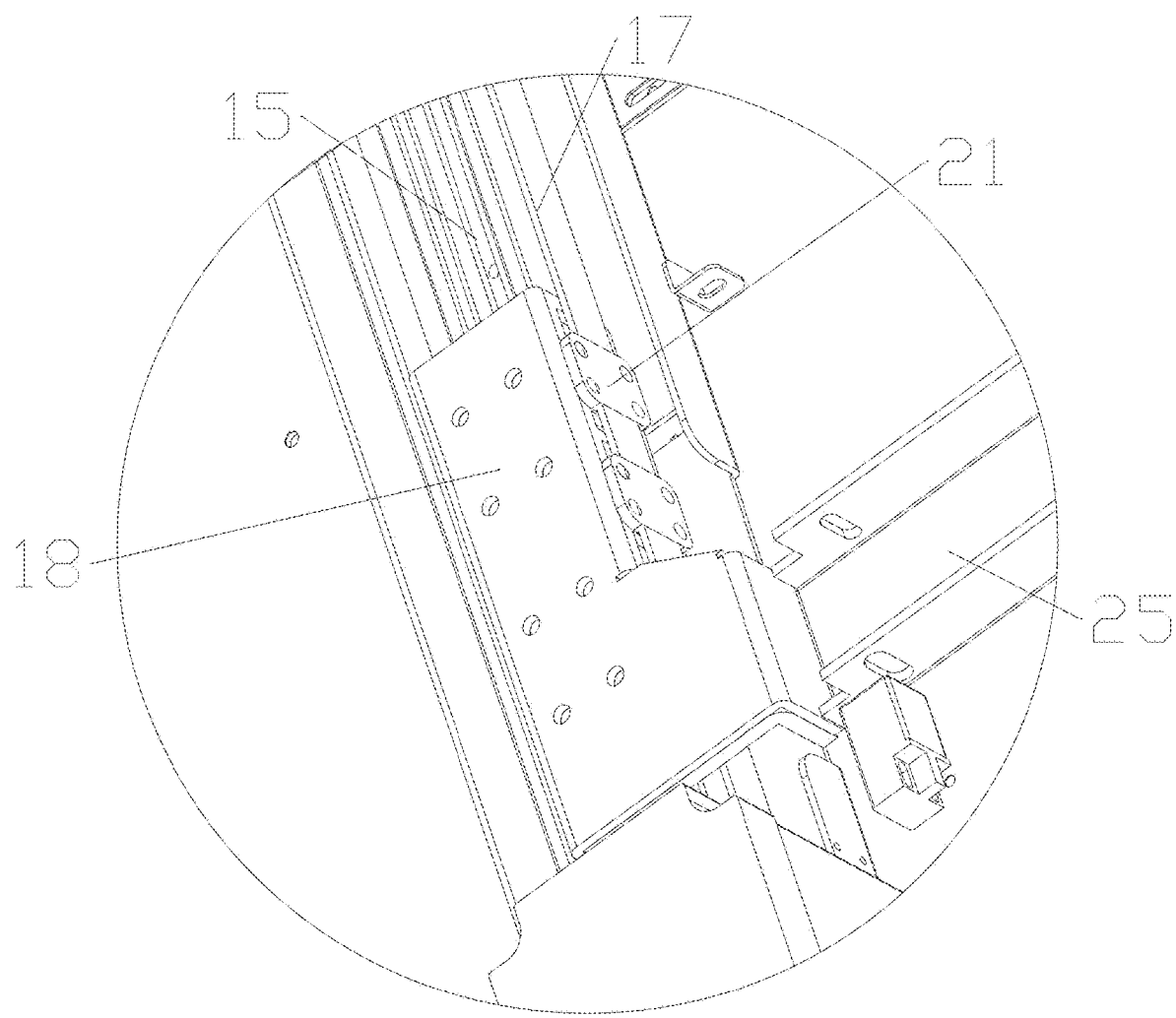
FIG. 28 Partial enlarged view of position E in FIG. 7.
Figure 29:
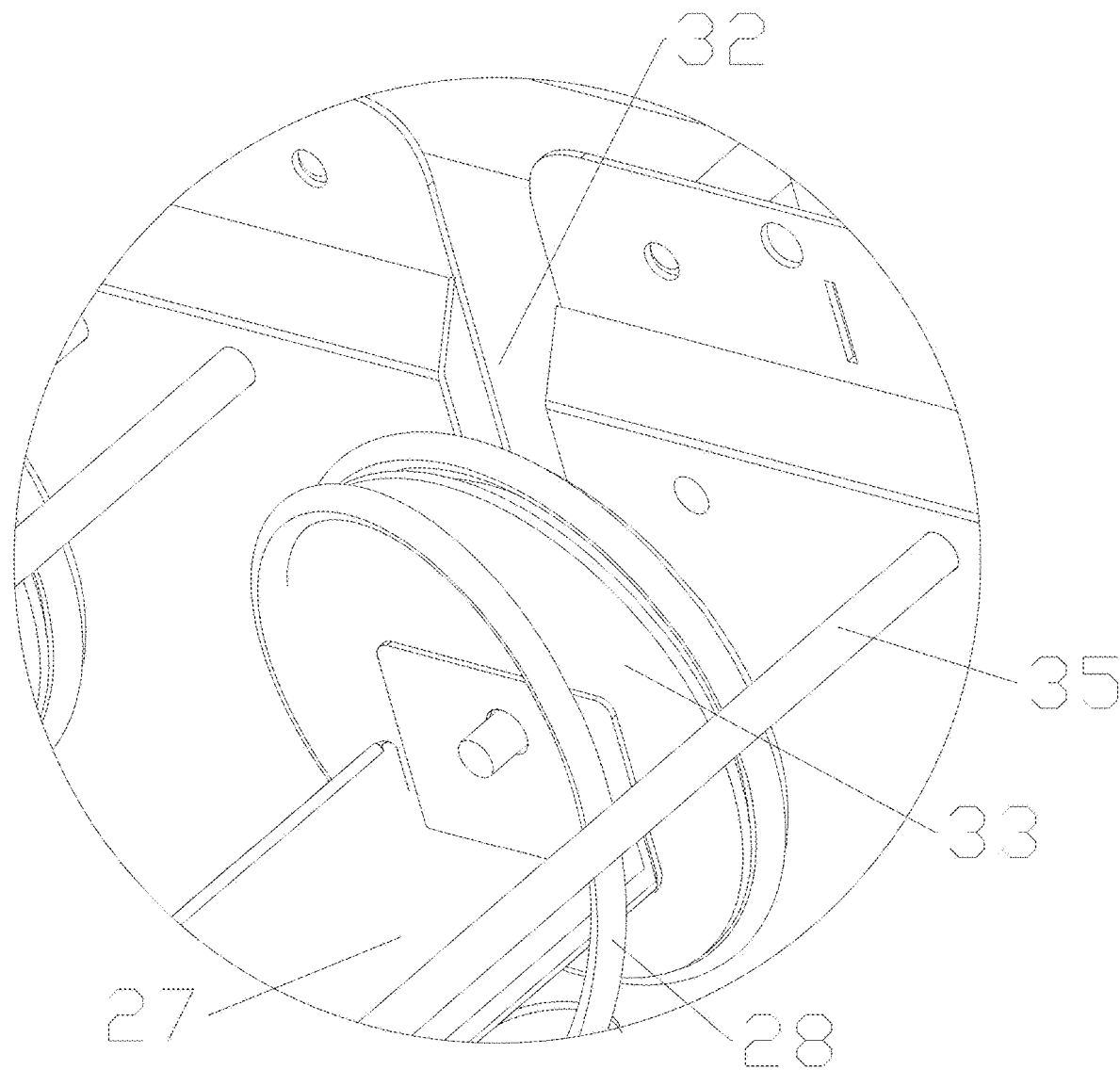
FIG. 29 Partial enlarged view of position F in FIG. 5.
Figure 30:
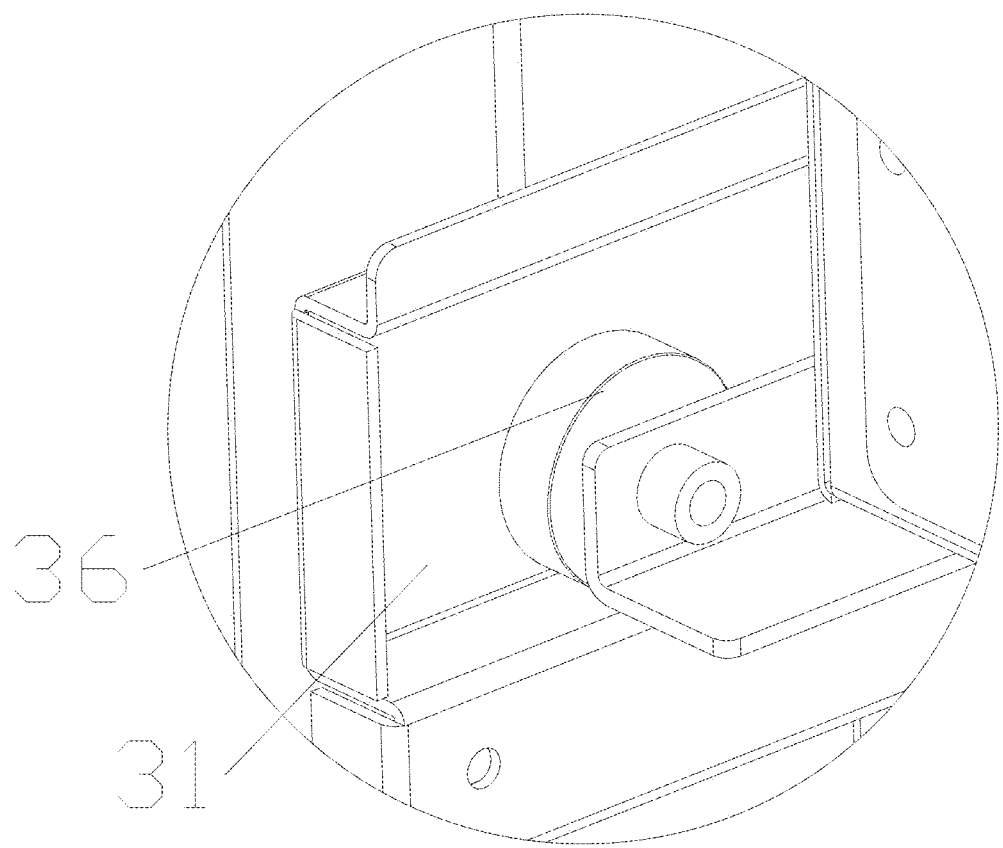
FIG. 30 Partial enlarged view of position G in FIG. 4.
Figure 31:
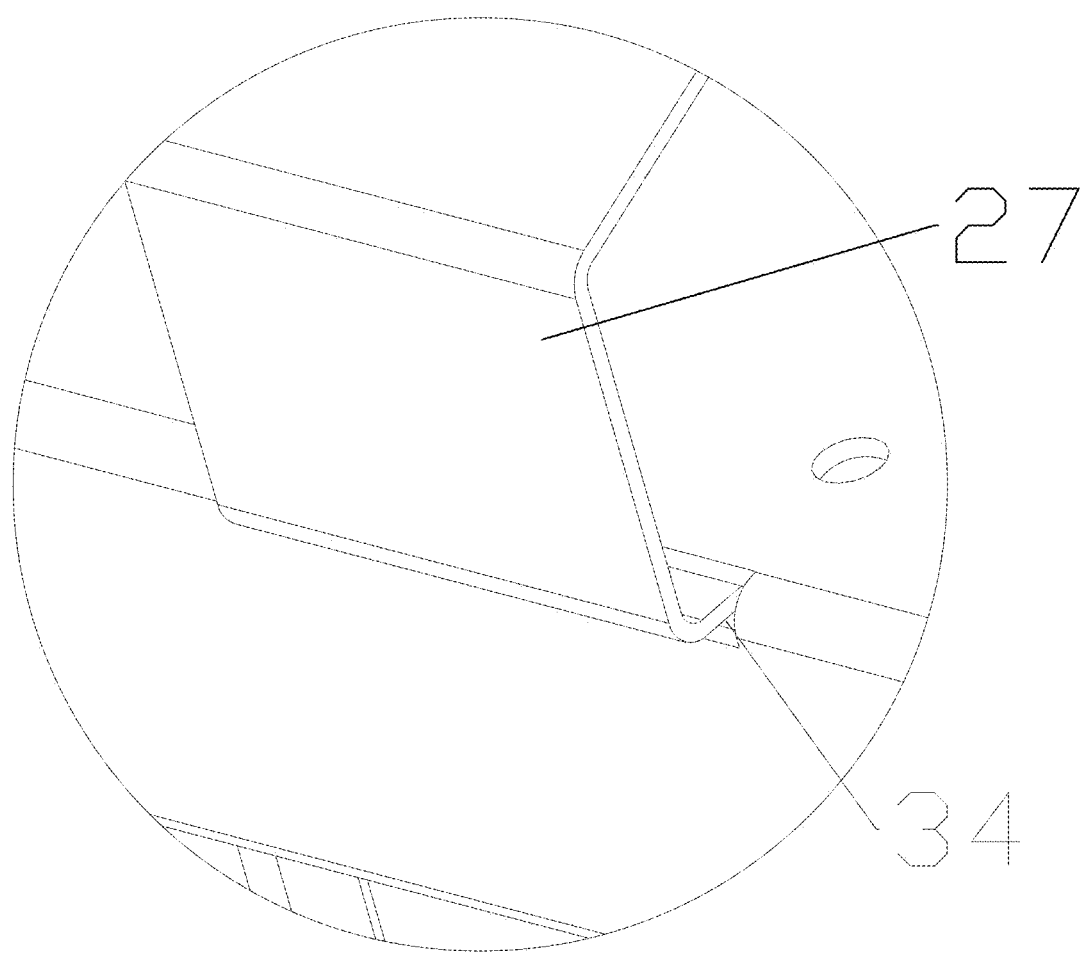
FIG. 31 Partial enlarged view of position H in FIG. 5.
Figure 32:
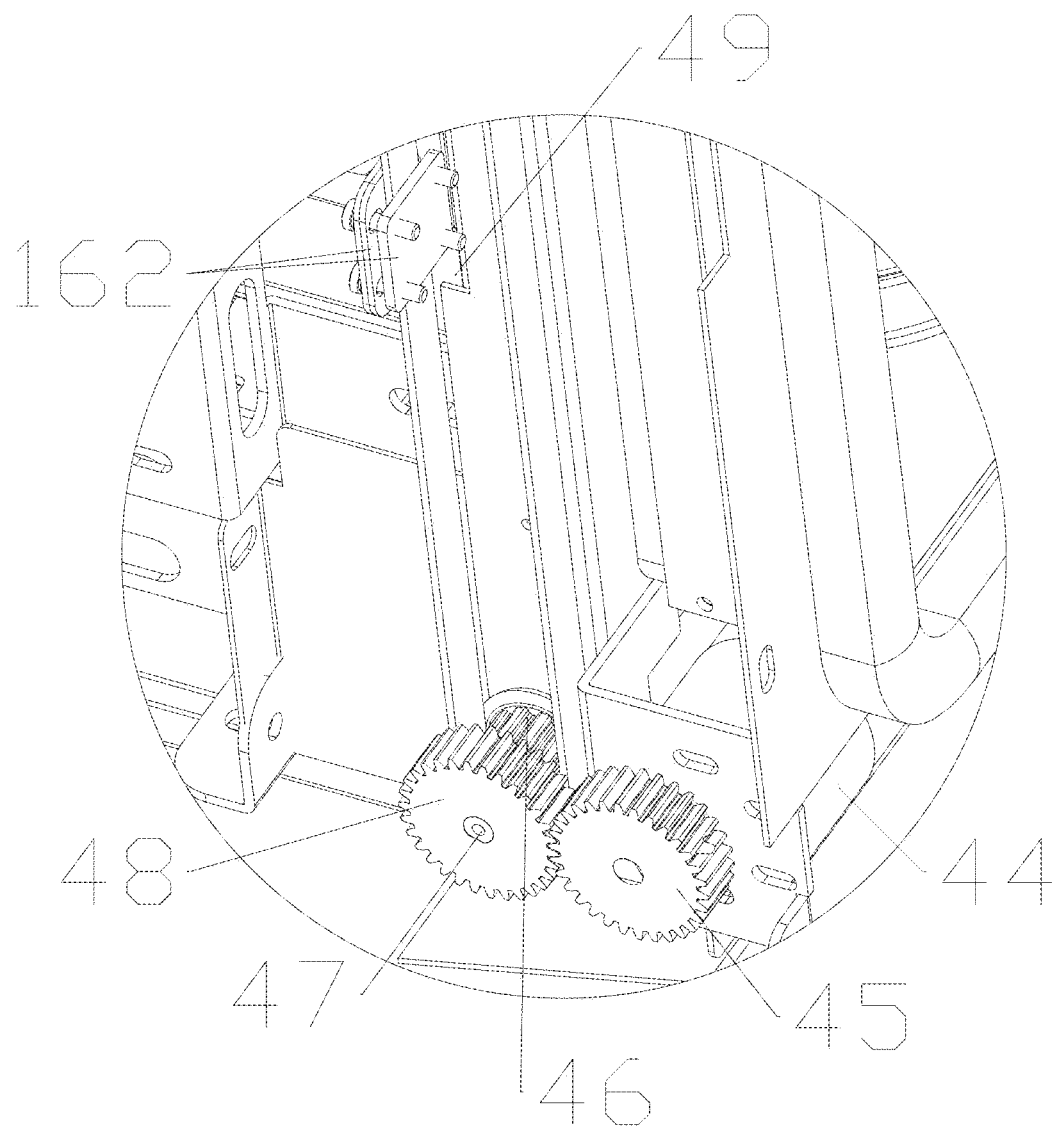
FIG. 32 Partial enlarged view of position I in FIG. 20.
Figure 33:
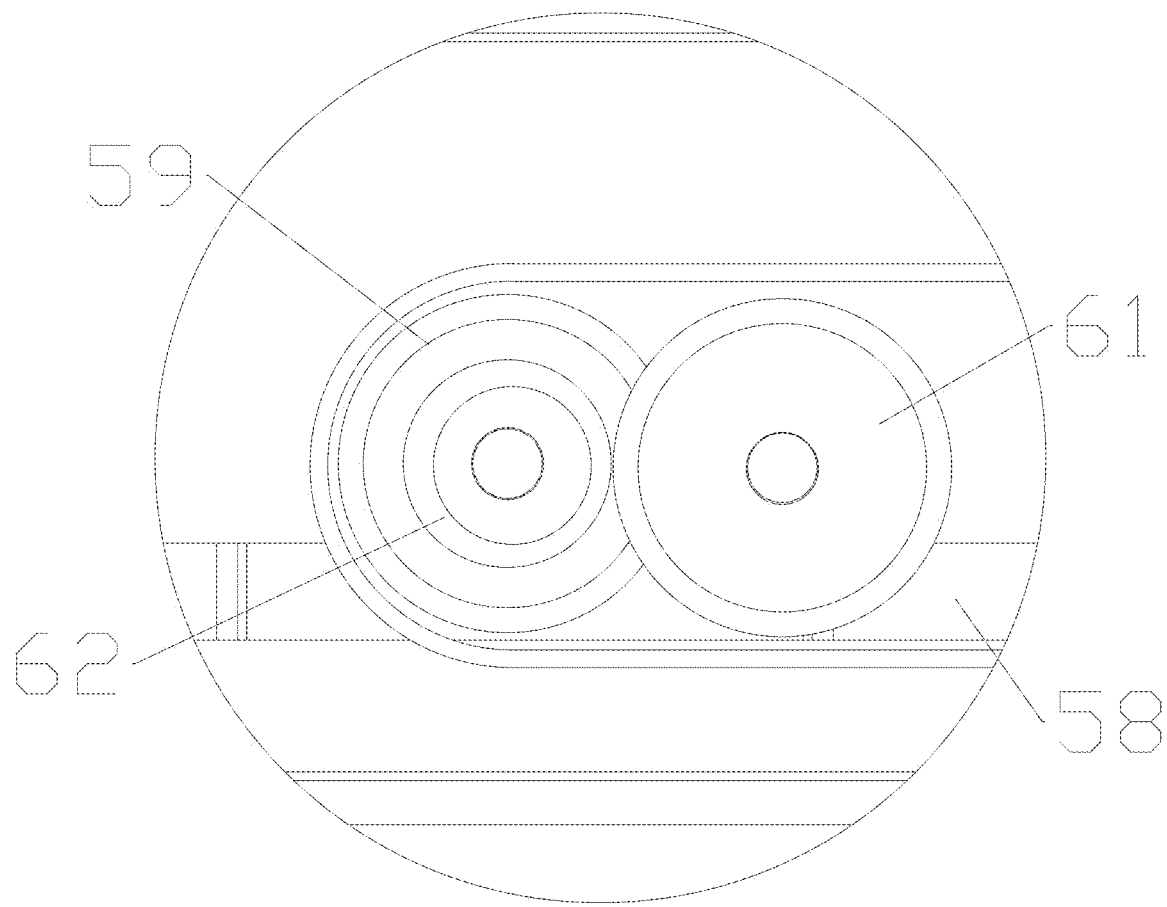
FIG. 33 Partial enlarged view of position J in FIG. 23.
Figure 34:
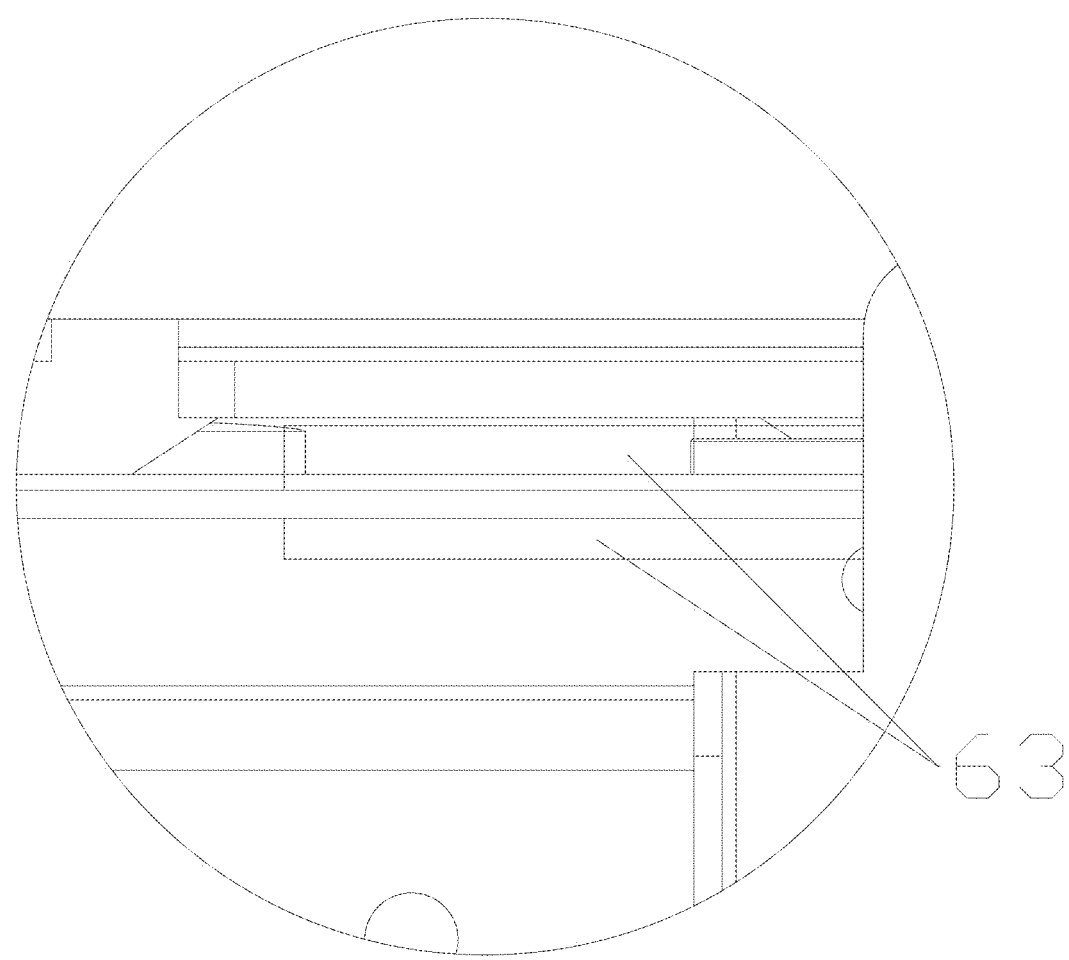
FIG. 34 Partial enlarged view of position K in FIG. 23.
Figure 35:
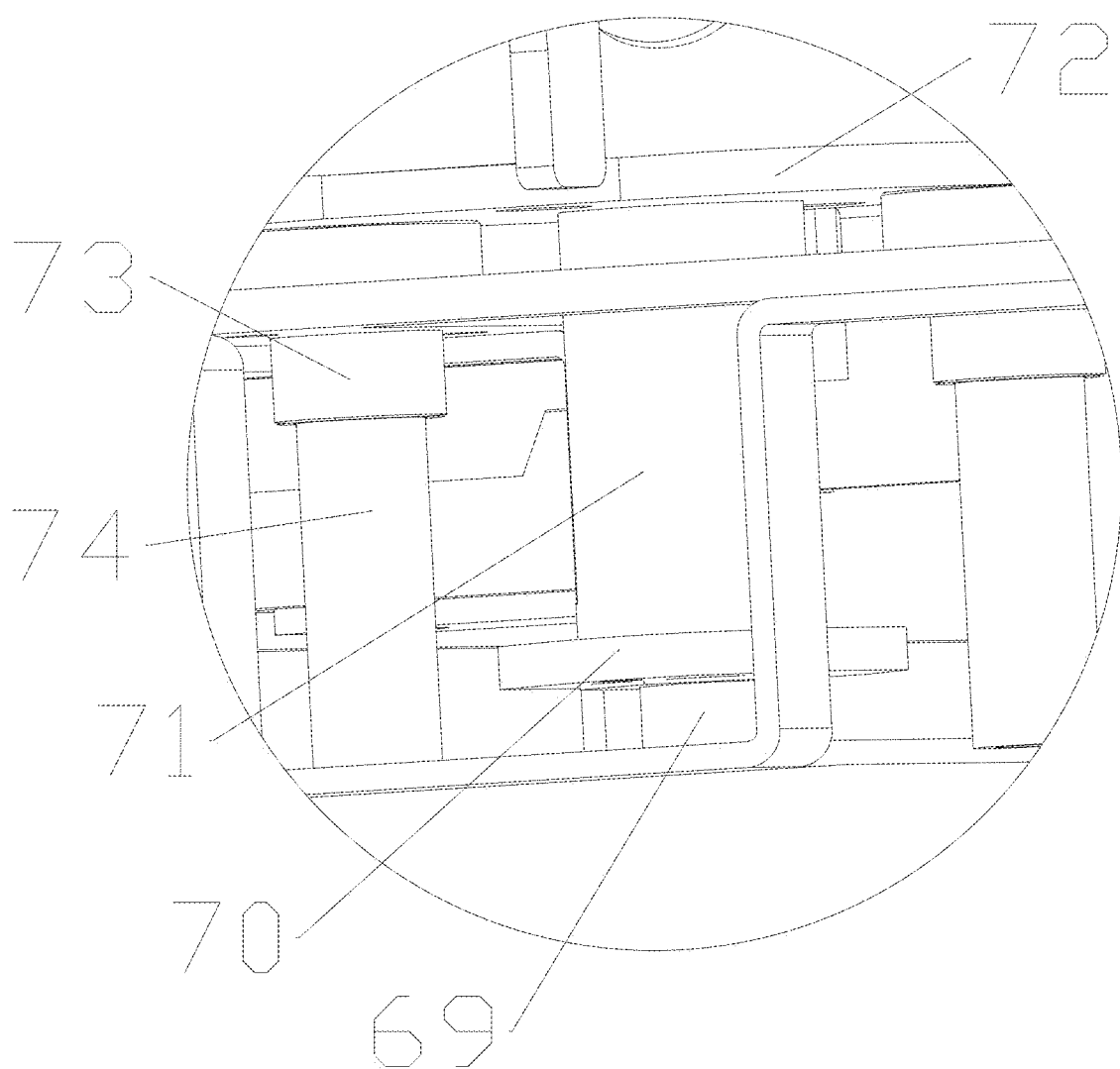
FIG. 35 Partial enlarged view of position L in FIG. 22.
Figure 36:
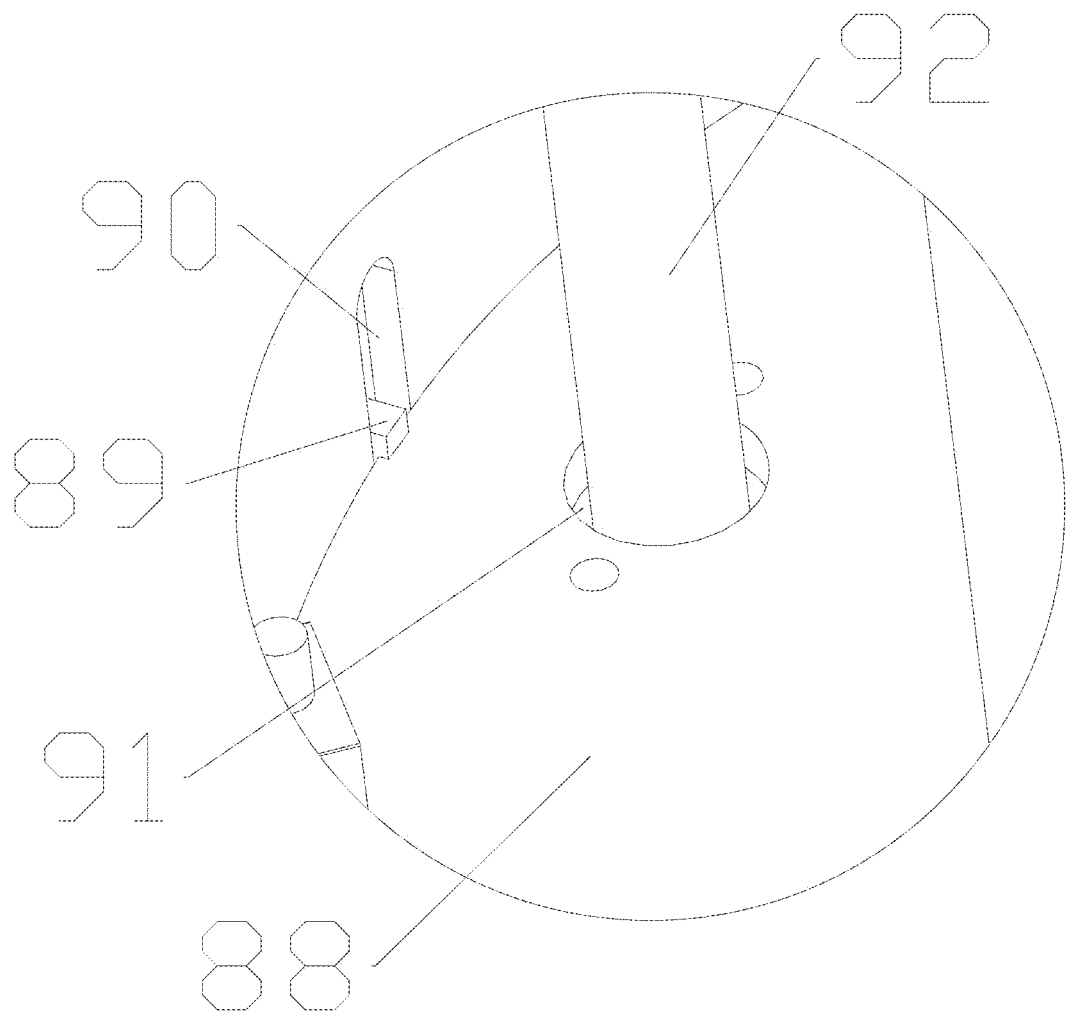
FIG. 36 Partial enlarged view of position M in FIG. 20.
Figure 37:
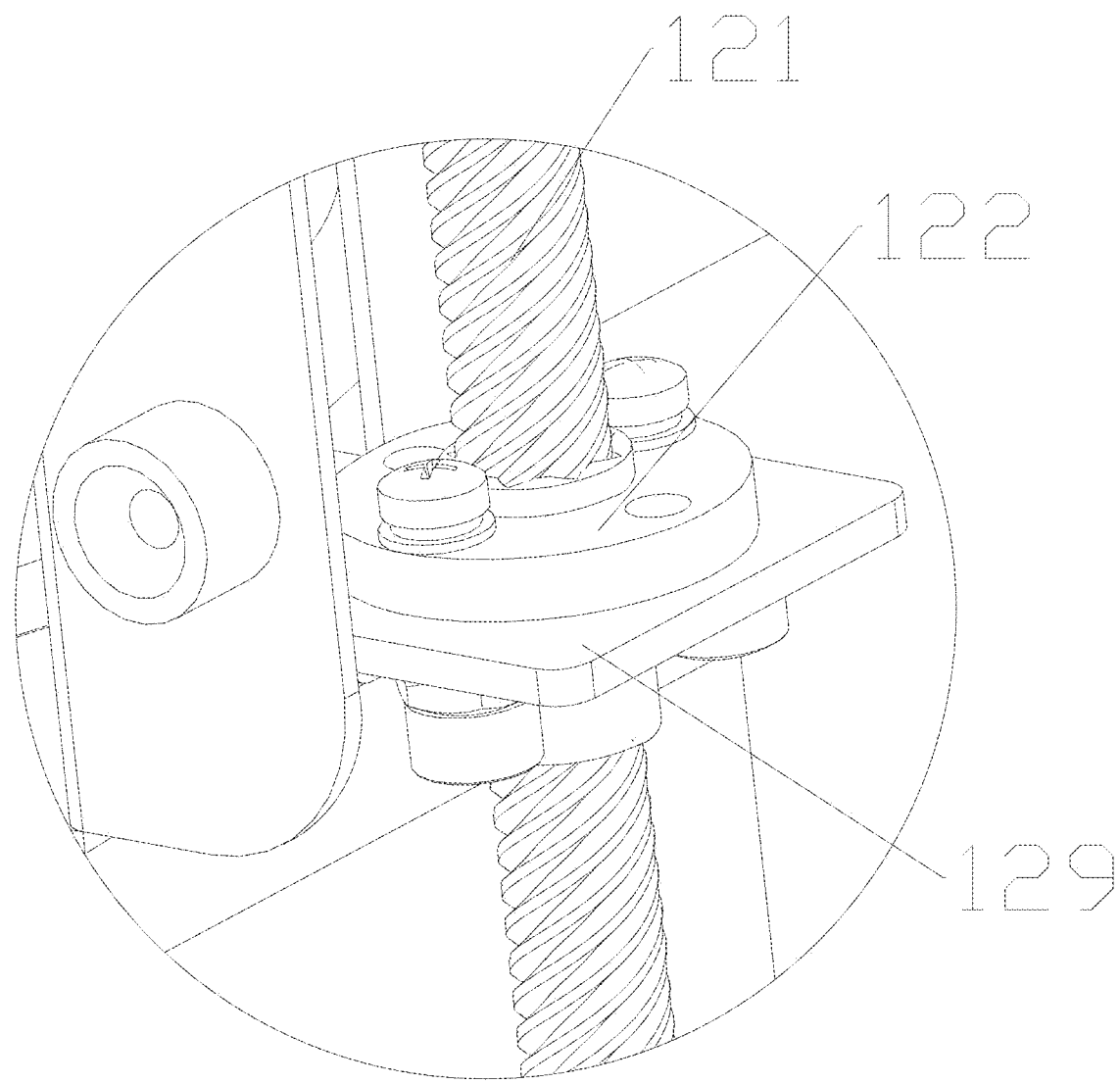
FIG. 37 Partial enlarged view of position N in FIG. 15.
Figure 38:
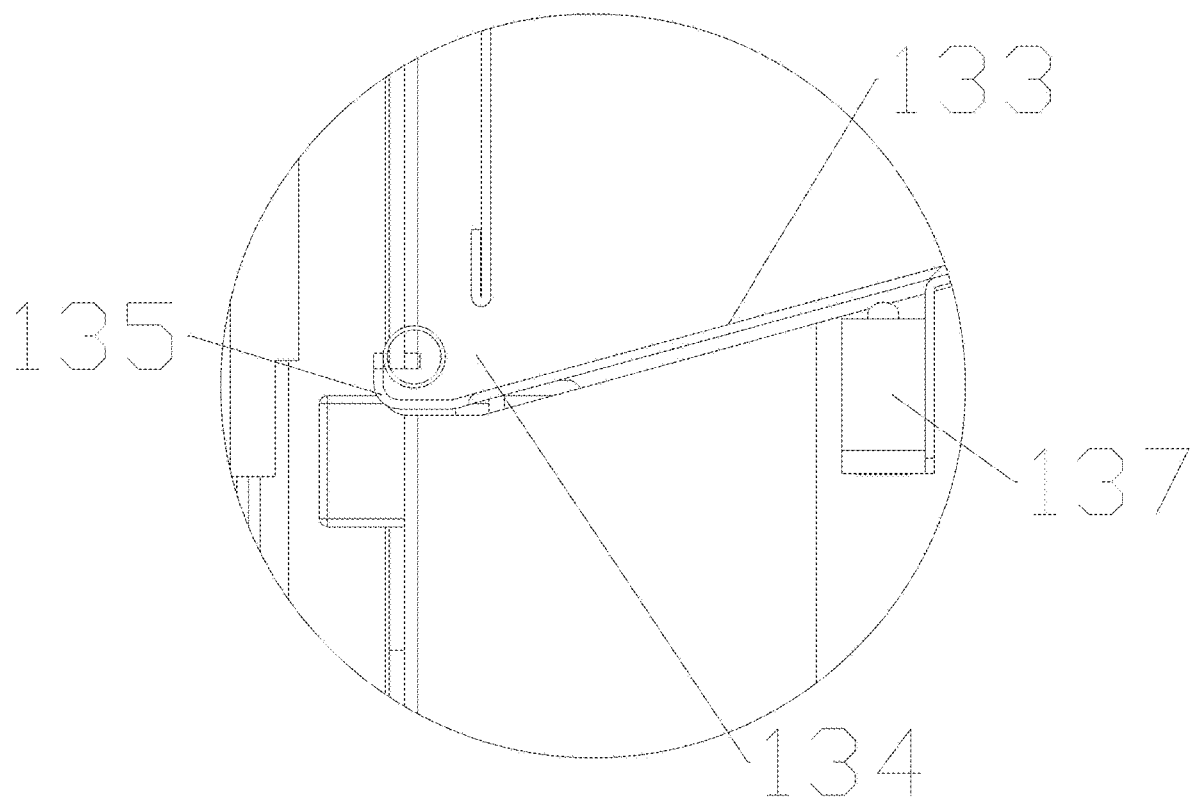
FIG. 38 Partial enlarged view of position O in FIG. 11.
Figure 39:
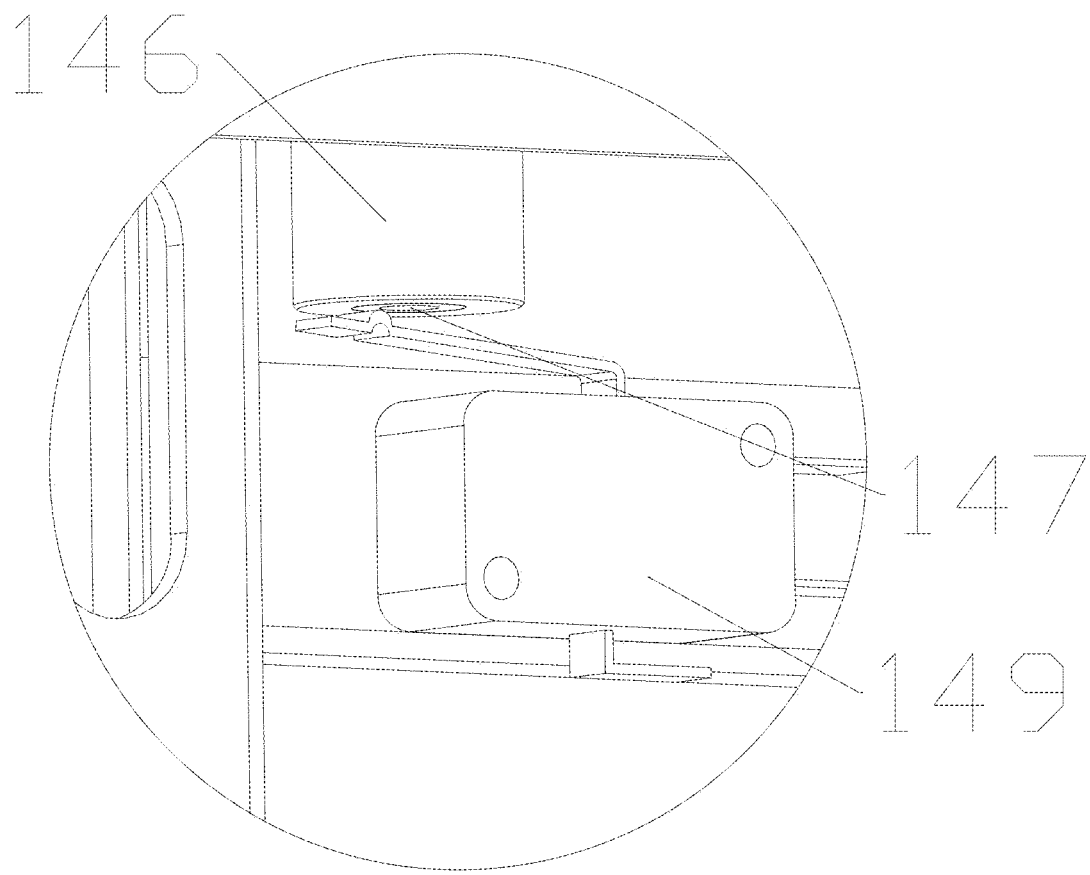
FIG. 39 Partial enlarged view of position P in FIG. 14.
Figure 40:
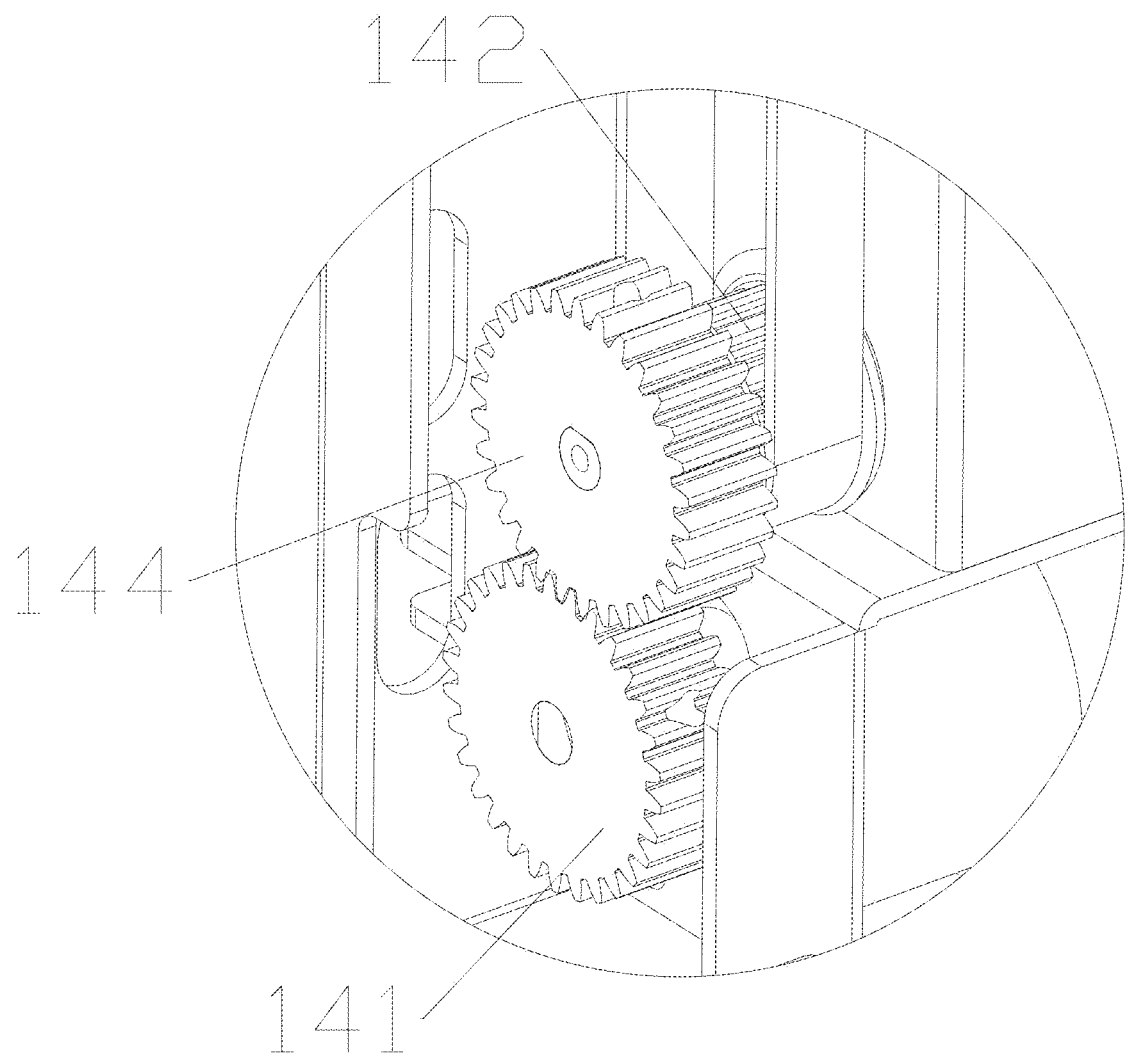
FIG. 40 Partial enlarged view of position Q in FIG. 16.
Figure 41:
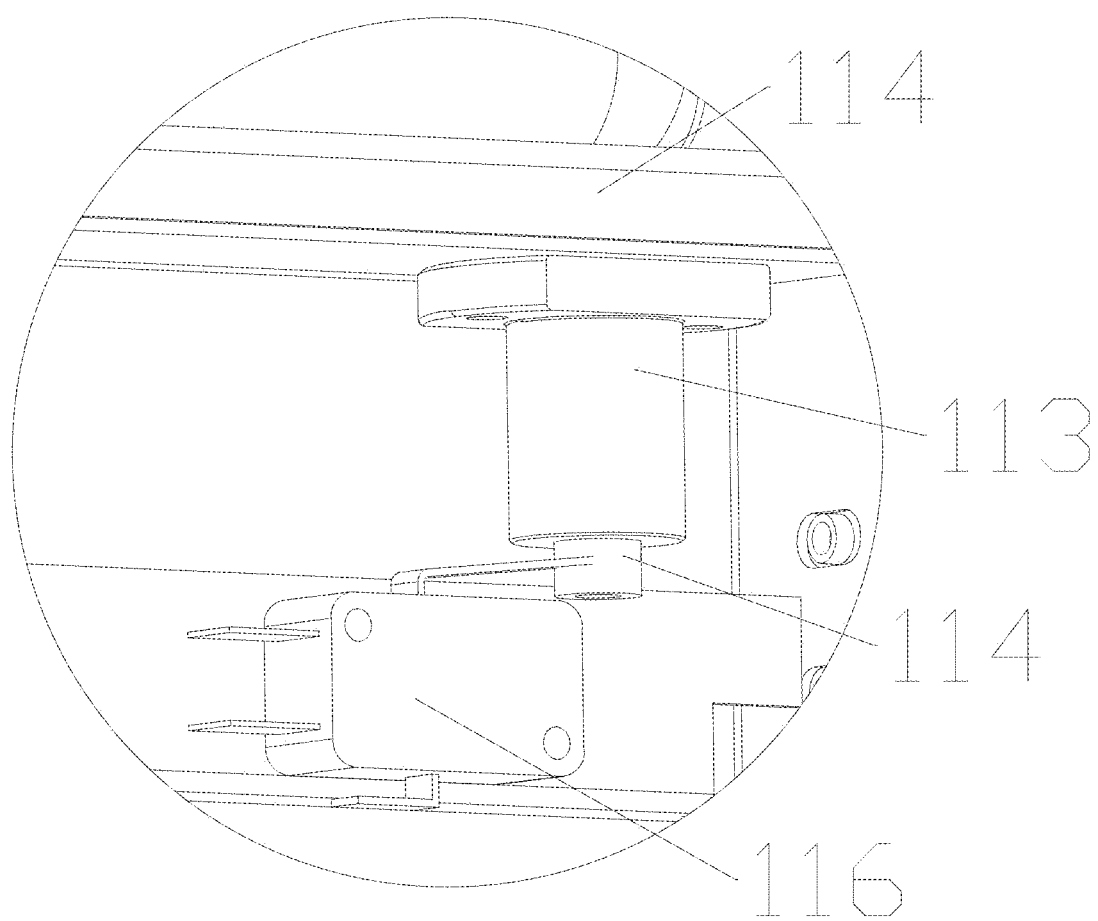
FIG. 41 Partial enlarged view of position R in FIG. 14.
Figure 42:
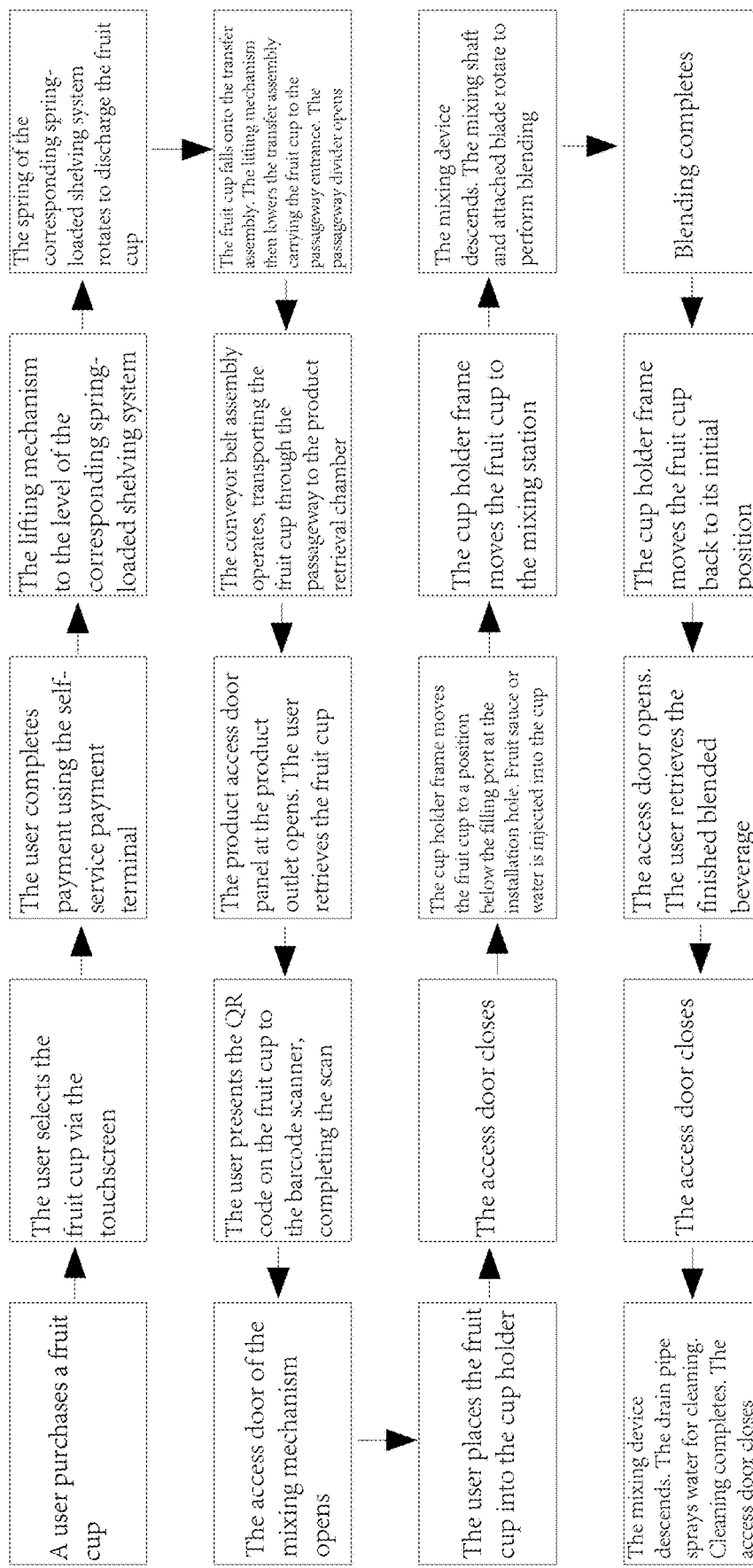
FIG. 42 Flow block diagram of the self-stirring fruit cup smoothie vending machine.

With reference to FIGS. 1-42, a self-stirring fruit cup smoothie vending machine comprises:
  a storage cabinet body 1,
  a control cabinet body 2,
  a spring-loaded shelving system,
  a lifting mechanism,
  a refrigeration system 3,
  a control system,
  a mixing system, and
  a self-service payment terminal 4.

The control cabinet body 2 is disposed adjacent to a side of the storage cabinet body 1.

A refrigerated compartment 5 is provided in a lower portion of the storage cabinet body 1.

The refrigeration system 3 is housed within the refrigerated compartment 5.

An inner cabinet body 6 is disposed within the storage cabinet body 1.

An air outlet of the refrigeration system 3 communicates with the inner cabinet body 6.

The inner cabinet body 6 incorporates a tiered spring-loaded shelving system configured for product storage and dispensing.

A front periphery of the inner cabinet body 6 is sealingly engaged with a front periphery of the storage cabinet body 1.

A storage cabinet door 7 is mounted at a front portion of the storage cabinet body 1.

The lifting mechanism is positioned laterally adjacent to the spring-loaded shelving system within the inner cabinet body 6.

The lifting mechanism comprises a product transfer assembly.

A product retrieval chamber 8 is disposed in a mid-lower portion of the control cabinet body 2.

A passageway 9 is formed in a sidewall of the product retrieval chamber 8, providing fluid communication between the storage cabinet body 1, the inner cabinet body 6, and the product retrieval chamber 8 for transporting products into the product retrieval chamber 8.

The control system is mounted in an upper portion of the control cabinet body 2 for controlling the entire apparatus.

The mixing system is housed within the control cabinet body 2.

A control cabinet door 10 is mounted at a front portion of the control cabinet body 2.

The self-service payment terminal 4 is disposed on an interior surface of the control cabinet door 10.

Within the inner cabinet body 6, an ultraviolet sanitization lamp 161 is disposed at the top, positioned anterior to the spring-loaded shelving system, for sterilizing the interior of the inner cabinet body 6.

Specifically, the refrigeration system 3 employs prior-art dual-compressor refrigeration equipment. Fans of said equipment deliver chilled air into the inner cabinet body 6, achieving −18° C. freezing. This configuration enhances cooling efficiency, preserves freshness of fruit cups, ensures hygiene safety and taste fidelity, and minimizes product spoilage.

The control cabinet body 2 incorporates a touchscreen 11 at its front section. The touchscreen 11 is electrically connected to the control system, enabling product selection and transactions.

The self-service payment terminal 4 utilizes existing payment technology, supporting electronic payments, card transactions, cash, and coin payments for enhanced convenience.

The lifting mechanism comprising a first servomotor 12, transverse brackets 13, side brackets 14, slide rails 15, rotating shafts 16, a toothed belt 17, and sliding blocks 18.

Wherein transverse brackets 13 are disposed at upper and lower ends of the inner cabinet body 6.

Side brackets 14 are symmetrically mounted at lateral ends of the inner cabinet body 6.

Upper and lower ends of each side bracket 14 connect to corresponding transverse brackets 13.

Mounting bases 19 are provided at upper and lower ends of each side bracket 14.

Rotating shafts 16 are rotatably mounted internally at upper and lower ends of the inner cabinet body 6.

Ends of the upper rotating shaft 16 are rotatably coupled to mounting bases 19 at upper ends of side brackets 14.

Ends of the lower rotating shaft 16 are rotatably coupled to mounting bases 19 at lower ends of side brackets 14.

End portions of rotating shafts 16 extend into mounting bases 19.

A first gear 20 is fixedly mounted on each shaft end within mounting bases 19.

First gears 20 within each side bracket 14 are operatively connected by the toothed belt 17.

A slide rail 15 is vertically disposed on an inner wall of each side bracket 14 within an area bounded by the toothed belt 17.

A sliding block 18 is slidably engaged with each slide rail 15.

A clamping plate 21 is detachably secured to one side of each sliding block 18 via bolts.

The toothed belt 17 passes between the clamping plate 21 and sliding block 18, fixedly clamped therebetween, enabling vertical displacement of the sliding block 18 along the slide rail 15 during belt rotation.

A motor mount 22 is disposed beside the lower transverse bracket 13 of the inner cabinet body 6.

The first servomotor 12 is mounted on the motor mount 22.

Second gears 23 are fixedly mounted on an output shaft of the first servomotor 12 and the lower rotating shaft 16.

The second gears 23 are operatively connected by a toothed belt.

The product transfer assembly comprises a conveyor belt assembly 24.

A support bracket 25 is mounted on each sliding block 18 at a side facing toward the storage cabinet door 7.

Opposite ends of the conveyor belt assembly 24 are detachably secured to the support brackets 25 via bolts.

Specifically, the first servomotor 12 drives the rotating shaft 16 via the second gears 23, rotating the toothed belt 17. This rotation drives the sliding blocks 18 vertically along the slide rails 15. The sliding blocks 18 secure the conveyor belt assembly 24 through the support brackets 25, enabling vertical displacement thereof.

During dispensing, the lifting mechanism elevates the conveyor belt assembly 24 before the target spring-loaded shelf. After receiving ejected products, it moves to align with the passageway 9. The conveyor belt assembly 24 then rotates, transferring products through the passageway 9 into the product retrieval chamber 8 for automated dispensing.

The spring-loaded shelving system comprising a carrier bracket 26, a shelf assembly 27, a spring 28, a second servomotor 29, a first gearbox 30, and a rail frame 31.

Wherein:

Uniformly spaced slots 32 are formed at a rear end of the carrier bracket 26.

The first gearbox 30 is mounted at each slot 32.

The second servomotor 29 is operatively coupled to each first gearbox 30.

An output shaft of the first gearbox 30 extends through the slot 32 into the carrier bracket 26.

A disk 33 is fixedly mounted on the output shaft within the carrier bracket 26.

A first end of the spring 28 is coiled around the disk 33.

The shelf assembly 27 is suspended within the spring 28 and spaced apart from interior surfaces thereof.

An insertion slot 34 is provided at a front portion of the carrier bracket 26 adjacent to each spring 28.

A front end of the shelf assembly 27 is insertably received within the insertion slot 34.

A circular aperture is formed at a rear end of the shelf assembly 27.

The shelf assembly 27 is rotatably connected to the output shaft via the circular aperture.

Guard rails 35 are disposed along opposite sides of each spring 28.

The guard rails 35 are detachably secured to the carrier bracket 26 via bolts.

Rail frames 31 are symmetrically disposed along opposite sides of the carrier bracket 26.

First rollers 36 are rotatably mounted at rear lateral portions of the carrier bracket 26.

The first rollers 36 are rollingly engaged with corresponding rail frames 31.

Second rollers 37 are rotatably mounted at front lateral portions of each rail frame 31.

The carrier bracket 26 is rollingly supported on the second rollers 37.

A trapezoidal support frame 38 is mounted below a front end of the carrier bracket 26.

Wherein:

Rear brackets 39 are symmetrically mounted at rear portions of opposite side walls of the inner cabinet body 6.

Protective housings 40 are mounted externally to the side brackets 14.

The protective housings 40 are detachably secured to the inner cabinet body 6 via bolts.

Front and rear ends of each rail frame 31 are detachably secured to a corresponding rear bracket 39 and protective housing 40 via bolts.

The unique design of Shelf Assembly 27 establishes line contact between the cup and Shelf Assembly 27. Furthermore, the cup also establishes line contact with Spring 28. This avoids jamming malfunctions caused by condensed water freezing during door opening for restocking.

Carrier Bracket 26 engages with Rail Frame 31 via First Roller 36 and Second Roller 37 on both sides, respectively, achieving rolling fit. When loading or unloading goods is required, lift the front end of Carrier Bracket 26, then pull Carrier Bracket 26 forward. This causes Trapezoidal Frame 38 to move in front of First Roller 36. Then, lower Carrier Bracket 26. The front end of Carrier Bracket 26 will then rest on First Roller 36. Carrier Bracket 26 can be pulled out. Place the product onto Shelf Assembly 27, specifically within Spring 28. After completing the loading, push Carrier Bracket 26 backward. When First Roller 36 reaches Trapezoidal Frame 38, apply force to push Carrier Bracket 26. Trapezoidal Frame 38 will then slide over First Roller 36. Subsequently, First Roller 36 will position itself between Trapezoidal Frame 38 and the front edge of Carrier Bracket 26. At this point, First Roller 36 can function as a limiter, preventing Carrier Bracket 26 from sliding out.

The mixing system comprises a mixing mechanism and an automatic door mechanism. Access Opening 41 is provided on Control Cabinet Door 10. The automatic door mechanism is arranged on the inner wall of Control Cabinet Door 10 at Access Opening 41. The mixing mechanism is arranged inside Control Cabinet Body 2, positioned behind the automatic door mechanism.

The automatic door mechanism comprises Door Frame 42, Access Door 43, Fourth Servomotor 44, Second Drive Gear 45, and Second Driven Gear 46. Door Frame 42 is arranged at Access Opening 41 of Control Cabinet Door 10. Second Rotating Shafts 47 are rotatably mounted on both the upper and lower ends of Door Frame 42. Both ends of each Second Rotating Shaft 47 extend outward beyond Door Frame 42. Second Driven Gears 46 are arranged on both ends of each Second Rotating Shaft 47. The upper and lower Second Driven Gears 46 located on the same side of Door Frame 42 are connected by a toothed belt. Fourth Servomotor 44 is arranged on one side of the lower end of Door Frame 42. Second Drive Gear 45 is arranged on the shaft of Fourth Servomotor 44. Fourth Driven Gear 48 is arranged on one end of the Second Rotating Shaft 47 located at the lower end of Door Frame 42. Second Drive Gear 45 and Fourth Driven Gear 48 mesh. Third Rails 49 are arranged on both inner side walls of Door Frame 42. Access Door 43 is arranged within Door Frame 42. Both sides of Access Door 43 extend into Third Rails 49 and achieve sliding fit with Third Rails 49. The ends of Access Door 43 that achieve sliding fit with Third Rails 49 are fixedly connected to the toothed belts connecting the two Second Driven Gears 46 via Clamping Plates 162.

Scanning Device 50 is provided on the front part of Control Cabinet Door 10.

Specifically, when a user obtains a fruit cup, a QR code will be pre-printed on the fruit cup. The QR code will contain various information for preparing the corresponding beverage. After Scanning Device 50 scans the QR code on the fruit cup, it will read the corresponding information, then feed it back to the control system. Subsequently, the control system controls the beverage processing. After scanning the QR code, the control system controls Fourth Servomotor 44 to rotate, then opens Access Door 43. At this time, the fruit cup can be placed into Cup Holder 64 of Cup Holder Frame 53. Subsequently, the control system controls Fourth Servomotor 44 to rotate, closing Access Door 43. Thus, whether processing a beverage or not, Access Door 43 remains closed, ensuring cleanliness and hygiene inside the mixing mechanism.

The mixing mechanism comprises Lower Housing 51, Upper Housing 52, Cup Holder Frame 53, Cleaning Rack 54, Load Cell 55, and a mixing device. Lower Housing 51 is arranged inside Control Cabinet Body 2 and is connected to Control Cabinet Body 2 via bolts. Upper Housing 52 is provided on the upper rear side of Lower Housing 51. Mixing Controller 56 is provided on the upper end of Upper Housing 52. The mixing device is arranged on Upper Housing 52. Through-Hole 57 is provided on the upper part of Lower Housing 51. The lower end of the mixing device extends from Through-Hole 57 into Lower Housing 51. Sliding Slots 58 are provided on both sides of Lower Housing 51. Two shaft rods are provided on one side of Lower Housing 51; the two shaft rods are located at the two end parts of Sliding Slot 58, respectively. First Transmission Gear 59 is rotatably mounted on each shaft rod. The two First Transmission Gears 59 are connected by a toothed belt. Fifth Servomotor 60 is provided at one end part of Lower Housing 51. Second Transmission Gear 61 is arranged on the shaft of Fifth Servomotor 60. Third Transmission Gear 62 is rotatably mounted on the shaft rod adjacent to Second Transmission Gear 61. Third Transmission Gear 62 and Second Transmission Gear 61 mesh.

Cup Holder Frame 53 is arranged inside Lower Housing 51. Both lateral ends of Cup Holder Frame 53 extend into Sliding Slots 58 and achieve sliding fit with Sliding Slots 58. Retention Clip 63 is provided on the end of Cup Holder Frame 53 extending into Sliding Slot 58. Retention Clip 63 is fixedly connected to the toothed belt connecting the two First Transmission Gears 59. Cup Holder 64 is provided at the front end of Cup Holder Frame 53. Aperture 65 penetrating through Cup Holder 64 and Cup Holder Frame 53 is provided at the bottom of Cup Holder 64.

Internal Bracket 66 is arranged below Cup Holder Frame 53 within Lower Housing 51. Sliding Track Channels 159 are provided on both sides of Internal Bracket 66. Two support rods extending into Sliding Track Channels 159 are provided on each side of Lower Housing 51. Tension Springs 160 are symmetrically arranged at the front end of Internal Bracket 66. Tension Springs 160 are connected to the front end of Lower Housing 51. Third Gearbox 67 is provided on the lower end of Internal Bracket 66. Sixth Servomotor 68 connected to the input shaft of Third Gearbox 67 is provided at one end of Third Gearbox 67. First Leadscrew 69 is arranged on the output shaft of Third Gearbox 67. Nut 70 is threadedly connected to First Leadscrew 69. Sleeve 71 is provided on Nut 70. Sleeve 71 extends to the upper end of Internal Bracket 66. Support Plate 72 is provided on the upper end of Sleeve 71. Load Cell 55 is provided on Support Plate 72.

Sliding Tubes 73 are provided on both sides of Support Plate 72 on Internal Bracket 66. Guide Rods 74 are slidably arranged within Sliding Tubes 73. The upper ends of Guide Rods 74 are connected to Support Plate 72.

Limit Pull Brackets 75 are symmetrically provided at both the front and rear ends of Cup Holder Frame 53. Limit Pull Brackets 75 cooperate with Internal Bracket 66. Internal Bracket 66 is located between the Limit Pull Brackets 75 at the front and rear ends of Cup Holder Frame 53. Therefore, when Cup Holder Frame 53 moves backward, the Limit Pull Bracket 75 at the front end of Cup Holder Frame 53 will hook Internal Bracket 66, driving Internal Bracket 66 to move backward along Sliding Track Channels 159. This ensures Load Cell 55 maintains contact with the bottom of the fruit cup within Cup Holder 64, facilitating real-time weighing. When Cup Holder Frame 53 moves forward, the Limit Pull Bracket 75 at the rear end of Cup Holder Frame 53 will hook the rear end of Internal Bracket 66, driving Internal Bracket 66 to move forward along Sliding Track Channels 159 until it resets.

Cleaning Rack 54 is arranged inside Lower Housing 51 and located behind Cup Holder Frame 53. Both sides of Cleaning Rack 54 extend into Sliding Slots 58 and achieve sliding fit with Sliding Slots 58. Drain Tray 76 is provided on Cleaning Rack 54. Drain Tray 76 cooperates with the mixing device. Drain Pipe 77 is provided on the lower end of Drain Tray 76. During use, a four-way solenoid valve must be installed on the lower end of Drain Pipe 77. Two ports of the four-way solenoid valve are connected via pipes to the water outlets of Small Electric Storage Water Heater 97 and Water Storage Tank 98, respectively. Furthermore, water pumps must be installed on the pipes connecting the four-way solenoid valve to Small Electric Storage Water Heater 97 and Water Storage Tank 98. Thus, when using water from Small Electric Storage Water Heater 97 or Water Storage Tank 98 for rinsing, the water ejected from the upper end of Drain Pipe 77 can achieve a higher flow velocity, resulting in a cleaner rinse.

The last port of the four-way solenoid valve is connected via a pipe to a bucket or other container for collecting wastewater.

The four-way solenoid valve must be electrically connected to PC Module 103. This enables control of the opening and closing of each valve body of the four-way solenoid valve via PC Module 103, ensuring rinsing and drainage operations do not conflict.

Limiters 78 are provided on the middle and rear parts of both inner sides of Lower Housing 51. Limiters 78 cooperate with Cleaning Rack 54.

Specifically, after the fruit cup is placed onto Cup Holder 64, the rotation of Fifth Servomotor 60 will drive Cup Holder Frame 53 to move towards Load Cell 55 via the toothed belts on the two First Transmission Gears 59. Movement stops when Aperture 65 on Cup Holder 64 is positioned directly above Load Cell 55. Then, Sixth Servomotor 68 rotates, driving First Leadscrew 69 to rotate via Third Gearbox 67, thereby causing Nut 70 and Sleeve 71 to move upward. Load Cell 55 will lift the fruit cup within Cup Holder 64 from Aperture 65, then weigh the fruit cup. Subsequently, water or other beverage materials can be added to the fruit cup. Load Cell 55 will weigh the fruit cup in real-time and feed back to the control system. When the amount of water or other beverage material added for each beverage type is reached, adding material or water will automatically stop, thus achieving precise control of ingredient addition. Concurrently, a retraction program and mechanism are designed into the control system; this will retract residual material within the delivery pipe, avoiding pipe residue and addressing the pain point of preserving freshness in the pipeline section outside the refrigerator.

After the ingredients are added, Sixth Servomotor 68 rotates, driving Load Cell 55 downward. Then, Fifth Servomotor 60 will continue to rotate, driving Cup Holder Frame 53 to move towards Cleaning Rack 54. This will push Cleaning Rack 54 rearward until the fruit cup on Cup Holder Frame 53 is positioned directly below the mixing device.

Seventh Servomotor 84 drives four Second Leadscrews 92 to rotate via Third Gear 93 and a toothed belt, causing Disk Plate 88 to move up and down, achieving the telescopic movement of Mixing Shaft 94. When Mixing Motor 81 moves downward, the Silicone Protective Cover 85 at the lower end of Lower Mixing Drum 83 will press against the top opening of the fruit cup, preventing liquid overflow during mixing. Subsequently, Mixing Motor 81 drives Mixing Shaft 94 and the blade head to reciprocate vertically for crushing, making the mixing of frozen fruit pulp more uniform and finer. After mixing is completed, the mixing device will move upward. Then, Fifth Servomotor 60 reverses, driving Cup Holder Frame 53 to reset. The purchaser can then obtain the mixed beverage.

The Cup Holder Frame 53, Cup Holder 64 position, and mixing position of the device adopt a compartmentalized design. This effectively prevents contamination of the blade head and Silicone Protective Cover 85 by users or the environment. Specifically, users cannot contact the blade head. Before Access Door 43 closes, the Silicone Protective Cover and blade head are located within the cleaning zone, thereby achieving protection for the Silicone Protective Cover and blade head.

Magnets 79 are provided on the inner wall of the rear end of Cleaning Rack 54 and on the rear end of Cup Holder Frame 53. These magnets mutually cooperate.

Multiple Mounting Holes 163 are provided on the front part of Through-Hole 57 on Lower Housing 51. All Mounting Holes 163 are positioned directly above Load Cell 55 when it is in its reset, non-moved state. During use, nozzles must be installed within Mounting Holes 163. The nozzles extend downward into Lower Housing 51, positioned directly above Load Cell 55, facilitating precise addition of water or other beverage materials into the fruit cup. Then, Peristaltic Pump 100, Small Electric Storage Water Heater 97, and Water Storage Tank 98 are connected via pipes to the nozzles within the corresponding Mounting Holes 163. This enables the addition of water or other beverage materials.

Water pumps must be installed on the connecting pipes between the nozzles and Small Electric Storage Water Heater 97/Water Storage Tank 98. This makes water addition more efficient.

Specifically, when Cup Holder Frame 53 moves rearward, it pushes Cleaning Rack 54 to move towards the rear end until the cup position is located directly below Silicone Protective Cover 85. The rear end of Cleaning Rack 54 will also abut against Limiter 78 at the rear part of Lower Housing 51, limiting the movement of Cleaning Rack 54. At this time, Magnet 79 on the rear end of Cleaning Rack 54 and Magnet 79 on the rear end of Cup Holder Frame 53 mutually attract. When Cup Holder Frame 53 resets, it will drive Cleaning Rack 54 to also move towards the front of the device through the magnetic attraction of Magnets 79. When Drain Tray 76 on Cleaning Rack 54 is positioned directly below Silicone Protective Cover 85, Cleaning Rack 54 will contact Limiter 78 at the middle part of Lower Housing 51. Limiter 78 will block the movement of Cleaning Rack 54, thereby causing Cup Holder Frame 53 and Cleaning Rack 54 to separate. The mixing device will descend to its lowest position. Silicone Protective Cover 85 will press against the upper end of Drain Tray 76. Drain Pipe 77 at the lower end of Drain Tray 76 will spray water, cleaning the inner wall of Silicone Protective Cover 85 and the blade head, ensuring hygiene and safety. After rinsing is completed, Drain Pipe 77 will drain the wastewater from Drain Tray 76, and it will be quickly collected into the wastewater bucket.

The mixing device comprises Mounting Plate 80, Mixing Motor 81, Upper Mixing Drum 82, Lower Mixing Drum 83, Seventh Servomotor 84, and Silicone Protective Cover 85. Mounting Plate 80 is provided in the middle-upper part of Upper Housing 52. Upper Mixing Drum 82 is arranged below Mounting Plate 80. Lower Mixing Drum 83 communicating with Upper Mixing Drum 82 is provided at the lower end of Upper Mixing Drum 82. The lower end of Lower Mixing Drum 83 extends from Through-Hole 57 into Lower Housing 51. Silicone Protective Cover 85 is installed on the bottom of Lower Housing 51. Mixing Hole 86 penetrating through Silicone Protective Cover 85 is provided in the middle of Silicone Protective Cover 85. Spring Seat 87 is arranged inside Lower Mixing Drum 83. Spring 28 is sleeved onto Spring Seat 87. Disk Plate 88 is arranged inside Upper Mixing Drum 82. Guide Blocks 89 are symmetrically provided on both sides of Disk Plate 88. Adjustment Slots 90 are symmetrically provided on both sides of Upper Mixing Drum 82. Guide Blocks 89 are located within the corresponding Adjustment Slots 90. Four Threaded Holes 91 are symmetrically provided on Disk Plate 88.

Bearings corresponding to the positions of Threaded Holes 91 are provided on Mounting Plate 80. Second Leadscrew 92 is arranged within each bearing. The upper end of Second Leadscrew 92 extends to the upper part of Mounting Plate 80. Third Gear 93 is arranged on the upper end of Second Leadscrew 92. The four Third Gears 93 are connected by a toothed belt. The lower part of Second Leadscrew 92 is threadedly connected to Threaded Hole 91. Bearings corresponding to the positions of Threaded Holes 91 are provided at the bottom of Upper Mixing Drum 82. The lower end of Second Leadscrew 92 extends into the corresponding bearing at the bottom of Upper Mixing Drum 82. Mixing Motor 81 is provided on Disk Plate 88. Mixing Shaft 94 is arranged on the shaft of Mixing Motor 81. The lower end of Mixing Shaft 94 passes through Spring 28 and Spring Seat 87, extends from Mixing Hole 86 into Silicone Protective Cover 85. A mixing blade head is installed on the end of Mixing Shaft 94 within Silicone Protective Cover 85, facilitating the crushing and mixing of beverage materials. The upper end of Spring 28 abuts against the lower end of Mixing Motor 81.

Seventh Servomotor 84 is provided on Mounting Plate 80. Fourth Gear 95 is arranged on the shaft of Seventh Servomotor 84. Fifth Gear 96 is arranged on the Second Leadscrew 92 adjacent to Seventh Servomotor 84. Fifth Gear 96 is located below Mounting Plate 80. Fifth Gear 96 and Fourth Gear 95 mesh.

Specifically, Seventh Servomotor 84 drives the Second Leadscrews 92 to rotate via the Third Gears 93 and the toothed belt, causing Disk Plate 88 to move up and down, achieving the telescopic movement of Mixing Shaft 94.

The Silicone Protective Cover 85 at the lower end of Lower Mixing Drum 83 can press against the top opening of the fruit cup, preventing liquid overflow during mixing. The reciprocating vertical movement of Mixing Shaft 94 makes the mixing of frozen fruit pulp more uniform and finer.

Small Electric Storage Water Heater 97 is provided at the rear end of Upper Housing 52. On one hand, it can produce hot beverages; on the other hand, it can utilize hot water for cleaning, achieving a cleaner wash. Water Storage Tank 98 is provided at the rear end of Upper Housing 52, providing a water source for beverage processing and for rinsing. Small Electric Storage Water Heater 97 and Water Storage Tank 98 are connected via pipes to the nozzles within the corresponding Mounting Holes 163, respectively.

Refrigerator 99 is arranged inside Control Cabinet Body 2. Multiple Peristaltic Pumps 100 are arranged inside Refrigerator 99. Connect the Peristaltic Pumps 100 via pipes to the nozzles within the corresponding Mounting Holes 163, respectively. Beverage concentrates of various flavors can be pre-placed inside Refrigerator 99. Then, connect each Peristaltic Pump 100 via pipes to different beverage concentrate containers or bags. Different Peristaltic Pumps 100 draw different beverage concentrates to add into the fruit cup, thereby blending beverages of different flavors.

Multiple Electronic Scales 101 are provided at the bottom of Control Cabinet Body 2. The water storage bucket will be placed onto Electronic Scale 101, thereby enabling judgment of whether there is water in the bucket through weighing, providing precise feedback on water inventory.

Access Door 102 is provided on the side of Control Cabinet Body 2, facilitating maintenance of internal equipment.

The control system comprises PC Module 103 and Control Box 104. Control Box 104 is arranged in the upper part inside Control Cabinet Body 2. PC Module 103 is arranged inside Control Box 104. Multiple Power Buttons 105 are provided on the upper front part of Control Box 104. Main Power Switch 106 is provided on the front of Control Box 104. Temperature Controller 107 is provided below Main Power Switch 106 on the front of Control Box 104. Control Buttons 108 are provided on the front of Control Box 104. Control Buttons 108, Power Buttons 105, Main Power Switch 106, and Temperature Controller 107 are all electrically connected to PC Module 103.

Product Outlet 109 communicating with Product Retrieval Chamber 8 is provided on Control Cabinet Door 10. First Rails 110 are symmetrically provided on the inner wall of Control Cabinet Door 10 at the position between it and Product Retrieval Chamber 8. The two First Rails 110 are located on both sides of Product Outlet 109, respectively. Product Access Door Panel 111 achieving sliding fit with First Rails 110 is arranged between the two First Rails 110. First Electric Linear Actuator 112 is provided on the inner wall of the front end of Control Cabinet Body 2. First Electric Linear Actuator 112 is located directly below Product Access Door Panel 111, and its upper end is connected to Product Access Door Panel 111, pushing Product Access Door Panel 111 to move vertically along First Rails 110.

First Perforated Support Brackets 113 are symmetrically provided at the top inside Product Access Door Panel 111. First Push Rod 114 slidable within First Perforated Support Bracket 113 is arranged in each First Perforated Support Bracket 113. The upper end of First Push Rod 114 extends above Product Access Door Panel 111. First Pressure Plate 115 is provided above Product Access Door Panel 111. First Pressure Plate 115 is connected to the upper ends of the First Push Rods 114. First Relay 116 is provided below First Perforated Support Bracket 113 on the inner wall of Product Access Door Panel 111. First Push Rod 114 cooperates with First Relay 116.

Specifically, First Electric Linear Actuator 112 pushes Product Access Door Panel 111 to move vertically. When Product Access Door Panel 111 reaches the top of First Rail 110, First Pressure Plate 115 will abut against the top of First Rail 110. First Pressure Plate 115 will press down First Push Rod 114. First Push Rod 114 will press down First Relay 116. First Relay 116 will feed back a signal to PC Module 103. PC Module 103 will control First Electric Linear Actuator 112 to stop.

A cup access mechanism is provided on the inner wall of Control Cabinet Door 10 on the side of Product Retrieval Chamber 8. A straw access door mechanism is arranged between the cup access mechanism and the front wall of Control Cabinet Body 2. Cup Dispensing Port 117 cooperating with the straw access door mechanism is provided on the front end of Control Cabinet Body 2.

The cup access mechanism comprises Base Frame 118, Outer Casing 119, Third Servomotor 120, First Leadscrew 121, First Nut Carriage 122, Mounting Frame 123, and Second Gearbox 124. Base Frame 118 is connected to Control Cabinet Body 2 via bolts. Outer Casing 119 is provided on the upper end of Base Frame 118. Mounting Frame 123 is provided on the side of Outer Casing 119 proximate to Control Cabinet Body 2. Mounting Frame 123 is connected to Control Cabinet Body 2 via bolts. Bearings are symmetrically provided on both the lower and upper ends of Outer Casing 119. First Leadscrews 121 are symmetrically provided on both sides of Outer Casing 119. The upper and lower ends of each First Leadscrew 121 are connected to the two bearings located on the same side, respectively. The lower end of First Leadscrew 121 extends below Outer Casing 119. First Lower Gear 125 is arranged on the end of First Leadscrew 121 extending below Outer Casing 119. Interconnecting Gear 126 is arranged at the very lower end of First Leadscrew 121. The two Interconnecting Gears 126 are connected by a gear belt. Second Gearbox 124 is provided on the bottom of Outer Casing 119. Third Servomotor 120 connected to the input shaft of Second Gearbox 124 is provided on one side of Second Gearbox 124. The output shaft of Second Gearbox 124 extends below Outer Casing 119 and is provided with Second Lower Gear 127. First Lower Gear 125 and Second Lower Gear 127 mesh. First Nut Carriage 122 is threadedly connected to each First Leadscrew 121. Tray 128 is arranged inside Outer Casing 119. Connecting Plates 129 are provided on both sides of Tray 128. Slide Channels 130 are provided on both sides of Outer Casing 119. The Connecting Plates 129 on both sides of Tray 128 extend out from the corresponding Slide Channels 130, respectively. The ends of Connecting Plates 129 extending out of Slide Channels 130 are connected to the corresponding First Nut Carriages 122 via bolts. Rear Door 131 is provided on the rear side of Outer Casing 119.

Specifically, rotation of Third Servomotor 120 drives First Lower Gear 125 to rotate via Second Lower Gear 127, thereby causing First Leadscrew 121 to rotate. Rotation of First Leadscrew 121 drives First Nut Carriage 122 to move vertically, consequently driving Tray 128 to move vertically. Cup lids are placed on Tray 128. After one cup lid is removed from Straw Access Door 139, Third Servomotor 120 will rotate, driving Tray 128 to move upward a certain distance, ensuring the topmost cup lid on Tray 128 remains positioned at Straw Access Door 139.

Rear Door 131 is provided on the rear side of Outer Casing 119, facilitating opening Rear Door 131 to place cup lids onto Tray 128.

Arcuate Top Cover 132 is provided on top of Outer Casing 119.

Straw Storage Dispenser 133 is provided on the upper end of Arcuate Top Cover 132. The base plate of Straw Storage Dispenser 133 is inclined downward. Straw Dispensing Slot 134 is provided at the bottom front end of Straw Storage Dispenser 133. Curved Support Plates 135 are symmetrically provided below Straw Dispensing Slot 134 at the front end of Straw Storage Dispenser 133, used to catch straws sliding out from Straw Dispensing Slot 134. Top Cover 136 is provided on the upper part of Straw Storage Dispenser 133.

When one straw is removed from Curved Support Plates 135, under gravity, the straws will slide downward along the inclined base plate of Straw Storage Dispenser 133, slide out from Straw Dispensing Slot 134 onto Curved Support Plates 135, awaiting the next retrieval.

Infrared Sensor 137 is provided at the bottom of Straw Storage Dispenser 133. Thus, when Tray 128 drives the cup lids upward, Infrared Sensor 137 can detect the cup lids on Tray 128, then feed back to PC Module 103. PC Module 103 will control Third Servomotor 120 to stop.

The straw access door mechanism comprises Door Frame Assembly 138, Straw Access Door 139, Eighth Servomotor 140, First Drive Gear 141, and First Driven Gear 142. Door Frame Assembly 138 is arranged at Cup Dispensing Port 117 of Control Cabinet Door 10. First Rotating Shafts 143 are rotatably mounted on both the upper and lower ends of Door Frame Assembly 138. Both ends of each First Rotating Shaft 143 extend outward beyond Door Frame Assembly 138. First Driven Gears 142 are arranged on both ends of each First Rotating Shaft 143. The upper and lower First Driven Gears 142 located on the same side of Door Frame Assembly 138 are connected by a toothed belt. Eighth Servomotor 140 is arranged on one side of the lower end of Door Frame Assembly 138. First Drive Gear 141 is arranged on the shaft of Eighth Servomotor 140. Third Driven Gear 144 is arranged on the First Rotating Shaft 143 located below Door Frame Assembly 138. First Drive Gear 141 and Third Driven Gear 144 mesh. Second Rails 145 are arranged on both inner side walls of Door Frame Assembly 138. Straw Access Door 139 is arranged within Door Frame Assembly 138. Both sides of Straw Access Door 139 extend into Second Rails 145 and achieve sliding fit with Second Rails 145.

Second Perforated Support Brackets 146 are symmetrically provided at the top inside Straw Access Door 139. Second Push Rod 147 slidable within Second Perforated Support Bracket 146 is arranged in each Second Perforated Support Bracket 146. The upper end of Second Push Rod 147 extends above Straw Access Door 139. Second Pressure Plate 148 is provided above Straw Access Door 139. Second Pressure Plate 148 is connected to the upper ends of the Second Push Rods 147. Second Relay 149 is provided below Second Perforated Support Bracket 146 on the inner wall of Straw Access Door 139. Second Push Rod 147 cooperates with Second Relay 149.

Specifically, rotation of Eighth Servomotor 140 drives Third Driven Gear 144 to rotate via First Drive Gear 141, thereby causing First Rotating Shaft 143 to rotate. This drives the corresponding toothed belt to rotate, enabling Straw Access Door 139 to move vertically, achieving the opening and closing of Cup Dispensing Port 117.

When Straw Access Door 139 moves to the inner top of Door Frame Assembly 138, Second Pressure Plate 148 will abut against the inner top of Door Frame Assembly 138, then will press down Second Push Rod 147. Second Push Rod 147 will press down Second Relay 149. Second Relay 149 will feed back a signal to PC Module 103. PC Module 103 will control Eighth Servomotor 140 to stop.

Multiple Locking Caster Wheels 150 are provided on the lower end of both Storage Cabinet Body 1 and Control Cabinet Body 2, facilitating movement of the device. Multiple Leveling Feet 151 are provided on the lower end of both Storage Cabinet Body 1 and Control Cabinet Body 2. After moving to position, the height of the Leveling Feet 151 can be adjusted, thereby allowing the device to rest horizontally.

Side Wall Frame 152 is arranged between Storage Cabinet Body 1 and Control Cabinet Body 2. Side Wall Frame 152 is located outside Passageway 9. Two Guide Channels 153 are provided on each inner side wall of Side Wall Frame 152. The two Guide Channels 153 on each side wall of Side Wall Frame 152 are arranged one above the other. Arcuate End Slots 157 inclined towards Storage Cabinet Body 1 are provided at the lower part of each Guide Channel 153. Passageway Divider 154 is arranged within Side Wall Frame 152. Guide Rollers 155 are provided on both the upper and lower ends of both sides of Passageway Divider 154. Guide Rollers 155 achieve rolling fit with the corresponding Guide Channels 153. Second Electric Linear Actuator 156 is provided on the inner wall of Control Cabinet Body 2. Push Frame 158 is rotatably connected to the lower end of Second Electric Linear Actuator 156. The lower end of Push Frame 158 is connected to Passageway Divider 154 via bolts.

Specifically, when the Conveyor Belt Assembly 24 moves to the entrance of Passageway 9, PC Module 103 controls Second Electric Linear Actuator 156 to retract, thereby pulling Passageway Divider 154 upward to open Passageway 9. This allows the product to enter Product Retrieval Chamber 8. Subsequently, PC Module 103 controls Second Electric Linear Actuator 156 to extend, pushing Passageway Divider 154 to move downward along Guide Channels 153. Since Arcuate End Slots 157 inclined towards Storage Cabinet Body 1 are provided at the lower end of Guide Channels 153, when Guide Rollers 155 move into Arcuate End Slots 157, Passageway Divider 154 will move towards Storage Cabinet Body 1. Consequently, Passageway Divider 154 can tightly abut the side wall of Storage Cabinet Body 1, achieving a tighter seal and preventing the cold air inside Inner Cabinet Body 6 from escaping.

Specific Implementation of the Present Invention:
Smoothie Dispensing Process:

Dispensing Process: The user places an order via Touchscreen 11. PC Module 103 receives the command and controls the lifting mechanism to drive Conveyor Belt Assembly 24 to move below the corresponding spring-loaded goods channel (Shelf Assembly 27 with Spring 28), preparing to receive goods. The Second Servomotor 29 of the corresponding spring-loaded goods channel drives Spring 28 to push out the fruit cup. After Conveyor Belt Assembly 24 receives the goods, the lifting mechanism drives Conveyor Belt Assembly 24 to move downward, sending the goods through Passageway 9 into Product Retrieval Chamber 8. First Electric Linear Actuator 112 opens Product Outlet 109, and the user retrieves the goods.

Mixing Process: The user scans the QR code on the fruit cup with Scanning Device 50, then removes the protective film from the cup opening and places the cup into Cup Holder 64. Cup Holder Frame 53 moves above Load Cell 55 for weighing. Water or fruit sauce/jam is added according to the information corresponding to the QR code. Then, the mixing device descends and performs reciprocating vertical mixing. Silicone Protective Cover 85 seals the cup opening to prevent overflow.

Cleaning Process: After mixing is completed, Cup Holder Frame 53 (pushing Cleaning Rack 54) moves forward, allowing the user to take out the mixed smoothie. Subsequently, the mixing device descends to above Drain Tray 76. Drain Pipe 77 sprays water to clean Silicone Protective Cover 85 and the blade head. Wastewater is drained via Drain Pipe 77.

In the description of embodiments of the present invention, it should be noted that:

If terms such as "center," "upper," "lower," "left," "right," "vertical," "horizontal," "inner," "outer," etc., are used to indicate orientation or positional relationships, these are based on the orientation or positional relationships shown in the accompanying drawings, or the orientation in which the product is customarily placed during use. These terms are used solely to facilitate describing the invention and simplifying the description, not to indicate or imply that the device or element must have a specific orientation or be constructed and operated in a specific orientation. Therefore, these terms shall not be construed as limiting the invention.

Additionally, terms such as "first," "second," "third," etc., are used for differentiation only and shall not be interpreted as indicating relative importance.

Furthermore, terms such as "horizontal," "vertical," or "perpendicular" do not require absolute precision. For example, "horizontal" merely indicates a direction relatively more horizontal compared to "vertical," not that the structure must be perfectly horizontal; it may be slightly inclined.

In the description of embodiments of the present invention, "a plurality" means at least two.

In the description of embodiments of the present invention, it should also be noted that unless expressly specified and defined, terms such as "disposed," "mounted," "coupled," or "connected" should be interpreted broadly. For example, a connection may be fixed or detachable, or integrally formed; it may be mechanical or electrical; it may be direct or indirect through an intermediary, or may refer to internal communication between two elements. Those of ordinary skill in the art may understand the specific meanings of these terms in the present invention according to specific circumstances.

The above describes the present invention and its embodiments. This description is not limiting, and the drawings show only one embodiment of the invention. The actual structure is not limited thereto. In summary, if those of ordinary skill in the art are inspired by this disclosure and—without departing from the creative purpose of the invention—design similar structural solutions and embodiments without creative effort, these shall fall within the protection scope of the present invention.

The invention claimed is:

1. A self-stirring fruit cup smoothie vending machine, comprising a storage cabinet body; a control cabinet body disposed adjacent to a side of the storage cabinet body; a spring-loaded shelving system; a lifting mechanism; a refrigeration system; a control system; a mixing system; and a self-service payment terminal; wherein a refrigerated compartment is provided in a lower portion of the storage cabinet body, the refrigeration system being housed within the refrigerated compartment; wherein an inner cabinet body is disposed within the storage cabinet body, an air outlet of the refrigeration system being in fluid communication with the inner cabinet body; wherein the inner cabinet body comprises a plurality of vertically spaced tiers of the spring-loaded shelving system configured for product storage and dispensing; wherein a front periphery of the inner cabinet body is sealingly engaged with a front periphery of the storage cabinet body; wherein a storage cabinet door is mounted at a front portion of the storage cabinet body; wherein the lifting mechanism is positioned laterally adjacent to the spring-loaded shelving system within the inner cabinet body, the lifting mechanism comprising a product transfer assembly; wherein a product retrieval chamber is disposed in a mid-lower portion of the control cabinet body; wherein a passageway is formed in a sidewall of the product retrieval chamber, the passageway providing fluid communication between the storage cabinet body, the inner cabinet body, and the product retrieval chamber for transporting products from the lifting mechanism through the passageway into the product retrieval chamber; wherein the control system is mounted in an upper portion of the control cabinet body; wherein the mixing system is housed within the control cabinet body; wherein a control cabinet door is mounted at a front portion of the control cabinet body, the self-service payment terminal being disposed on an interior surface of the control cabinet door;

wherein a touchscreen is disposed at a front section of the control cabinet body, the touchscreen being electrically connected to the control system.

2. The self-stirring fruit cup smoothie vending machine of claim 1, wherein the lifting mechanism comprising a first servomotor; a transverse bracket; side brackets; slide rails; rotating shafts; a toothed belt; and sliding blocks; wherein upper and lower ends of the inner cabinet body are each provided with a transverse bracket; wherein the side brackets are symmetrically disposed on opposite sides of the inner cabinet body; wherein upper and lower ends of each side bracket are connected to the transverse brackets at the upper and lower ends of the inner cabinet body, respectively; wherein mounting bases are provided at both the upper and lower ends of each side bracket; wherein a first rotating shaft is rotatably mounted adjacent to an upper end of the inner cabinet body, and a second rotating shaft is rotatably mounted adjacent to a lower end of the inner cabinet body; wherein opposite ends of the first rotating shaft are rotatably coupled to the mounting bases at the upper ends of the side brackets; wherein opposite ends of the second rotating shaft are rotatably coupled to the mounting bases at the lower ends of the side brackets; wherein each end of the rotating shafts protrudes into a corresponding mounting base; wherein a first gear is fixedly mounted on each shaft end protruding into the mounting bases; wherein the first gears within each side bracket are interconnected by the toothed belt to form a continuous drive loop; wherein a slide rail is vertically mounted on an inner wall of each side bracket, extending from a lower end to an upper end thereof within an area bounded by the toothed belt loop; wherein a sliding block is slidably engaged with each slide rail; wherein a clamping plate is detachably secured by bolts to one side of each sliding block; wherein the toothed belt passes between the clamping plate and the sliding block and is fixedly clamped therebetween, such that rotation of the toothed belt drives vertical displacement of the sliding block along the slide rail; wherein a motor mount is disposed on one side of the lower transverse bracket of the inner cabinet body; wherein the first servomotor is mounted on the motor mount; wherein a second gear is fixedly mounted on an output shaft of the first servomotor and a corresponding second gear is fixedly mounted on the second rotating shaft; wherein the second gears are operatively connected by the toothed belt.

3. The self-stirring fruit cup smoothie vending machine of claim 2, wherein the product transfer assembly comprises a conveyor belt assembly; and a support bracket is mounted on each sliding block at a side laterally facing toward the storage cabinet door;

wherein opposite ends of the conveyor belt assembly are detachably secured to the support brackets via bolts.

4. The self-stirring fruit cup smoothie vending machine of claim 2, wherein the spring-loaded shelving system comprising a carrier bracket; a shelf assembly; a spring; a second servomotor; a first gearbox; and a rail frame; wherein a plurality of uniformly spaced slots are formed at a rear end of the carrier bracket; wherein the first gearbox is mounted at each slot of the carrier bracket; wherein the second servomotor is operatively coupled to each first gearbox; wherein an output shaft of the first gearbox extends through the slot into the carrier bracket; wherein a disk is fixedly mounted on the output shaft within the carrier bracket; wherein a first end of the spring is coiled around the disk; wherein the shelf assembly is suspended within the spring and spaced apart from interior surfaces thereof; wherein an insertion slot is provided at a front portion of the carrier bracket adjacent to each spring; wherein a front end of the shelf assembly is slidably received within the insertion slot; wherein a circular aperture is formed at a rear end of the shelf assembly, the shelf assembly being rotatably connected to the output shaft via the circular aperture; wherein guard rails are disposed along opposite sides of each spring, the guard rails being detachably secured to the carrier bracket via bolts; wherein rail frames are symmetrically disposed along opposite sides of the carrier bracket; wherein first rollers are rotatably mounted at rear lateral portions of the carrier bracket, the first rollers being rollingly engaged with corresponding rail frames; wherein second rollers are rotatably mounted at front lateral portions of each rail frame, the carrier bracket being rollingly supported on the second rollers; wherein a trapezoidal support frame is mounted below a front end of the carrier bracket; wherein rear brackets are symmetrically mounted at rear portions of opposite side walls of the inner cabinet body; wherein protective housings are mounted externally to the side brackets, the protective housings being detachably secured to the inner cabinet body via bolts; and wherein front and rear ends of each rail frame are detachably secured to a corresponding rear bracket and protective housing via bolts.

5. The self-stirring fruit cup smoothie vending machine of claim 1, wherein the mixing system comprises a mixing mechanism and an automatic door mechanism; an access opening is formed in the control cabinet door; the automatic door mechanism is mounted on an interior surface of the control cabinet door at the access opening; the mixing mechanism is disposed within the control cabinet body rearward of the automatic door mechanism; wherein the automatic door mechanism comprises: a door frame mounted at the access opening; an access door; a fourth servomotor; a second drive gear; and a second driven gear; wherein second rotating shafts are rotatably mounted at upper and lower ends of the door frame, opposite ends of each second rotating shaft extending outwardly beyond lateral sides of the door frame; wherein a second driven gear is fixedly mounted on each extending end of the second rotating shafts; wherein vertically aligned pairs of the second driven gears on each lateral side of the door frame are operatively connected by a toothed belt; wherein the fourth servomotor is mounted at a lower corner of the door frame; wherein the second drive gear is fixedly mounted on an output shaft of the fourth servomotor; wherein a fourth driven gear is fixedly mounted on one end of the lower second rotating shaft; wherein the second drive gear meshes with the fourth driven gear; wherein third rails are vertically disposed on opposite inner sidewalls of the door frame; wherein the access door is slidably engaged with the third rails, lateral edges of the access door extending into the third rails; wherein clamping plates fixedly connect opposite lateral ends of the access door to the toothed belts on both sides of the door frame; and wherein a barcode scanner is disposed at a front section of the control cabinet door.

6. The self-stirring fruit cup smoothie vending machine of claim 5, wherein the mixing mechanism comprising a lower housing; an upper housing; a cup holder frame; a cleaning rack; a load cell; and a mixing device; wherein the lower housing is disposed within the control cabinet body and detachably secured thereto via bolts; wherein the upper housing is mounted on an upper rear portion of the lower housing; wherein a mixing controller is mounted on the upper housing; wherein the mixing device is mounted on the upper housing, a lower end of the mixing device extending through a through-hole in the lower housing into an interior space thereof, wherein sliding slots are formed on opposite sidewalls of the lower housing; wherein two shaft rods are rotatably mounted on one sidewall of the lower housing adjacent to opposite ends of the sliding slots; wherein a first transmission gear is rotatably mounted on each shaft rod; wherein the first transmission gears are operatively connected by a toothed belt; wherein a fifth servomotor is mounted at one end of the lower housing; wherein a second transmission gear is fixedly mounted on an output shaft of the fifth servomotor; wherein a third transmission gear is rotatably mounted on the shaft rod proximate to the second transmission gear, the third transmission gear meshing with the second transmission gear; wherein the cup holder frame is slidably engaged within the sliding slots, lateral extensions of the cup holder frame being received in the sliding slots; wherein a fixing clamp is mounted on each lateral extension of the cup holder frame, the fixing clamps being fixedly secured to the toothed belt; wherein a cup holder is disposed at a front end of the cup holder frame, the cup holder having an aperture extending vertically therethrough and through the cup holder frame; wherein an internal bracket is disposed below the cup holder frame within the lower housing; wherein sliding track channels are formed on opposite sides of the internal bracket; wherein support rods extend from opposite sidewalls of the lower housing into the sliding track channels; wherein tension springs are symmetrically connected between a front end of the internal bracket and a front wall of the lower housing; wherein a third gearbox is mounted at a lower portion of the internal bracket; wherein a sixth servomotor is operatively coupled to an input shaft of the third gearbox; wherein a first leadscrew is operatively connected to an output shaft of the third gearbox; wherein a nut is threadedly engaged with the first leadscrew; wherein a sleeve is fixedly mounted on the nut, the sleeve extending upwardly through the internal bracket; wherein a support plate is mounted atop the sleeve, the load cell being disposed on the support plate; wherein sliding tubes are mounted on opposite sides of the support plate; wherein guide rods are slidably received within the sliding tubes, upper ends of the guide rods being connected to the support plate; wherein limit pull brackets are symmetrically disposed at front and rear ends of the cup holder frame, the limit pull brackets being cooperatively engaged with the internal bracket; wherein the cleaning rack is slidably engaged within the sliding slots rearward of the cup holder frame; wherein a drain tray is mounted on the cleaning rack in vertical alignment with the mixing device; wherein a drain pipe extends downwardly from the drain tray; wherein limit features are disposed at central and rear portions of inner sidewalls of the lower housing, the limit features being cooperatively engaged with the cleaning rack; wherein magnetically coupled pairs are disposed on a rear inner wall of the cleaning rack and a rear end of the cup holder frame; and wherein mounting holes are formed in the lower housing forward of the through-hole.

7. The self-stirring fruit cup smoothie vending machine of claim 6, wherein the mixing device comprising a mounting plate; a mixing motor; an upper mixing drum; a lower mixing drum; a seventh servomotor; and a silicone protective cover; wherein the mounting plate is disposed in a mid-upper portion of the upper housing; wherein the upper mixing drum is suspended below the mounting plate; wherein the lower mixing drum is coaxially coupled to a lower end of the upper mixing drum in fluid communication therewith; wherein a lower end of the lower mixing drum extends through the through-hole into the lower housing; wherein the silicone protective cover is mounted on a bottom wall of the lower housing, the silicone protective cover having a mixing aperture vertically aligned with the lower mixing drum; wherein a spring seat is disposed within the lower mixing drum; wherein a spring is coaxially mounted around the spring seat; wherein a disk plate is disposed within the upper mixing drum; wherein guide blocks are symmetrically mounted on opposite sides of the disk plate; wherein adjustment slots are vertically formed in opposite sidewalls of the upper mixing drum, each guide block being slidably received within a corresponding adjustment slot; wherein four threaded holes are symmetrically formed in the disk plate; wherein bearings are mounted on the mounting plate in vertical alignment with the threaded holes; wherein second leadscrews are rotatably supported within the bearings, upper ends of the second leadscrews extending above the mounting plate; wherein third gears are fixedly mounted on the upper ends of the second leadscrews; wherein the third gears are operatively connected by a toothed belt; wherein lower portions of the second leadscrews are threadedly engaged with the threaded holes; wherein additional bearings are mounted at a bottom end of the upper mixing drum in vertical alignment with the threaded holes, lower ends of the second leadscrews being rotatably received within the additional bearings; wherein the mixing motor is mounted on the disk plate; wherein a mixing shaft is fixedly coupled to an output shaft of the mixing motor, the mixing shaft extending through the spring and spring seat, and projecting through the mixing aperture into the silicone protective cover; wherein an upper end of the spring bears against a lower surface of the mixing motor; wherein the seventh servomotor is mounted on the mounting plate; wherein a fourth gear is fixedly mounted on an output shaft of the seventh servomotor; wherein a fifth gear is fixedly mounted on the second leadscrew proximate to the seventh servomotor, the fifth gear being positioned below the mounting plate; and wherein the fifth gear meshes with the fourth gear.

8. The self-stirring fruit cup smoothie vending machine of claim 7, wherein a small electric storage water heater is mounted at a rear portion of the upper housing; a water storage tank is disposed at the rear portion of the upper housing adjacent to the small electric storage water heater; wherein a refrigerator unit is housed within the control cabinet body; wherein a plurality of peristaltic pumps are disposed within the refrigerator unit; wherein a plurality of electronic scales are mounted on a bottom wall of the control cabinet body; and wherein an access door is detachably secured to a lateral side of the control cabinet body via bolts.

9. The self-stirring fruit cup smoothie vending machine of claim 1, wherein the control system comprising a PC module; and a control box; wherein the control box is disposed in an upper portion of the control cabinet body; wherein the PC module is housed within the control box; wherein a plurality of selector switches are disposed on an upper front section of the control box; wherein a main power switch is mounted on the front section of the control box; wherein a temperature controller is positioned below the main power switch on the front section of the control box; wherein control buttons are mounted on the front section of the control box; and wherein the control buttons, selector switches, main power switch, and temperature controller are electrically connected to the PC module.

10. The self-stirring fruit cup smoothie vending machine of claim 1, wherein a product outlet is formed in the control cabinet door in communication with the product retrieval chamber; first rails are symmetrically mounted on an interior surface of the control cabinet door between the control cabinet door and the product retrieval chamber, the first rails being disposed on opposite sides of the product outlet; a product access door panel is slidably engaged with the first rails between the first rails; a first electric linear actuator is mounted on an interior front wall of the control cabinet body; wherein the first electric linear actuator is positioned directly below the product access door panel; and wherein an upper end of the first electric linear actuator is operatively connected to the product access door panel, driving vertical displacement of the product access door panel along the first rails.

11. The self-stirring fruit cup smoothie vending machine of claim 10, wherein first perforated support brackets are symmetrically mounted at an upper interior portion of the product access door panel; a first push rod is slidably received within each first perforated support bracket, an upper end of each first push rod extending above the product access door panel; a first pressure plate is disposed above the product access door panel, the first pressure plate being fixedly connected to the upper ends of the first push rods; first relays are mounted on interior walls of the product access door panel below the first perforated support brackets; and the first push rods are operatively engaged with the first relays.

12. The self-stirring fruit cup smoothie vending machine of claim 1, wherein a cup access mechanism is mounted on an interior surface of the control cabinet door adjacent to the product retrieval chamber; a straw access door mechanism is disposed between the cup access mechanism and a front wall of the control cabinet body; a cup dispensing port is formed in a front portion of the control cabinet body in alignment with the straw access door mechanism; wherein the cup access mechanism comprises: a base frame detachably secured to the control cabinet body via bolts; an outer casing mounted atop the base frame; a mounting bracket secured to the control cabinet body via bolts at a cabinet-proximal side of the outer casing; bearings symmetrically disposed at upper and lower ends of opposite sidewalls of the outer casing; first leadscrews rotatably mounted vertically between corresponding upper and lower bearings on each side of the outer casing; first lower gears fixedly mounted on lower ends of the first leadscrews extending below the outer casing; interconnecting gears fixedly mounted on lowermost ends of the first leadscrews; a toothed belt operatively connecting the interconnecting gears; a second gearbox mounted on a bottom wall of the outer casing; a third servomotor operatively coupled to an input shaft of the second gearbox; a second lower gear fixedly mounted on an output shaft of the second gearbox extending below the outer casing, the second lower gear meshing with the first lower gears; first nut carriages threadedly engaged with the first leadscrews; a tray disposed within the outer casing; connecting plates extending laterally from opposite sides of the tray; slide channels vertically formed in opposite sidewalls of the outer casing; wherein the connecting plates extend outwardly through the slide channels and are detachably secured to corresponding first nut carriages via bolts; and a rear door mounted on a rear side of the outer casing; wherein an arcuate top cover is mounted atop the outer casing; wherein a straw storage dispenser is mounted on the arcuate top cover, the straw storage dispenser having a downwardly inclined bottom plate; wherein a straw dispensing slot is formed at a front bottom edge of the straw storage dispenser; wherein arcuate support plates are symmetrically disposed below the straw dispensing slot to receive dispensed straws; wherein a top cover is removably mounted on the straw storage dispenser; and wherein an infrared sensor is mounted on the bottom plate of the straw storage dispenser.

13. The self-stirring fruit cup smoothie vending machine of claim 12, wherein the straw access door mechanism comprising a door frame assembly mounted at the cup dispensing port; a straw access door; an eighth servomotor; a first drive gear; and a first driven gear; wherein first rotating shafts are rotatably mounted at upper and lower ends of the door frame assembly; wherein opposite ends of each first rotating shaft extend outwardly beyond lateral sides of the door frame assembly; wherein first driven gears are fixedly mounted on each extending end of the first rotating shafts; wherein vertically aligned pairs of the first driven gears on each lateral side are operatively connected by toothed belts; wherein the eighth servomotor is mounted at a lower portion of the door frame assembly; wherein the first drive gear is fixedly mounted on an output shaft of the eighth servomotor; wherein a third driven gear is fixedly mounted on the lower first rotating shaft; wherein the first drive gear meshes with the third driven gear; wherein second rails are vertically disposed on opposite inner sidewalls of the door frame assembly; wherein the straw access door is slidably engaged with the second rails, lateral edges of the straw access door extending into the second rails; wherein second perforated support brackets are symmetrically mounted at an upper interior portion of the straw access door; wherein a second push rod is slidably received within each second perforated support bracket, an upper end of each second push rod extending above the straw access door; wherein a second pressure plate is disposed above the straw access door, the second pressure plate being fixedly connected to the upper ends of the second push rods; wherein second relays are mounted on interior walls of the straw access door below the second perforated support brackets; and wherein the second push rods are operatively engaged with the second relays.

14. The self-stirring fruit cup smoothie vending machine of claim 1, wherein both the storage cabinet body and the control cabinet body are provided with a plurality of locking caster wheels at lower ends thereof; and a plurality of leveling feet at the lower ends thereof.

15. The self-stirring fruit cup smoothie vending machine of claim 1, wherein a side wall frame is disposed between the storage cabinet body and control cabinet body exterior to the passageway; wherein two guide channels are formed on each inner sidewall of the side wall frame, the guide channels on each sidewall being vertically spaced; wherein a downwardly arcuate end slot inclined toward the storage cabinet body is formed at a lower end of each guide channel; wherein a passageway partition plate is disposed within the side wall frame; wherein guide rollers are rotatably mounted at upper and lower ends of opposite sides of the passageway partition plate; wherein the guide rollers are rollingly engaged with corresponding guide channels; wherein a second electric linear actuator is mounted on an inner wall of the control cabinet body; wherein a push frame is rotatably coupled to a lower end of the second electric linear actuator; and wherein a lower end of the push frame is detachably secured to the passageway partition plate via bolts.

* * * * *